(12) United States Patent
Wallentin et al.

(10) Patent No.: US 12,501,329 B2
(45) Date of Patent: Dec. 16, 2025

(54) CONDITIONAL RECONFIGURATION BASED ON DATA TRAFFIC

(71) Applicant: Telefonaktiebolaget LM Ericsson (publ), Stockholm (SE)

(72) Inventors: Pontus Wallentin, Linköping (SE); Stefan Wager, Espoo (FI); Jens Bergqvist, Linköping (SE); Cecilia Eklöf, Täby (SE); Icaro Leonardo Da Silva, Solna (SE); Oumer Teyeb, Montréal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 396 days.

(21) Appl. No.: 18/008,781

(22) PCT Filed: Jun. 24, 2021

(86) PCT No.: PCT/SE2021/050627
§ 371 (c)(1),
(2) Date: Dec. 7, 2022

(87) PCT Pub. No.: WO2022/010398
PCT Pub. Date: Jan. 13, 2022

(65) Prior Publication Data
US 2023/0217329 A1    Jul. 6, 2023

Related U.S. Application Data

(60) Provisional application No. 63/050,213, filed on Jul. 10, 2020.

(51) Int. Cl.
*H04W 36/00* (2009.01)
*H04W 24/08* (2009.01)
(Continued)

(52) U.S. Cl.
CPC ..... *H04W 36/00837* (2018.08); *H04W 24/08* (2013.01); *H04W 36/0058* (2018.08); *H04W 36/249* (2023.05); *H04W 36/362* (2023.05)

(58) Field of Classification Search
None
See application file for complete search history.

(56) References Cited

U.S. PATENT DOCUMENTS

| | | | |
|---|---|---|---|
| 2012/0086573 A1* | 4/2012 | Bischoff | G08B 21/0492 340/573.1 |
| 2020/0154326 A1* | 5/2020 | Deenoo | H04W 74/02 |

(Continued)

FOREIGN PATENT DOCUMENTS

| | | |
|---|---|---|
| WO | 2018175721 A1 | 9/2018 |
| WO | 2020091662 A1 | 5/2020 |

(Continued)

OTHER PUBLICATIONS

"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 16), Dec. 2019, pp. 1-366.

(Continued)

*Primary Examiner* — Saad Khawar
(74) *Attorney, Agent, or Firm* — Murphy, Bilak & Homiller, PLLC

(57) ABSTRACT

Embodiments include methods for a UE to perform mobility operations in a wireless network based on conditions related to data traffic. Such methods include receiving, from a network node, one or more conditional reconfigurations. Each includes a reconfiguration message associated with a candidate target cell and one or more execution conditions that need to be fulfilled to apply the reconfiguration message when performing a mobility operation, including at least one (Continued)

first execution condition related to UE data traffic and/or to one or more UE applications. Such methods include monitoring for the execution conditions in the conditional reconfigurations and based on detecting fulfillment of one or more execution conditions in a particular conditional measurement configuration, performing a mobility operation towards the candidate target cell associated with the reconfiguration message in the particular conditional measurement configuration. Other embodiments include complementary methods by a network node, as well as UEs and network nodes

23 Claims, 21 Drawing Sheets

(51) Int. Cl.
*H04W 36/24* (2009.01)
*H04W 36/36* (2009.01)

(56) References Cited

U.S. PATENT DOCUMENTS

| 2021/0360495 | A1* | 11/2021 | Lovlekar | H04W 36/362 |
| 2022/0394583 | A1* | 12/2022 | Deenoo | H04W 36/305 |

FOREIGN PATENT DOCUMENTS

| WO | 2020091667 A1 | 5/2020 |
| WO | 2020128848 A1 | 6/2020 |
| WO | 2021067236 A1 | 4/2021 |

OTHER PUBLICATIONS

"3GPP TS 38.331 V15.9.0", 3rd Generation Partnership Project; Technical Specification Group Radio Access Network; NR; Radio Resource Control (RRC) protocol Specification (Release 15), Mar. 2020, pp. 1-536.
"Conditional PSCell addition/change", 3GPP TSG-RAN WG2 #107bis, R2-1912635, Chongqing, P.R. China, Oct. 14-18, 2019, pp. 1-12.
"3GPP TS 38.213 V16.1.0", 3rd Generation Partnership Project; Technical Specification Group Radio Access Network; NR; Physical layer procedures for control (Release 16), Mar. 2020, pp. 1-156.
"3GPP TS 38.323 V16.0.0", 3rd Generation Partnership Project; Technical Specification Group Radio Access Network; NR; Packet Data Convergence Protocol (PDCP) specification (Release 16), Mar. 2020, pp. 1-37.
"3GPP TS 37.340 V16.1.0", 3rd Generation Partnership Project; Technical Specification Group Radio Access Network; Evolved Universal Terrestrial Radio Access (E-UTRA) and NR; Multi-connectivity; Stage 2 (Release 16), Mar. 2020, pp. 1-74.
"3GPP TS 38.423 V16.1.0", 3rd Generation Partnership Project; Technical Specification Group Radio Access Network; NG-RAN; Xn application protocol (XnAP) (Release 16), Mar. 2020, pp. 1-334.
"3GPP TS 38.300 V16.1.0", 3rd Generation Partnership Project; Technical Specification Group Radio Access Network; NR; NR and NG-RAN Overall Description; Stage 2 (Release 16), Mar. 2020, pp. 1-133.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.

\* cited by examiner

FIG. 21

```
-- ASN1START
-- TAG-CONDITIONALRECONFIGURATION-START
ConditionalReconfiguration-r16 ::= SEQUENCE {
    condReconfigToAddModList-r16    CondReconfigToAddModList-r16    OPTIONAL,  -- Need N
    ulDataVolumeThreshold-r17       UL-DataVolumeThreshold-r17      OPTIONAL,  -- Need N
    ...
}

UL-DataVolumeThreshold::=       ENUMERATED {b0, b100, b200, b400, b800, b1600, b3200, b6400, b12800,
                                b25600, b51200, b102400, b204800, b409600, b819200, b1228800,
                                b1638400, b2457600, b3276800, b4096000, b4915200, b5734400,
                                b6553600, infinity, spare8, spare7, spare6, spare5, spare4,
                                spare3, spare2, spare1}

-- TAG-CONDITIONALRECONFIGURATION-STOP
-- ASN1STOP
```

FIG. 22

```
CondReconfigToAddMod-r16 ::= SEQUENCE {
    condReconfigId-r16          CondReconfigId-r16,
    condExecutionCond-r16       SEQUENCE (SIZE (1..2)) OF MeasId                    OPTIONAL, -- Cond condReconfigAdd
    condRRCReconfig-r16         OCTET STRING (CONTAINING RRCReconfiguration)        OPTIONAL, -- Cond condReconfigAdd
    ulDataVolumeCond-r17        ENUMERATED {true}                                   OPTIONAL,
    ...
}
```

FIG. 23

```
CondReconfigToAddMod-r16 ::= SEQUENCE {
    condReconfigId-r16          CondReconfigId-r16,
    condExecutionCond-r16       SEQUENCE (SIZE (1..2)) OF MeasId                    OPTIONAL, -- Cond condReconfigAdd
    condRRCReconfig-r16         OCTET STRING (CONTAINING RRCReconfiguration)        OPTIONAL, -- Cond condReconfigAdd
    ulDataVolumeCond-r17        UL-DataVolumeThreshold-r17                          OPTIONAL,
    ...
}

UL-DataVolumeThreshold::=       ENUMERATED {b0, b100, b200, b400, b800, b1600, b3200, b6400, b12800,
                                b25600, b51200, b102400, b204800, b409600, b819200,
                                b1228800, b1638400, b2457600, b3276800, b4096000, b4915200,
                                b5734400, b6553600, infinity, spare8, spare7, spare6, spare5,
                                spare4, spare3, spare2, spare1}
```

```
-- ASN1START
-- TAG-REPORTCONFIGNR-START
ReportConfigNR ::=              SEQUENCE {
    reportType                      CHOICE {
        periodical                      PeriodicalReportConfig,
        eventTriggered                  EventTriggerConfig,
        ...,
        reportCGI                       ReportCGI,
        reportSFTD                      ReportSFTD-NR,
        condTriggerConfig-r16           CondTriggerConfig-r16,
        cli-Periodical-r16              CLI-PeriodicalReportConfig-r16,
        cli-EventTriggered-r16          CLI-EventTriggerConfig-r16
    }
}

(. . . )

CondTriggerConfig-r16 ::=       SEQUENCE {
    condEventId                     CHOICE {
        condEventA3                     SEQUENCE {
            a3-Offset                       MeasTriggerQuantityOffset,
            hysteresis                      Hysteresis,
            timeToTrigger                   TimeToTrigger
        },
        condEventA5                     SEQUENCE {
            a5-Threshold1                   MeasTriggerQuantity,
            a5-Threshold2                   MeasTriggerQuantity,
            hysteresis                      Hysteresis,
            timeToTrigger                   TimeToTrigger
        },
        ulDataVolumeThreshold-r17   UL-DataVolumeThreshold-r17    OPTIONAL, -- Need N,
        ...
    },
    rsType-r16                      NR-RS-Type,
    ...
}
...
-- TAG-REPORTCONFIGNR-STOP
-- ASN1STOP
```

FIG. 24

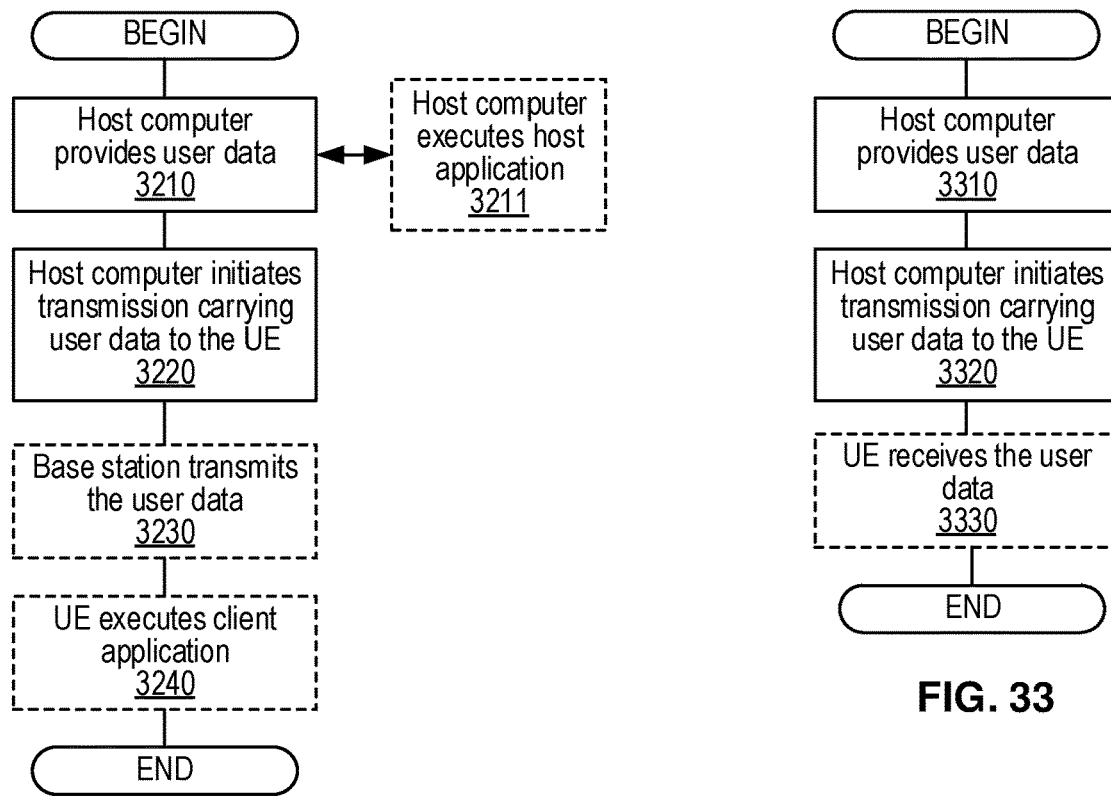
FIG. 32
FIG. 33
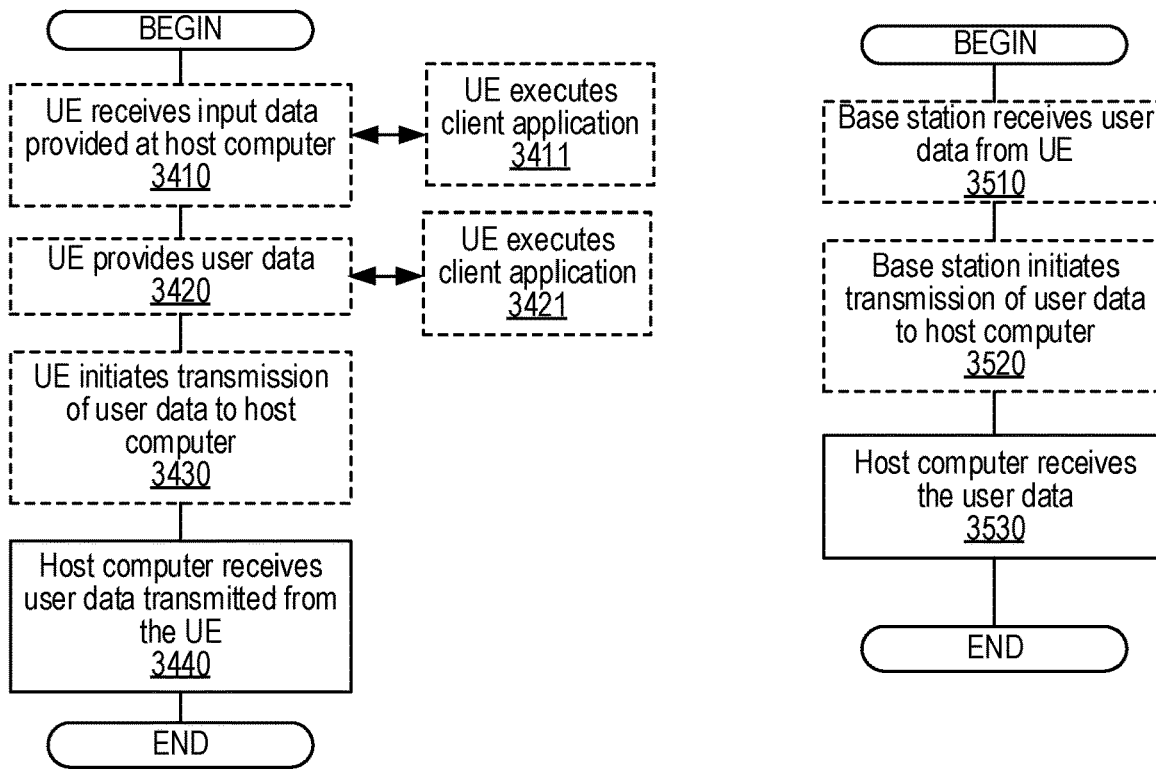
FIG. 34
FIG. 35

CONDITIONAL RECONFIGURATION BASED ON DATA TRAFFIC

TECHNICAL FIELD

The present invention generally relates to wireless communication networks and particularly relates to improving various mobility operations that user equipment (UEs) perform in relation to cells in a wireless network.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuos reception (DRX) schedule configured by upper layers. During DRX active periods (also referred to as "DRX On durations"), an RRC_IDLE LE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Logical channel communications between a UE and an eNB are via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

3GPP Rel-10 supports bandwidths larger than 20 MHz. One important Rel-10 requirement is backward compatibility with Rel-8. As such, a wideband LTE Rel-10 carrier (e.g., >20 MHz) should appear as a plurality of carriers ("component carriers" or CCs) to a Rel-8 ("legacy") terminal. Legacy terminals can be scheduled in all parts of the wideband Rel-10 carrier. One way to achieve this is by Carrier Aggregation (CA), whereby a Rel-10 terminal can receive multiple CCs, each preferably having the same structure as a Rel-8 carrier.

LTE dual connectivity (DC) was introduced in Rel-12. In DC operation, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, the terms master node (MN), anchor node, and MeNB can be used interchangeably, while the terms secondary node (SN), booster node, and SeNB can also be used interchangeably. DC can be viewed as a special case of CA, in which the aggregated carriers (or cells) are provided by network nodes that are physically separated and not connected via a robust, high-capacity connection.

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. 5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC_CONNECTED states, but adds another state known as RRC_INACTIVE. In addition to providing coverage via "cells," as in LTE, NR networks also provide coverage via "beams." In general, a DL "beam" is a coverage area of a network-transmitted RS that may be measured or monitored by a UE.

DC is also envisioned as an important feature for 5G/NR networks. Several DC (or more generally, multi-connectivity) scenarios have been considered for NR. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a UE can be configured to uses resources provided by two different nodes, one providing E-UTRA/ LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

A common mobility procedure for UEs in RRC_CONNECTED state (e.g., with an active connection) is handover (HO) between cells. A UE is handed over from a source or serving cell, provided by a source node, to a target cell provided by a target node. In general, for LTE (or NR), handover source and target nodes are different eNBs (or gNBs), although intra-node handover between different cells provided by a single eNB (or gNB) is possible. Seamless handovers are a key feature of 3GPP technologies. Successful handovers ensure that the UE moves around in the coverage area of different cells without causing too many interruptions in the data transmission.

The RRC layer also controls mobility procedures related to DC. For example, an SN Addition procedure is initiated by the MN and is used to establish a UE context at the SN to provide resources from the SN to the UE. As another example, the MN or SN can initiate an SN modification procedure to perform configuration changes of the SCG within the SN ("intra-SN"), e.g., modification/release of UP resource configuration and PSCell changes. For PSCell changes, once a better cell in the same frequency as the UE's current PSCell triggers an event, a UE measurement report and preparation of the target SN is needed before the RRCReconfiguration to execute addition/modification can be sent to the UE.

Conventional handover and other mobility procedures can have various problems related to robustness. For example, a HO command (e.g., RRCConnectionReconfiguration with mobilityControlInfo for LTE or RRCReconfiguration with a reconfigurationWithSync for NR) is normally sent when the radio conditions for the UE are already quite bad. As such, the HO command may need to be segmented (e.g., to allow for redundancy to protect against errors) and/or retransmitted one or more times before it reaches the UE. In such case, the HO command may not reach the UE in time (or at all) before the degraded connection with the source node (e.g., the node hosting the UE's current serving cell) is dropped. Failure of handover to a target cell may lead to the UE declaring radio link failure (RLF) in the source cell. After the UE reestablishes a connection in another target cell, the UE can provide an RLF report to the network, indicating the cause(s) of the RLF in the source cell.

Some "conditional mobility" techniques have been introduced to address various difficulties with handovers and other mobility procedures. A main principle is that transmission and execution of a mobility (e.g., handover) command are separated. This allows the mobility command to be sent earlier to UE when the radio conditions are still good, thus increasing the likelihood that the message is successfully transferred. The execution of the mobility command is done at later point in time based on an associated execution condition.

Specifically, conditional handover (CHO) and SN-initiated intra-SN conditional PSCell change (CPC) procedures based on these principles were specified in 3GPP Rel-16. It is expected that 3GPP Rel-17 will include support for other scenarios such as conditional PSCell addition, inter-SN CPC (SN or MN initiated), and MN-initiated intra-SN CPC. Current conditional mobility execution conditions are only based on UE signal measurements, which can cause various problems, issues, and/or difficulties for these new scenarios.

SUMMARY

Embodiments of the present disclosure provide specific improvements to mobility operations in a wireless network, such as by facilitating solutions to overcome exemplary problems summarized above and described in more detail below.

Embodiments of the present disclosure include methods (e.g., procedures) for performing mobility operations in a wireless network based on conditions related to data traffic. These exemplary methods can be performed by a UE (e.g., wireless device, IoT device, modem, etc. or component thereof) in communication with a network node (e.g., base station, eNB, gNB, ng-eNB, en-gNB, etc., or component thereof) in the wireless network (e.g., E-UTRAN, NG-RAN).

These exemplary methods can include receiving, from the network node, one or more conditional reconfigurations. Each conditional reconfiguration can include a reconfiguration message associated with a candidate target cell and one or more execution conditions that need to be fulfilled to apply the reconfiguration message when performing a mobility operation. The execution conditions include at least one first execution condition related to UE data traffic and/or to one or more UE applications. These exemplary methods can also include monitoring for the execution conditions included in the respective conditional reconfigurations. These exemplary methods can also include, based on detecting fulfillment of one or more execution conditions included in a particular one of the conditional measurement configurations, performing a mobility operation towards the candidate target cell associated with the reconfiguration message included in the particular conditional measurement configuration.

In some embodiments, these exemplary methods can also include storing the conditional reconfigurations.

In some embodiments, the monitoring operations can include calculating UE data traffic volume and comparing the calculated data traffic volume to one or more first criteria associated with the respective first execution conditions. In some embodiments, calculating UE data traffic volume can include determining raw measurements of data traffic volume and applying a smoothing filter to the raw measurements to produce the calculated data traffic volume. In some embodiments, the monitoring operations can also include determining that the calculated data traffic volume fulfills the one or more first criteria (e.g., exceeds a threshold) for at least a triggering delay.

In various embodiments, the first execution conditions, included in the respective conditional reconfigurations, can include any of the following criteria, individually or in any combination:
  calculated or measured UL data traffic volume is above or below an UL data volume threshold;
  calculated or measured UL throughput is above or below an UL throughput threshold;
  calculated or measured DL data traffic volume is above or below a DL data volume threshold;
  calculated or measured DL throughput is above or below a DL throughput threshold;
  arrival of UL data; and
  arrival of DL data.
In various embodiments, each of the above listed criteria is related to one of the following:
  all UE UL or DL data traffic;
  UE UL or DL data traffic associated with a specific radio bearer; or
  UE UL or DL data traffic associated with a specific group of radio bearers with a specific quality of service (QoS) profile.

In some embodiments, the one or more execution conditions, included in each conditional reconfiguration, can also include at least one second execution conditions related to measurements of the UE's serving cell and/or of respective candidate target cells. In such embodiments, the monitoring operations can include performing signal measurements based on at least one measurement object associated with the conditional reconfigurations and comparing the signal measurements to one or more second criteria associated with the respective second execution conditions. In various embodiments, the respective second execution conditions can include any of the following:
  measured signal level and/or quality for a serving cell, carrier, or radio access technology (RAT) is above or below a first measurement threshold;
  measured signal level and/or quality for the serving cell, carrier, or RAT is between first and second measurement thresholds;
  measured signal level and/or quality for a neighbor cell, carrier, or RAT is above or below a third measurement threshold;
  measured signal level and/or quality for the neighbor cell, carrier, or RAT is between third and fourth measurement thresholds; and
  measured signal level and/or quality for the neighbor cell, carrier, or RAT is above or below measured signal level and/or quality for the serving cell, carrier, or RAT by more than a fifth threshold.

In some embodiments, performing the mobility operation can be based on detecting fulfillment of both a first execution condition and a second execution condition included in the particular conditional reconfiguration. In other embodiments, performing the mobility operation can be based on detecting fulfillment of either a first execution condition or a second execution condition included in the particular conditional reconfiguration.

In some embodiments, monitoring for a first execution condition included in the particular conditional reconfiguration can be initiated based on detecting fulfillment of a second execution condition included in the particular conditional reconfiguration. In other embodiments, monitoring for a second execution condition included in the particular conditional reconfiguration can be initiated based on detecting fulfillment of a first execution condition included in the particular conditional reconfiguration.

In some embodiments, the at least one first execution condition includes one or more of the following: a particular UE application is activated; a particular UE application is deactivated; a particular UE application reaches a particular state; or a particular UE application triggers a particular event.

In some embodiments, the monitoring operations can include monitoring for an indication, from the network node, that at least one first execution condition related to UE DL data traffic has been fulfilled. In various embodiments, the indication can be received as a MAC control element (MAC CE), radio resource control (RRC) message, or downlink control information (DCI). In some embodiments, the indication, when received, can include an identifier of the particular conditional reconfiguration whose at least one first execution condition related to UE DL data traffic has been fulfilled.

In some embodiments, performing the mobility operation towards the candidate target cell associated with the reconfiguration message included in the particular conditional measurement configuration can include one of more of the following: performing a random access towards the candidate target cell; retrieve the reconfiguration message from storage; and sending the reconfiguration message to a network node serving the candidate target cell.

In various embodiments, the mobility operation can be any of the following: secondary cell group (SCG) activation, SCG suspension, handover or primary cell (PCell) change, primary SCG cell (PSCell) addition, PSCell release, or reconfiguration with sync.

In various embodiments, the UE can be operating in one of the following modes: single connectivity with the network node, dual connectivity where the network node is a master node (MN), or dual connectivity where the network node is a secondary node (SN).

Other embodiments include methods (e.g., procedures) for configuring mobility operations by a UE based on conditions related to data traffic. These exemplary methods can be performed by a network node (e.g., base station, eNB, gNB, ng-eNB, en-gNB, etc., or component thereof) in a wireless network (e.g., E-UTRAN, NG-RAN).

These exemplary methods can include transmitting, to the UE, one or more conditional reconfigurations Each conditional reconfiguration can include a reconfiguration message associated with a candidate target cell and one or more execution conditions that need to be fulfilled for the UE to apply the reconfiguration message when performing a mobility operation. The execution conditions include at least one first execution condition related to UE data traffic and/or to one or more UE applications.

In some embodiments, these exemplary methods can also include monitoring for first execution conditions related to UE DL data traffic and based on detecting fulfillment of at least one first execution condition related to UE DL data traffic, sending to the UE an indication that the at least one first execution condition related to UE DL data traffic has been fulfilled. In various embodiments, the indication can be sent as a MAC CE, an RRC message, or DCI. In some embodiments, the indication can include an identifier of the particular conditional reconfiguration whose at least one first measurement condition related to UE DL data traffic has been fulfilled.

In various embodiments, the first execution conditions, included in the respective conditional reconfigurations, can include any of the criteria discussed above in relation to UE embodiments. In some embodiments, the one or more execution conditions, included in each conditional measurement configuration, can also include at least one second execution condition related to measurements of the UE's serving cell and/or of respective candidate target cells. These second execution conditions can include any of those discussed above in relation to UE embodiments.

In some embodiments, a particular one of the conditional reconfigurations requires fulfillment of both a first measurement condition and a second measurement condition for the UE to apply the reconfiguration message included in the particular conditional reconfiguration. In other embodiments, a particular one of the conditional reconfigurations requires fulfillment of either a first measurement condition or a second measurement condition for the UE to apply the reconfiguration message included in the particular conditional reconfiguration.

In some embodiments, a particular one of the conditional reconfigurations requires fulfillment of a second measurement condition after fulfillment of a first measurement condition for the UE to apply the reconfiguration message included in the particular conditional configuration. In other embodiments, a particular one of the conditional reconfigurations requires fulfillment of a first measurement condition after fulfillment of a second measurement condition for the UE to apply the reconfiguration message included in the particular conditional configuration.

In some embodiments, the mobility operation associated with each conditional reconfiguration is one of the following: SCG activation, SCG suspension, handover or PCell change, PSCell addition, PSCell release, or reconfiguration with sync. In various embodiments, the network node can be operating in one of the following modes with respect to the UE: single connectivity, dual connectivity where the network node is a MN, or dual connectivity where the network node is a SN.

Other embodiments include UEs (e.g., wireless devices, IoT devices, etc. or component(s) thereof) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments can facilitate changing a UE's configuration based on the UE's traffic demands using the conditional reconfiguration framework, e.g., adding an SCG when the data volume increases, releasing an SCG when the data volume decreases, etc. Instead of the network reactively sending a reconfiguration message based on UE reports on UL data buffer and network measurements of DL traffic, a UE can be pre-configured with the relevant reconfiguration(s) and can apply them based on changes in UE traffic demands. Accordingly, the amount of UE-network signaling is reduced, as well as delays in mobility operations present in conventional reactive techniques.

These and other objects, features, and advantages of embodiments of the present disclosure will become apparent upon reading the following Detailed Description in view of the Drawings briefly described below.

BRIEF DESCRIPTION OF THE DRAWINGS

FIGS. 21-24 show various exemplary ASN.1 data structures for RRC information elements (IEs), according to various exemplary embodiments of the present disclosure.

FIGS. 32-35 are flow diagrams of exemplary methods (e.g., procedures) for transmission and/or reception of user data, according to various exemplary embodiments of the present disclosure.

DETAILED DESCRIPTION

Figure 2:
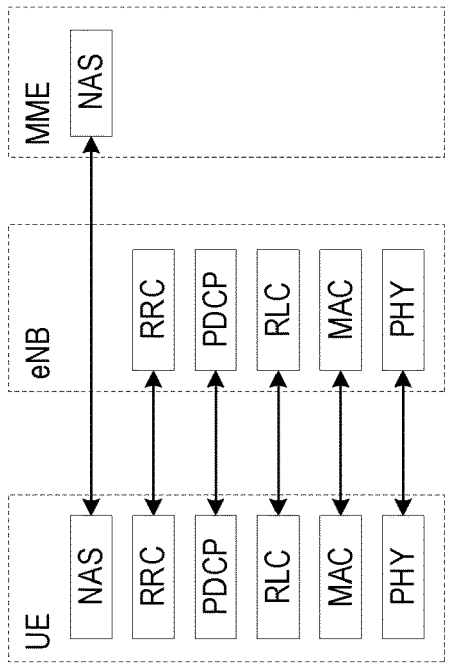
FIG. 2 is a block diagram of an exemplary control plane (CP) protocol stack between a user equipment (UE), an eNB in the E-UTRAN, and an MME in the EPC.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, conditional handover (CHO) and SN-initiated intra-SN conditional PSCell change (CPC) procedures were specified in 3GPP Rel-16. It is expected that 3GPP Rel-17 will include support for other conditional mobility procedures such as conditional PSCell addition, inter-SN CPC (SN or MN initiated), and MN-initiated intra-SN CPC. Current conditional mobility execution conditions are only based on UE signal measurements, which can cause various problems, issues, and/or difficulties for these new scenarios. This is discussed in more detail below, after the following discussion of NR network architecture and various dual connectivity (DC) aspects.

In DC, the UE is configured with a Master Cell Group (MCG) associated with the MN and a Secondary Cell Group (SCG) associated with the SN. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

The MN provides system information (SI) and terminates the control plane connection towards the UE and, as such, is the controlling node of the UE, including handovers to and from SNs. In LTE DC, for example, the MN terminates the connection between the eNB and the Mobility Management Entity (MME) for the UE. An SN provides additional radio resources (e.g., bearers) for radio resource bearers include MCG bearers, SCG bearers, and split bearers that have resources from both MCG and SCG. The reconfiguration, addition, and removal of SCells can be performed by RRC. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

Figure 3:
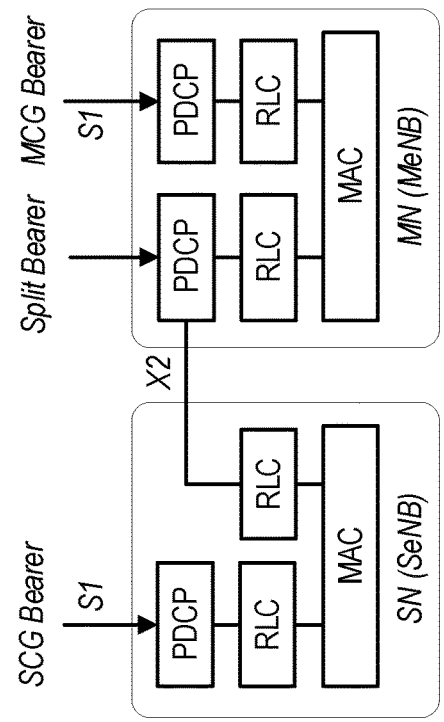
FIGS. 3-4 illustrate various aspects of dual connectivity (DC) in an LTE network.
Figure 4A:
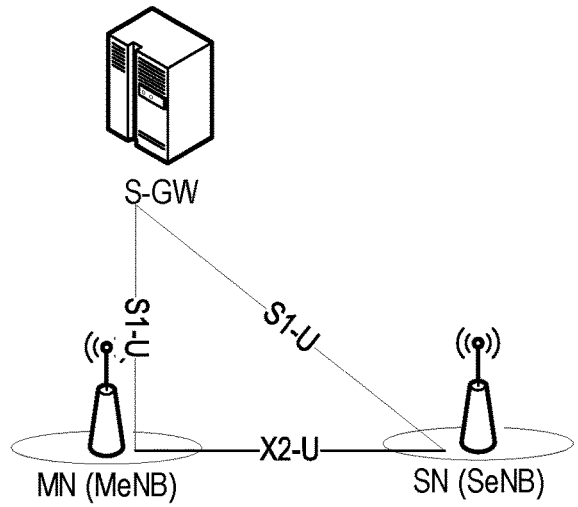

FIG. 3 shows an aggregated user plane (UP) protocol stack for LTE DC, while FIG. 4A shows the inter-eNB connectivity for the LTE DC UP. The UP aggregation shown in FIG. 3 achieves benefits such as increasing the throughput for users with good channel conditions and the capability of receiving and transmitting at higher data rates than can be supported by a single node, even without a low-latency backhaul connection between MeNB/MN and SeNB/SN.

As shown in FIG. 3, the LTE DC UP includes three different types of bearers. MCG bearers are terminated in the MN, and the S1-U connection for the corresponding bearer (s) to the S-GW is terminated in the MN (shown in FIG. 4A). The SN is not involved in the transport of UP data for MCG bearers. Likewise, SCG bearers are terminated in the SN, which can be directly connected with the S-GW via S1-U (as shown in FIG. 4A). The MN is not involved in the transport of UP data for SCG bearers. An S1-U connection between S-GW and SN is only present if SCG bearers are configured. Finally, split bearers are also terminated in the MN, with PDCP data being transferred between MN and SN via X2-U interface (shown in FIG. 4A). Both SN and MN are involved in transmitting data for split bearers.

Figure 4B:
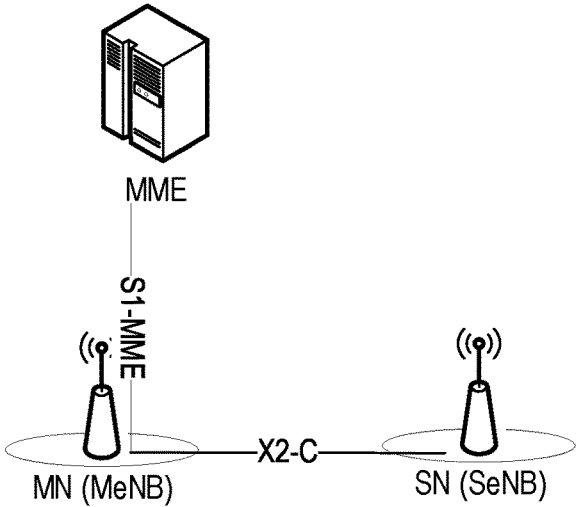

FIG. 4B shows the inter-eNB CP connectivity for LTE DC. In this arrangement, all MME signaling is carried over the MeNB's S1-MME interface to the MME, with the SeNB's signaling also carried over the X2-C interface with the MeNB. The network's RRC connection with the UE is handled only by the MeNB, such that SRBs are always configured as MCG bearer type and only use radio resources of the MeNB. However, the MeNB can also configure the UE based on input from the SeNB and, in this manner, the SeNB can indirectly control the UE.

Figure 5:
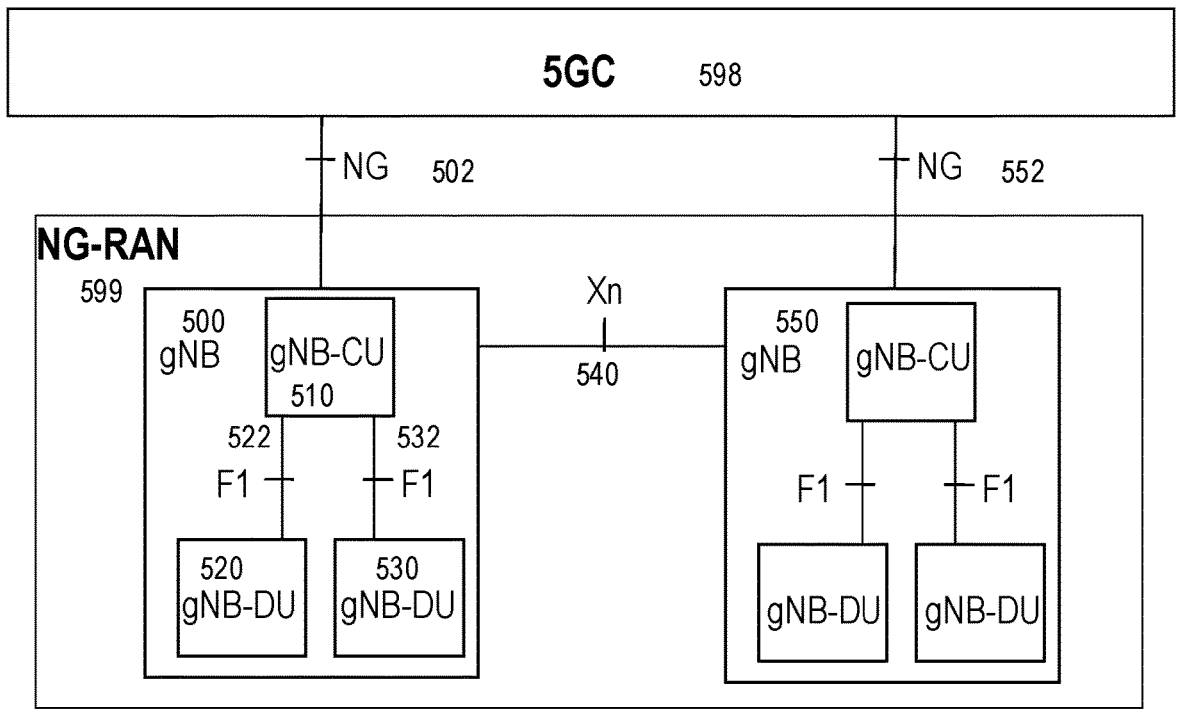
FIG. 5 shows a high-level views of an exemplary 5G network architecture.

FIG. 5 illustrates a high-level view of the 5G network architecture, consisting of a Next Generation RAN (NG-RAN) 599 and a 5G Core (5GC) 598. NG-RAN 599 can include a set of gNodeB's (gNBs) connected to the 5GC via one or more NG interfaces, such as gNBs 500, 550 connected via interfaces 502, 552, respectively. In addition, the gNBs can be connected to each other via one or more Xn interfaces, such as Xn interface 540 between gNBs 500 and 550. With respect the NR interface to UEs, each of the gNBs can support frequency division duplexing (FDD), time division duplexing (TDD), or a combination thereof.

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501 (v16.4.0). If security protection for CP and UP data on TNL of NG-RAN interfaces is supported, NDS/IP shall be applied.

The NG RAN logical nodes shown in FIG. 5 include a central (or centralized) unit (CU or gNB-CU) and one or more distributed (or decentralized) units (DU or gNB-DU). For example, gNB 500 includes gNB-CU 510 and gNB-DUs 520 and 530. CUs (e.g., gNB-CU 510) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 522 and 532 shown in FIG. 5. The gNB-CU and connected gNB-DUs are only visible to other gNBs and the 5GC as a gNB. In other words, the F1 interface is not visible beyond gNB-CU. In the gNB split CU-DU architecture illustrated by FIG. 4, DC can be achieved by allowing a UE to connect to multiple DUs served by the same CU or by allowing a UE to connect to multiple DUs served by different CUs.

DC is also envisioned as an important feature for 5G/NR networks. 3GPP TR 38.804 (v14.0.0) describes various exemplary dual-connectivity (DC) scenarios or configurations in which the MN and SN can apply either NR RAT, LTE RAT, or both, and can connect to either EPC or 5GC. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR and connect to 5GC via NG.

MR-DC (multi-RAT DC): a generalization of the Intra-E-UTRA Dual Connectivity (DC) described in 3GPP TS 36.300 (v16.0.0), where a multiple Rx/Tx UE may be configured to utilize resources provided by two different nodes connected via non-ideal backhaul, one providing E-UTRA access and the other one providing NR access. One node acts as the MN and the other as the SN, with one using LTE and the other using NR. The MN and SN are connected via a network interface and at least the MN is connected to the core network. EN-DC, NE-DC, and NGEN-DC are different example cases of MR-DC.

Figure 6:
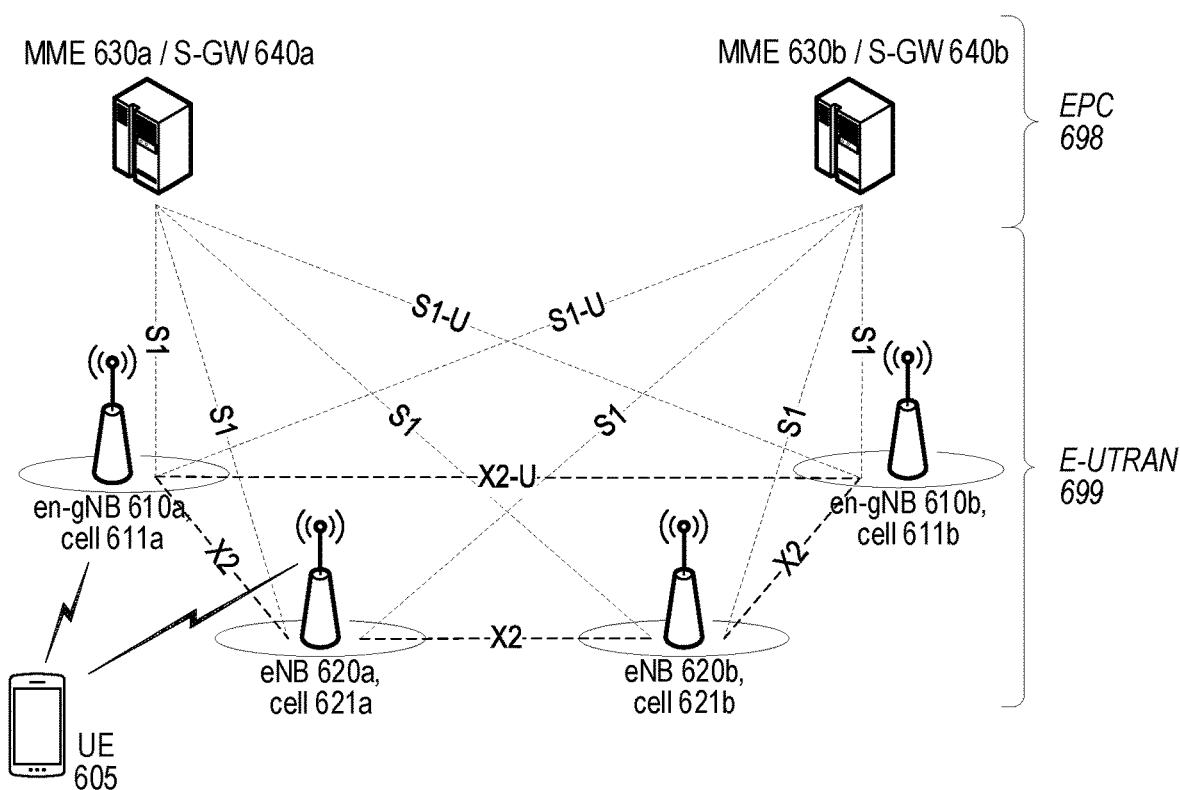
FIGS. 6-7 show high-level views of exemplary network architectures that support multi-RAT DC (MR-DC) using EPC and 5GC, respectively.

FIG. 6 shows a high-level view of an exemplary network architecture that supports EN-DC, including an E-UTRAN 699 and an EPC 698. As shown in the figure, E-UTRAN 699 can include en-gNBs 610 (e.g., 610a,b) and eNBs 620 (e.g., 620a,b) that are interconnected with each other via respective X2 (or X2-U) interfaces. The eNBs 620 can be similar to those shown in FIG. 1, while the ng-eNBs can be similar to the gNBs shown in FIG. 5 except that they connect to EPC 698 via an S1-U interface rather than to a 5GC via an X2 interface. The eNBs also connect to EPC 698 via an S1 interface, similar to the arrangement shown in FIG. 1. More specifically, en-gNBs 610 (e.g., 610a,b) and eNBs 620 (e.g., 620a,b) connect to MMEs (e.g., MMEs 630a,b) and S-GWs (e.g., S-GWs 640a,b) in EPC 698.

Each of the en-gNBs and eNBs can serve a geographic coverage area including one more cells, including cells 611a-b and 621a-b shown as exemplary in FIG. 6. Depending on the particular cell in which it is located, a UE 605 can communicate with the en-gNB or eNB serving that particular cell via the NR or LTE radio interface, respectively. In addition, UE 605 can be in EN-DC connectivity with a first cell served by an eNB and a second cell served by an en-gNB, such as cells 620a and 610a shown in FIG. 6.

Figure 7:
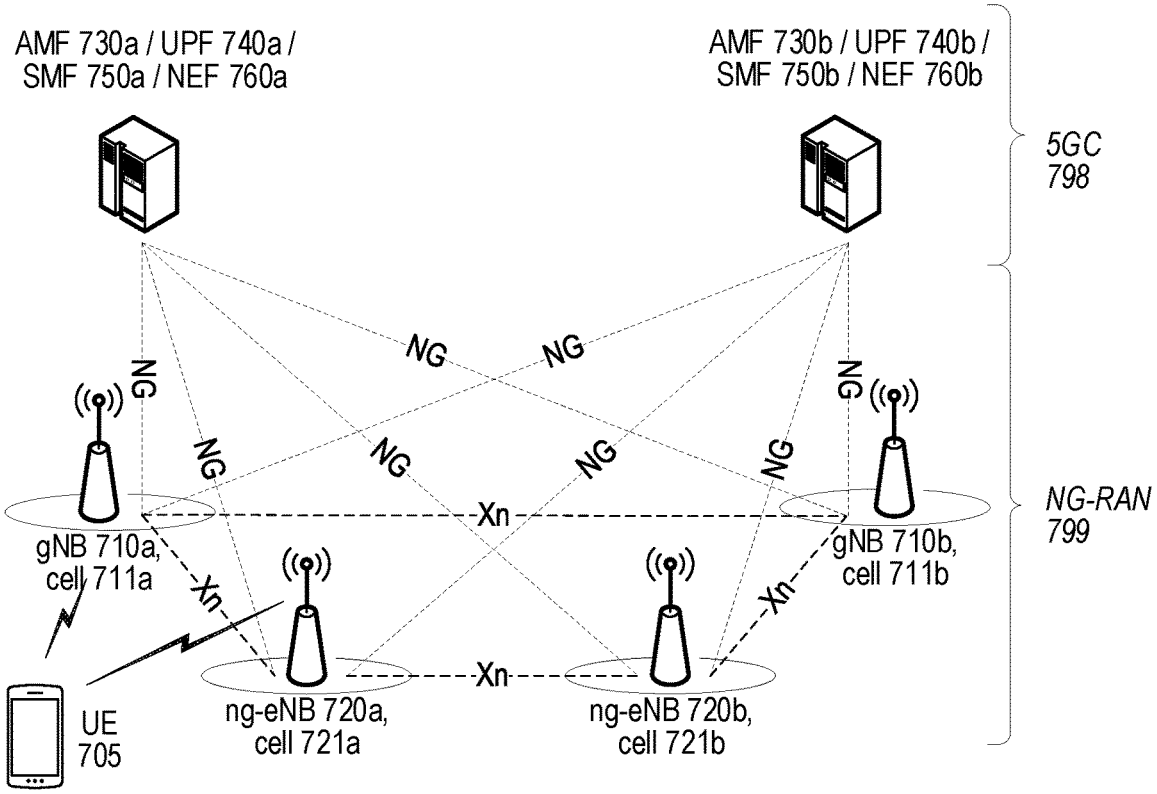

FIG. 7 shows a high-level view of an exemplary network architecture that supports MR-DC configurations based on a 5GC. More specifically, FIG. 7 shows an NG-RAN 799 and a 5GC 798. NG-RAN 799 can include gNBs 710 (e.g., 710a,b) and ng-eNBs 720 (e.g., 720a,b) that are interconnected with each other via respective Xn interfaces. The gNBs and ng-eNBs are also connected via the NG interfaces to 5GC 798, more specifically to the AMF (Access and Mobility Management Function) 730 (e.g., AMFs 730a,b) via respective NG-C interfaces and to the UPF (User Plane Function) 740 (e.g., UPFs 740a,b) via respective NG-U interfaces. Moreover, the AMFs 730a,b can communicate with one or more session management functions (SMFs, e.g., SMFs 750a,b) and network exposure functions (NEFs, e.g., NEFs 760a,b).

Figure 1:
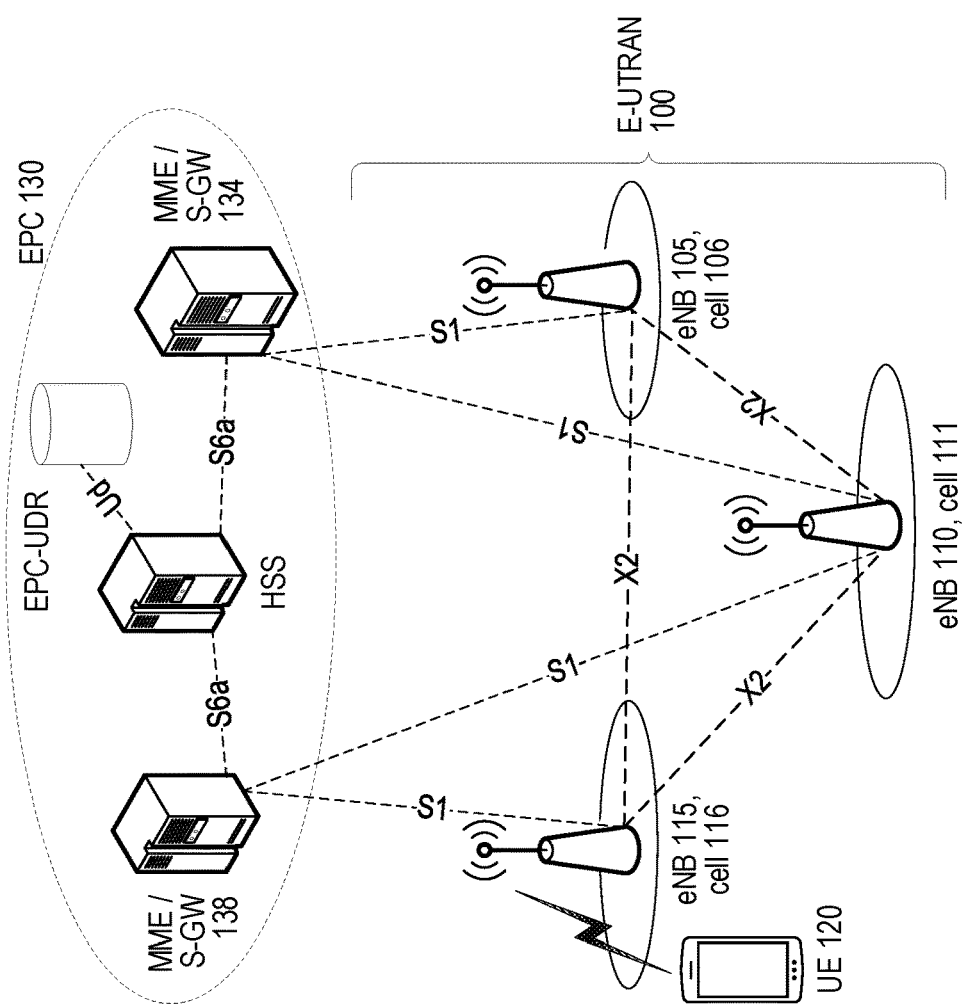
FIG. 1 is a high-level block diagram of an exemplary architecture of LTE Evolved UTRAN (E-UTRAN) and Evolved Packet Core (EPC) network, as standardized by 3GPP.

Each of the gNBs 710 can be similar to those shown in FIG. 5, while each of the ng-eNBs can be similar to the eNBs shown in FIG. 1 except that they connect to 5GC 798 via an NG interface rather than to EPC via an S1 interface. Each of the gNBs and ng-eNBs can serve a geographic coverage area including one more cells, including cells 711a-b and 721a-b shown as exemplary in FIG. 7. The gNBs and ng-eNBs can also use various directional beams to provide coverage in the respective cells. Depending on the particular cell in which it is located, a UE 705 can communicate with the gNB or ng-eNB serving that particular cell via the NR or LTE radio interface, respectively. In addition, UE 705 can be in MR-DC connectivity with a first cell served by an ng-eNB and a second cell served by a gNB, such as cells 720a and 710a shown in FIG. 7.

Figure 8:
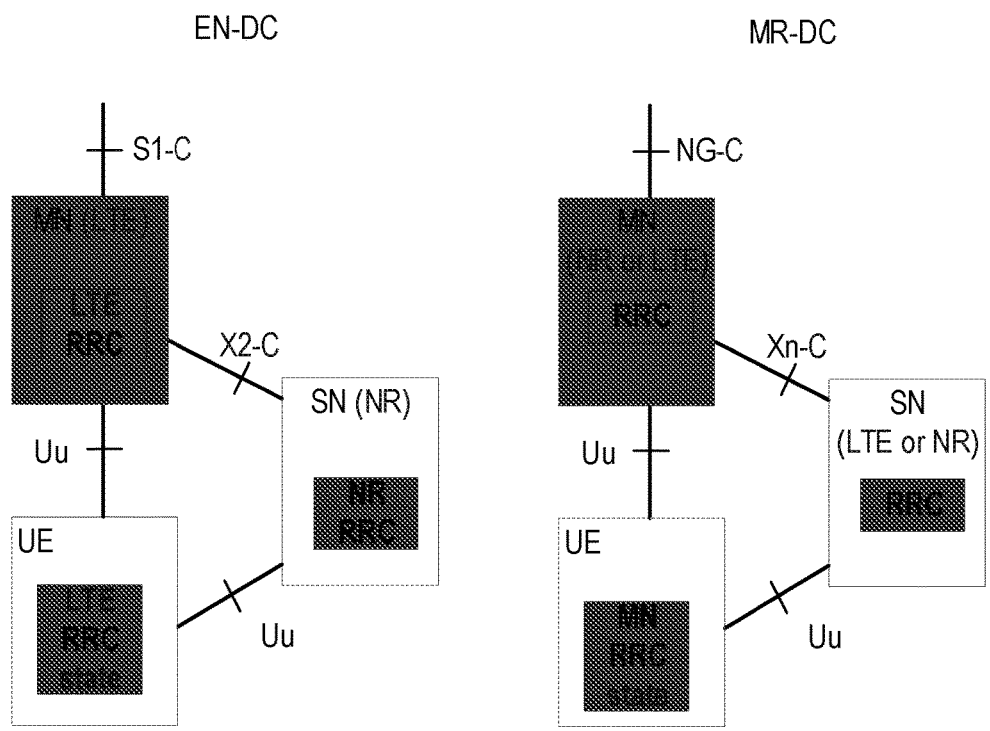
FIG. 8 is a block diagram showing a high-level comparison of control plane (CP) architectures of two DC alternatives, EN-DC with EPC and MR-DC with 5GC, respectively.

FIG. 8 is a block diagram showing a high-level comparison of control plane (CP) architectures in EN-DC with EPC (e.g., FIG. 6) and MR-DC with 5GC (e.g., FIG. 7). The particular RATs used by MN and SN in these two architectures are shown in parentheses and discussed in more detail above. In either case, the UE has a single RRC state based on the MN RRC (LTE or NR) and a single CP connection towards the CN via Uu interface to MN and S1-C or NG-C interface to CN, as the case may be. RRC PDUs generated by the SN can be transported via the X2-C or Xn-C interface to the MN (as the case may be) and the Uu interface from MN to UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

As shown in FIG. 8, each of MN and SN has an RRC entity for creating RRC Information Elements (IE) and messages for configuring the UE. Since the SN is responsible for its own resources, it provides the UE with the SCG configuration in an RRC message and also the radio bearer configuration in an IE, for all bearers that are terminated in the SN. The MN in turn creates the MCG configuration and the radio bearer configuration for all bearers terminated in the MN. The cell group configuration includes the configuration of L1 (physical layer), MAC and RLC. The radio bearer configuration includes the configuration of PDCP (and SDAP in case of 5GC).

Figure 9:
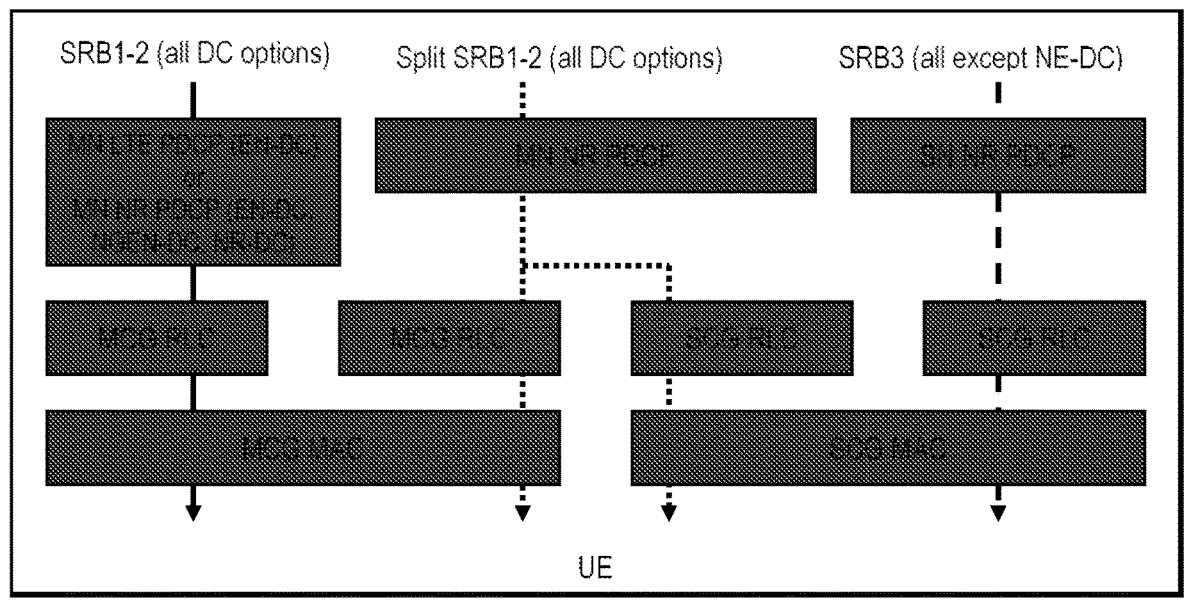
FIG. 9 shows exemplary network-side protocol termination options for signaling radio bearers (SRBs) in MR-DC.

FIG. 9 shows exemplary network-side protocol termination options for SRBs in MR-DC, including EN-DC with EPC. The MN sends the initial SN RRC configuration via MCG SRB (SRB1), but subsequent RRC configurations created by the SN can be sent to the UE either via the MN using SRB1 or directly to the UE using SRB3 (if configured) . For the SRB1 case, the MN receives from the SN an RRC message containing the SCG configuration and an IE containing the radio bearer configuration. The MN encapsulates these into the RRC message it creates itself, that may also include changes to the MCG configuration and radio bearer configuration of bearers terminated in the MN. Thereby, the MCG and SCG configurations may be sent to the ULE in the same RRC message.

For E-UTRAN (e.g., eNB) connected to EPC, SRB1 uses E-UTRA PDCP at initial connection establishment. If the UE supports EN-DC (regardless of whether EN-DC is configured), after initial connection establishment the network can configure both MCG SRB1 and SRB2 to use either E-UTRA PDCP or NR PDCP. Change from E-UTRA PDCP to NR PDCP (or vice-versa) is supported via a handover procedure (e.g., reconfiguration with mobility) or, for the initial change of SRB1 from E-UTRA PDCP to NR PDCP, with a reconfiguration without mobility before the initial security activation.

If the SN is a gNB (i.e., for EN-DC, NGEN-DC, and NR-DC), the UE can be configured to establish SRB3 with the SN to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured.

Split SRB uses the NR PDCP layer and is supported for all MR-DC options, allowing duplication of RRC PDUs generated by the MN. For example, split SRB1 can be used to create diversity. From RRC point of view, it operates like normal SRB1 but on the PDCP layer, the sender can choose to send an RRC message via MN (MCG), via SN (SCG), or duplicated via MCG and SCG. In the DL, the path switching between MCG, SCG, or duplication is left to network implementation while the network configures UEs to use the MCG, SCG, or duplication in the UL. Subsequently, the terms "link", "leg", "path", and "RLC bearer" are used interchangeably to refer to UE-MN and UE-SN communications.

Figure 10:
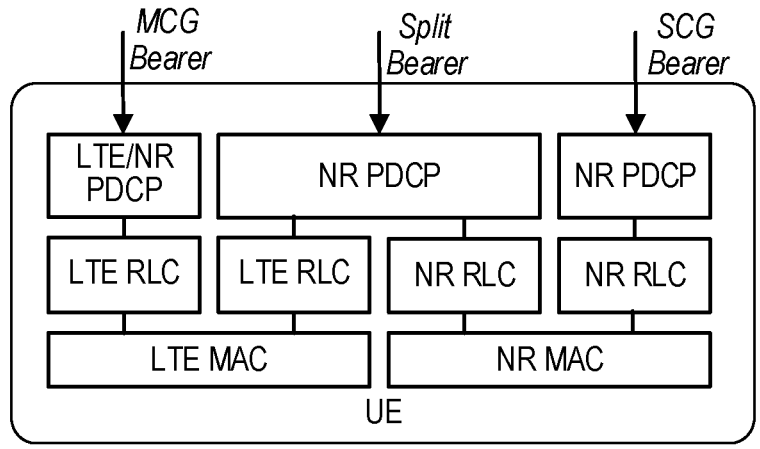
FIGS. 10-11 show user plane (UP) radio protocol architectures from a UE perspective for EN-DC with EPC and MR-DC with 5GC, respectively.
Figure 11:
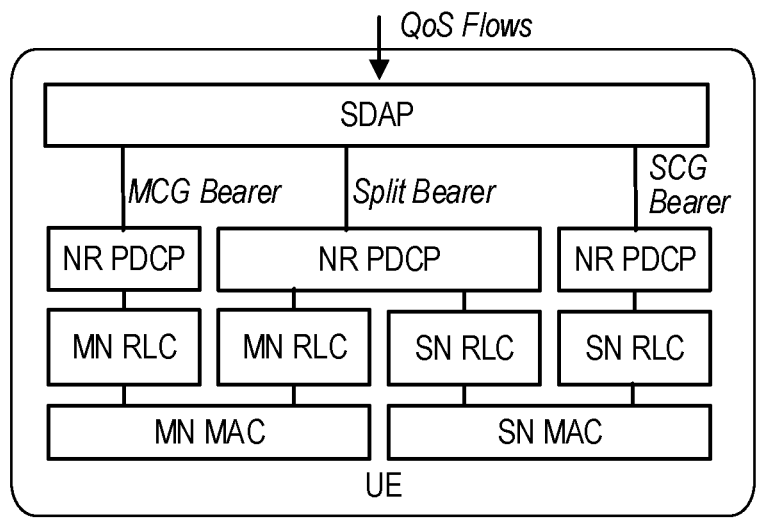

FIGS. 10-11 show UP radio protocol architectures from a UE perspective for MR-DC with EPC (e.g., EN-DC) and with 5GC (e.g., NGEN-DC, NE-DC, and NR-DC), respectively. In both cases, a UE supports MCG, SCG, and split bearers, as discussed above. In the EN-DC arrangement shown in FIG. 10, MCG bearers have either LTE (e.g., E-UTRA) or NR PDCP and LTE RLC and MAC layers, while SCG bearers have NR PDCP, RLC, and MAC layers. Split bearers have NR PDCP layer and both LTE and NR RLC and MAC layers. In the arrangement shown in FIG. 11, all bearers have NR PDCP layers and lower layers corresponding to the RAT used by the MN and SN. One difference between the architectures in FIGS. 10-11 is that the various bearers for MR-DC with 5GC are associated with QoS flows that are terminated in an SDAP layer above PDCP.

Figure 12:
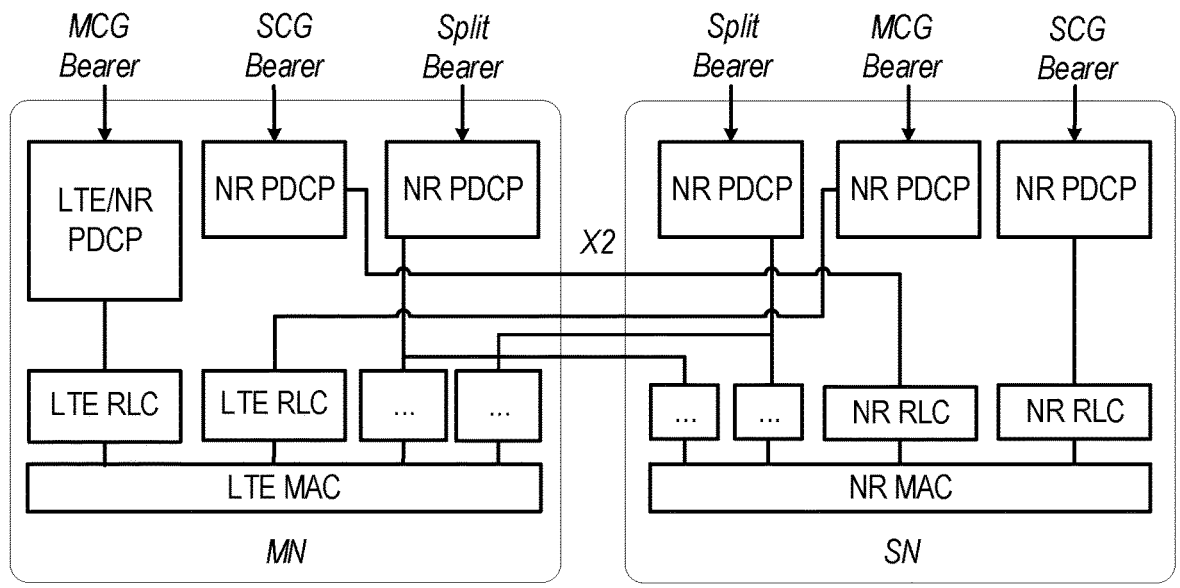
FIGS. 12-13 show UP radio protocol architectures from a network perspective for EN-DC with EPC and MR-DC with 5GC, respectively.
Figure 13:
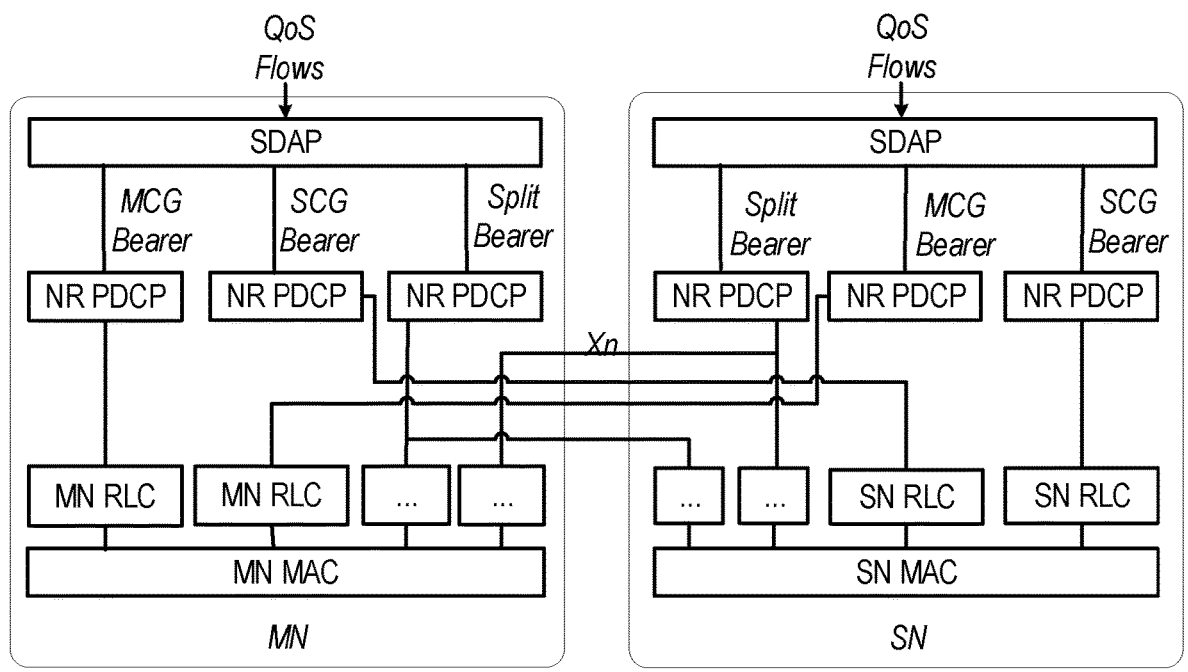

FIGS. 12-13 show UP radio protocol architectures from a network perspective for MR-DC with EPC (e.g., EN-DC) and with 5GC (e.g., NGEN-DC, NE-DC, and NR-DC), respectively. In the EN-DC arrangement shown in FIG. 12, an MCG bearer terminated in MN has PDCP layer of the RAT used by the MN, while all other bearers have NR PDCP layer. All bearers have lower layers associated with the RAT of the node(s) in which they are terminated. In the arrangement shown in FIG. 13, all bearers have NR PDCP layers and lower layers associated with the RAT of the node(s) in which they are terminated. From a network perspective, each MCG, SCG, or and split bearer can be terminated either in MN or in SN. For example, the X2 or Xn interface between the nodes will carry traffic for SCG or split bearers terminated in MN PDCP layer to lower layers in SN. Likewise, X2 or Xn will carry traffic for MCG or split bearers terminated in SN PDCP layer to lower layers in MN. One difference between the architectures in FIGS. 12-13 is that the various bearers for MR-DC with 5GC are associated with QoS flows that are terminated in an SDAP layer above PDCP.

Figure 14:
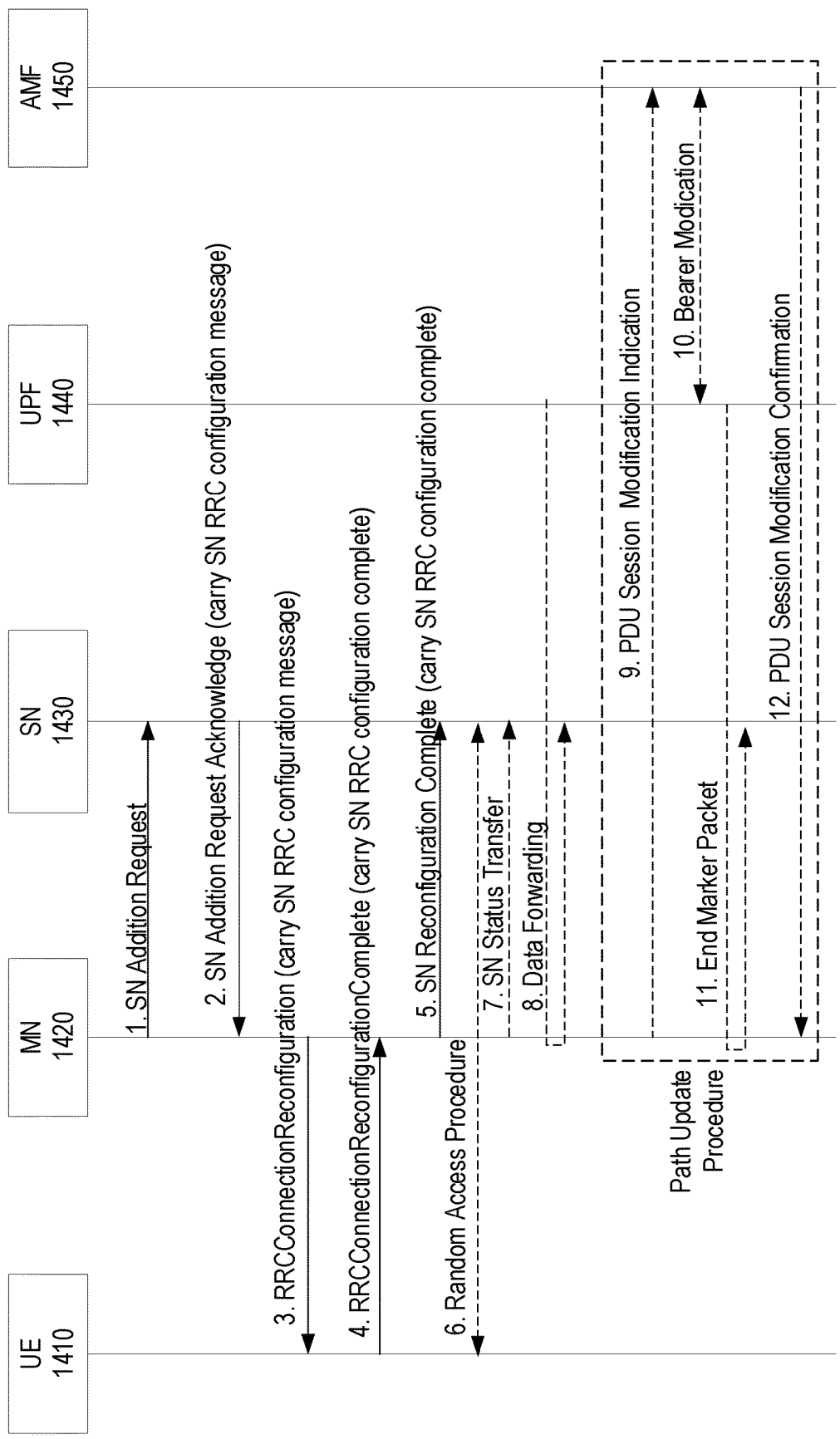
FIG. 14 illustrates an exemplary secondary node (SN) Addition procedure for MR-DC utilizing a 5GC.

An SN Addition procedure is initiated by the MN and is used to establish a UE context at the SN in order to provide radio resources from the SN to the UE. For bearers requiring SCG radio resources, this procedure is used to add at least the initial SCG serving cell of the SCG. This procedure can also be used to configure an SN terminated MCG bearer (where no SCG configuration is needed). FIG. 14 illustrates an exemplary SN Addition procedure for MR-DC cases utilizing a 5GC. As shown in FIG. 14, the procedure involves a UE (1410), a MN (1420), an SN (1430), a user plane function (UPF, 1440), and an access and mobility management function (AMF, 1450). The UPF and AMF are functions in the 5GC.

The SN Addition procedure shown in FIG. 14 is initiated by the MN and is used to establish a UE context at the SN to facilitate the SN providing radio resources to the UE. For bearers requiring SCG radio resources, this procedure can be used to add at least the initial SCG serving cell of the SCG. This procedure can also be used to configure an SN-terminated MCG bearer (where no SCG configuration is needed). The operations shown in FIG. 14 are labelled numerically, but this numbering is used only to facilitate clarity in the following description, and the order of the various operations can be rearranged in certain embodiments. Dashed lines indicate optional operations that may depend on one or more conditions.

In operation 1, the MN decides to request the target SN to allocate radio resources for one or more specific PDU Sessions/QoS Flows, indicating QoS Flows characteristics (QoS Flow Level QoS parameters, PDU session level transport network layer (TNL) address information, and PDU session level Network Slice info). For example, the TNL address information can include a GPRS Tunneling Protocol (GTP) Tunnel Endpoint Identifier (TEID) and a TNL Internet Protocol (IP) address, such as defined in 3GPP TS 38.423. This TNL address information generally identifies a "tunnel." Accordingly, in the following description, the terms "tunnel information," "tunnel identifier(s)," and "TNL address information" are used interchangeably.

In addition, for bearers requiring SCG radio resources, MN indicates the requested SCG configuration information, including the entire UE capabilities and the UE capability coordination result. In this case, the MN also provides the latest measurement results for the SN to use when choosing and configuring the SCG cell(s). The MN can also request the SN to allocate radio resources for split SRB operation. The MN can also provide the needed security information to the SN (e.g., even if no SN-terminated bearers are setup) to enable SRB3 to be setup based on SN decision. For bearer options that require Xn-U resources between the MN and the SN, MN can also provide Xn-U TNL address information, e.g., Xn-U DL TNL address information for SN-terminated bearers and Xn-U UL TNL address information for MN terminated bearers. The SN may reject the request.

In operation 2, if the RRM entity in the SN is able to admit the resource request, it allocates respective radio resources and, dependent on the bearer type options, respective transport network resources. For bearers requiring SCG radio resources the SN triggers UE Random Access so that synchronization of the SN radio resource configuration can be performed. The SN decides the PScell and other SCG SCells and provides the new SCG radio resource configuration to the MN in a SN RRC configuration message contained in the SN Addition Request Acknowledge message. In case of bearer options that require Xn-U resources between the MN and the SN, the SN provides Xn-U TNL address information for the respective E-RAB, Xn-U UL TNL address information for SN-terminated bearers, Xn-U DL TNL address information for MN terminated bearers.

For SN-terminated bearers, the SN provides the NG-U DL TNL address information for the respective PDU Session and security algorithm. If SCG radio resources have been requested, the SCG radio resource configuration is provided.

In operation 3, the MN sends the MN RRC reconfiguration message to the UE including the SN RRC configuration message, preferably without modifying it. In operation 4, the UE applies the new configuration and replies to MN with MN RRC reconfiguration complete message, including a SN RRC response message for SN, if needed. In case the UE is unable to comply with (part of) the configuration included in the MN RRC reconfiguration message, it performs the reconfiguration failure procedure. In operation 5, the MN informs the SN that the UE has completed the reconfiguration procedure successfully via SN Reconfiguration Complete message, including the encoded SN RRC response message, if received from the UE.

In operation 6, if configured with bearers requiring SCG radio resources, the UE performs synchronization towards the PSCell configured by the SN. The order the UE sends the MN RRC reconfiguration complete message and performs the Random-Access procedure towards the SCG is not defined. The successful RA procedure towards the SCG is not required for a successful completion of the RRC Connection Reconfiguration procedure. In operation 7, in case of SN-terminated bearers using RLC AM, the MN sends SN Status Transfer to the SN.

In operation 8, in case of SN-terminated bearers using RLC AM, and dependent on the bearer characteristics of the respective QoS Flows, the MN may take actions to minimize service interruption due to activation of MR-DC (Data forwarding). In operations 9-12, for SN-terminated bearers, the update of the UP path towards the 5GC is performed via PDU Session Path Update procedure.

In the SN-Addition Request message (operation 1), the MN provides the list of the UE's QoS flows/bearers that it wants to be handled by the SN (e.g., either as SN-terminated flows or MN-terminated bearers) in the PDU session resources to be added List IE (Information element), along with the PDU Session Resource Setup Info—SN terminated and PDU Session Resource Setup Info—MN terminated IEs that are part of it.

In the PDU Session Resource Setup Info—SN terminated IE, the MN provides a list of the QoS flows that it wants the SN to setup (i.e., SN-terminated) and also provides an "Offered GBR QoSFlow information", which is an indication to the SN that it can add this flow as part of a split bearer and how many resources the MN is willing to provide for this flow (whereas it is up to the SN whether or not to use the indicated resources). The UL NG-U UP TNL Information at UPF IE is sent also to the SN to provide the tunnel information for sending the UL data to the core network.

Note that the information in the PDU Session Resource Setup Info—SN terminated IE) is communicated at QoS flow level. For example, the MN provides a list of QoS flows to the SN, which can decide how many radio resources (e.g., DRBs) to establish to serve these QoS flows. The MN doesn't know in advance how many bearers the SN will group the QoS flow into. For example, there can be 10 QoS flows in the list, and the SN can decide to have just two bearers, each aggregating 5 QoS flows. Consequently, the tunnel information is not provided in the PDU Session Resource Setup Info—SN terminated IE, since when sending the SN Addition Request, the MN does not know how many DRBs the SN will establish and therefore it does not know how many tunnels are required.

In the PDU Session Resource Setup Info—MN terminated IE, the MN can provide a list of the bearers that it wants SN to setup, but only for MN terminated bearers (i.e., MCG split bearer). The MN can also provide the MN UL PDCP UP TNL Information for each bearer, which is the tunnel information to be used by the SN to forward UL data of MCG split bearers towards the MN. In contrast to the SN-terminated setup, the information in the PDU Session Resource Setup Info—MN terminated IE is at the bearer level. This is because, in this case, the MN decides how many DRBs to establish for serving the QoS flows. Therefore, it can directly provide the uplink tunnel information in the SN Addition Request message that can be used to establish the required tunnels.

In the SN-Addition Request Acknowledge message (operation 2), the SN can provide the list of the QoS flows/bearers that it has admitted (either as SCG bearers, SCG split bearers or MCG split bearers) in the PDU session resources admitted to be added List IE, along with the PDU Session Resource Setup Response Info—SN terminated and PDU Session Resource Setup Response Info—MN terminated IES that are part of it.

In the PDU Session Resource Setup Response Info—SN terminated IE, the SN provides a list of the QoS flows that has admitted (grouped in the bearers that it has associated them with). If the SN has used the resources, if any, indicated by the MN (as provided in the Offered GBR QoSFlow information as discussed above), the SN indicates the amount of resources that the MN should provide in MCG requested GBR QoSFlow Information. This amount should be less than or equal to the Offered GBR QoS Flow information). The NG-UDL UP TNL Information at NG-RAN IE provides the tunnel information for sending the DL data from the core network. This information can be further forwarded from the MN to the CN later, so that both the tunnel end points are properly set for that PDU session in both the UL and DL directions.

In the PDU Session Resource Setup Info—MN terminated IE, the SN provides a list of the bearers that it has admitted (i.e., MCG split bearers) along with the S-Node DL SCG UP TNL Information, which is the tunnel information that the MN has to use to send data of MCG split bearers in the DL.

An SN Modification procedure may be initiated either by the MN or by the SN and can be used to modify, establish, or release bearer contexts; transfer bearer contexts to and from the SN; or to modify other properties of the UE context within the same SN. The procedure may also be used to transfer an NR RRC message from the SN to the UE via the MN, and the response from the UE via MN to the SN (e.g., when SRB3 is not used). Other possible include trigger PSCell changes (e.g., when a new security key is required or when the MN needs to perform PDCP data recovery). The MN cannot reject the request for release or PDU session/QoS flows. The SN can also use the procedure to request the MN to provide more DRB IDs to be used for SN terminated bearers or to return DRB IDs used for SN terminated bearers that are no longer needed.

Figure 15:
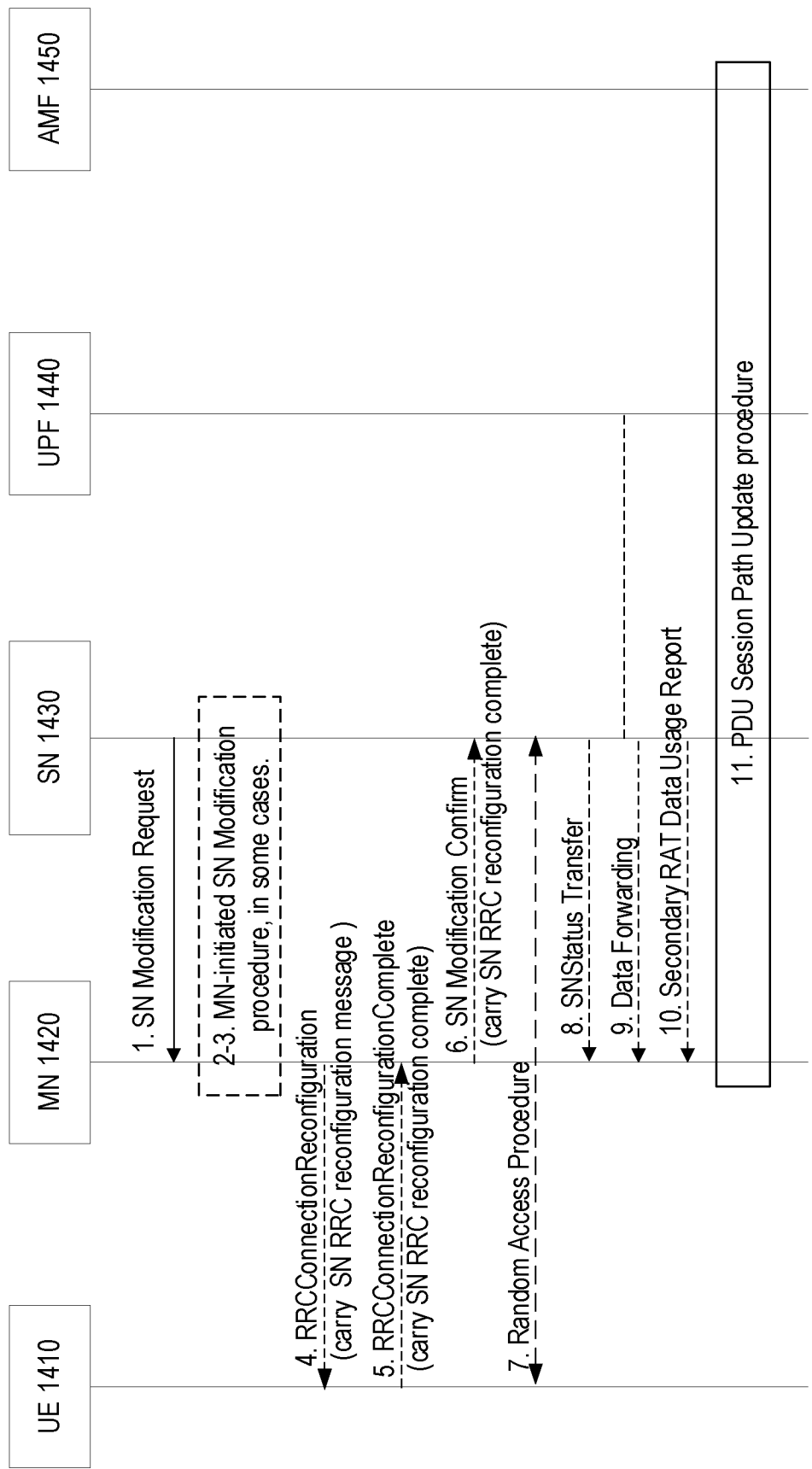
FIG. 15 illustrates an exemplary SN-initiated SN Modification procedure with master node (MN) involvement, for MR-DC utilizing a 5GC.

FIG. 15 illustrates an exemplary SN-initiated SN Modification procedure with MN involvement, for MR-DC utilizing a 5GC. The procedure involves a UE (1410), a MN (1420), an SN (1430), a UPF (1440), and AMF (1450). Each of these entities may be the same as an identically numbered entity in FIG. 14. The operations shown in FIG. 15 are labelled numerically, but this numbering is used only to facilitate clarity in the following description, and the order of the various operations can be rearranged in certain embodiments. Dashed lines indicate optional operations that may depend on one or more conditions.

In operation 1, the SN sends the SN Modification Request message, which can contain user plane resource configuration-related context, other UE context related information, and the new radio resource configuration of the SCG. The SN can decide whether the change of security key is required. In case of change of security key, an included PDCP Change Indication can indicate that an SN security key update is required. In case the MN needs to perform PDCP data recovery, the PDCP Change Indication can indicate that PDCP data recovery is required.

In operations 2-3 (shown as a single block), an MN-initiated SN Modification procedure may be triggered by SN Modification Required message, e.g., when an SN security key change needs to be applied. For SN terminated NR MCG bearers to be setup for which PDCP duplication with CA is configured, the SN allocates two separate Xn-U bearers.

In operation 4, the MN initiates the RRC connection reconfiguration procedure towards the UE, including sending a SN RRC configuration message. The UE applies the received configuration and replies (operation 5) with MN RRC reconfiguration complete message, which includes a SN RRC response message, if needed. In case the UE is unable to comply with (all or part of) the configuration included in the MN RRC reconfiguration message, it performs a reconfiguration failure procedure instead. In operation 6, upon successful completion of the reconfiguration, the MN indicates this success in an SN Modification Confirm message sent to the SN. This message can carry, e.g., a SN RRC reconfiguration complete message.

In operation 7, if instructed, the UE performs synchronization towards the PSCell of the SN as described in SN Addition procedure discussed above. Otherwise, the UE can perform UL transmission after having applied the new configuration. In operation 8, if a PDCP termination point is changed for bearers using RLC acknowledged mod (AM), and if RRC full configuration is not used, the MN sends the SN Status transfer message to the SN. In operation 9, if applicable, data forwarding between MN and the SN takes place, with FIG. 7 illustrating the case where a user plane resource configuration-related context is transferred from the SN to the MN. In operation 10, the SN sends a Secondary RATData Usage Report message to the MN and includes the data volumes delivered to and received from the UE.

In operation 11, a PDU Session Path Update procedure is performed between the MN and the 5GC. This operation corresponds to operations 9-12 shown in FIG. 14.

A UE can be configured by the network to perform measurements of serving and neighbor cells. The network can send the UE a measurement configuration in a unicast RRCReconfiguration (in case of NR) or RRCConnectionReconfiguration (for LTE) message, or as part of broadcast system information (SI). Based on this measurement configuration, the UE performs measurements and reports measurement results in a Measurement Report RRC message. The network then typically uses the measurement reports to trigger handover of the UE to a neighbor cell. Neighbor cell measurements are classified into intra-frequency, inter-frequency, or inter-RAT measurements.

The UE measurements are based on a measurement object included in the measurement configuration. A measurement object includes a carrier frequency (for LTE) or frequency/time location and subcarrier spacing of reference signals (for NR). The measurement object may be refined by specifying a list of cells (e.g., blacklisted cells and/or whitelisted cells) and/or cell-specific offsets. If configured, blacklisted cells are not considered while whitelisted cells are the only ones considered for event evaluation and measurement reporting. If neither blacklisted nor whitelisted cells are configured, the UE considers all detect cells in event evaluation and measurement reporting.

The measurement configuration also includes a reporting configuration, including a reporting criterion used to trigger the report and reporting format that identifies particular quantities to include in the report. The reporting criterion can be either "periodic" or "single event". An exemplary reporting quantity is reference signal received power (RSRP). The measurement configuration also includes a quantity configuration, which defines the measurement filtering configuration used for all event evaluation and related reporting, and for periodical reporting of that measurement.

The measurement configuration also includes a list of measurement identities, each linking one measurement object with one reporting configuration. By configuring multiple measurement identities, it is possible to link more than one measurement object to the same reporting configuration, and/or to link more than one reporting configuration to the same measurement object. A measurement identity that triggered reporting is also included in a UE's measurement report, thereby serving as a reference to the network. Finally, the measurement configuration includes measurement gaps that specify periods during which a UE may perform measurements.

Figure 16:
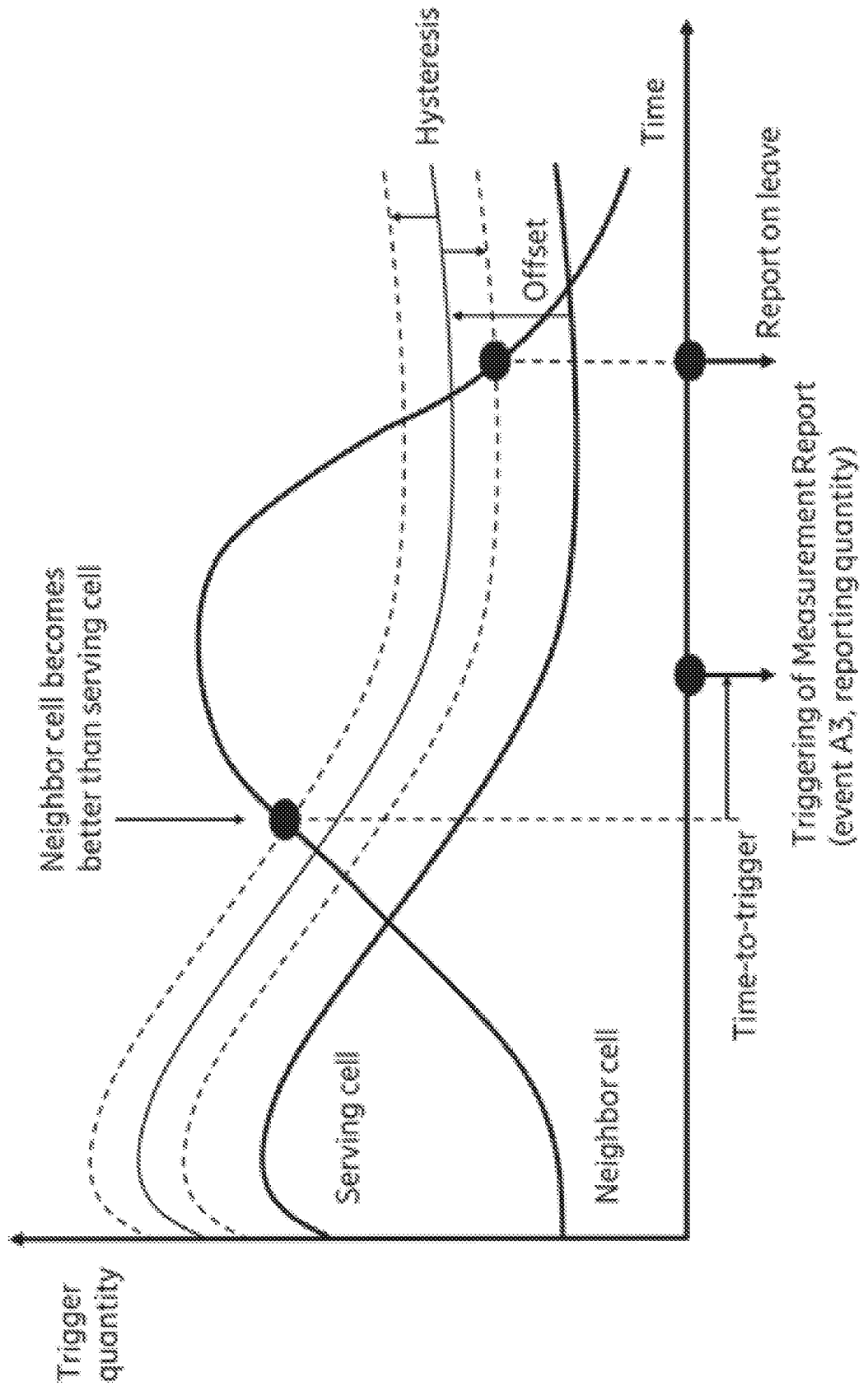
FIGS. 16-17 illustrate two exemplary measurement reporting criteria or events, known respectively as "A3" and "A5".
Figure 17:
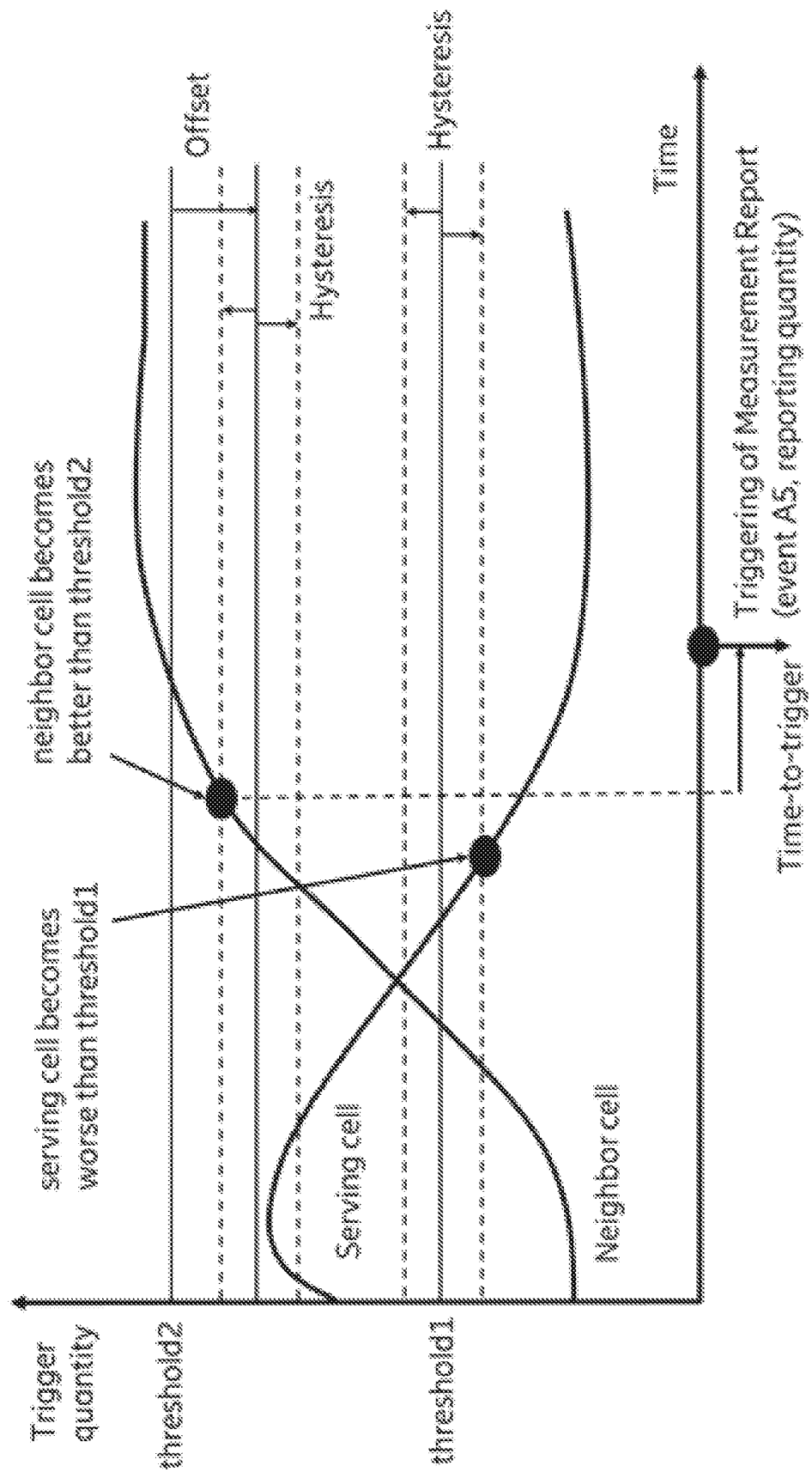

In case of single event reporting criterion, there are a number of event types defined to trigger measurement reports. FIGS. 16-17 illustrate two exemplary measurement reporting criteria or events, known respectively as "A3" and "A5". More specifically, event A3 is specified as "neighbor becomes offset better than SpCell" for LTE and "neighbor becomes offset better than PCell/PSCell" for NR. The cell-specific offset is part of the measurement object corresponding to the particular neighbor cell, discussed above. Likewise, event A4 is specified as "SpCell becomes worse than threshold1 and neighbor becomes better than threshold2" for LTE and "PCell/PSCell becomes worse than threshold1 and neighbor becomes better than threshold2" for NR. The two thresholds are part of the reporting configuration.

A hysteresis may also be included as part of the configuration for A3, A5, and other events. The hysteresis can be used in combination with configuration of "reportOnLeave", where the UE transmits a report when a trigger quantity of a measurement object no longer fulfils a reporting criterion (taking the hysteresis into account). For example, as illustrated in FIG. 15, when using the "reportOnLeave" applied on event A3 for a neighbor cell, the UE transmits a measurement report when the neighbor cell falls below the serving cell plus offset minus the hysteresis. In addition, a time-to-trigger parameter can also be used to further delay the reporting, as shown in FIGS. 16-17.

Handovers are normally triggered when the UE is at the cell edge and is experiencing poor radio conditions. If the UE enters these conditions quickly, the conditions may already be so poor that the actual handover procedure may be hard to execute. Poor UE UL conditions may cause network failure to receive a measurement report transmitted by the UE; without this report, the network will not initiate the handover procedure. Poor UE DL conditions may cause UE failure to receive the handover command from the network (e.g., RRCReconfiguration with a reconfiguration-WithSync field). Failed transmission of handover command is a common reason for unsuccessful handovers. Moreover, even if the command reaches the UE, DL messages are often segmented in poor radio conditions, which can increase the risk of retransmissions and a consequent delay in reaching the UE.

To improve mobility robustness and address the issues above, conditional handover (CHO) was introduced in 3GPP Rel-16. The key idea in CHO is separation of transmission and execution of the handover command. This allows the handover command to be sent to a UE earlier when the radio conditions are still good, thus increasing the likelihood that the message is successfully transferred. The execution of the handover command is done later in time based on an associated execution condition.

The execution condition is typically based on a threshold. For example, a signal strength of candidate target cell becomes X dB better than the serving cell (so called "A3 event"). A preceding measurement reporting event could use a threshold Y that is selected to be lower than X used as the handover execution condition. This allows the serving cell to prepare the handover upon reception of an early measurement report and to provide the RRCConnectionReconfiguration with mobilityControlInfo (for LTE), or a RRCReconfiguration with either a reconfigurationWithSync or a CellGroupConfig (for NR) at a time when the radio link between the source cell and the UE is still relatively stable.

As used herein, a cell for which conditional handover (or other conditional mobility procedure) is configured is called a "candidate target cell" or "potential target cell". Similarly, a radio network node controlling a candidate/potential target cell is called "candidate target node" or "potential target node". Once the CHO execution condition has been fulfilled for a candidate/potential target cell and CHO execution towards this cell has been triggered, this cell is no longer "potential" or a "candidate" in the normal senses of the words, since it is now certain that the CHO will be executed towards it. Hence, after the CHO execution condition has been fulfilled/triggered, the candidate/potential target cell can be referred to as the "target cell".

Figure 18:
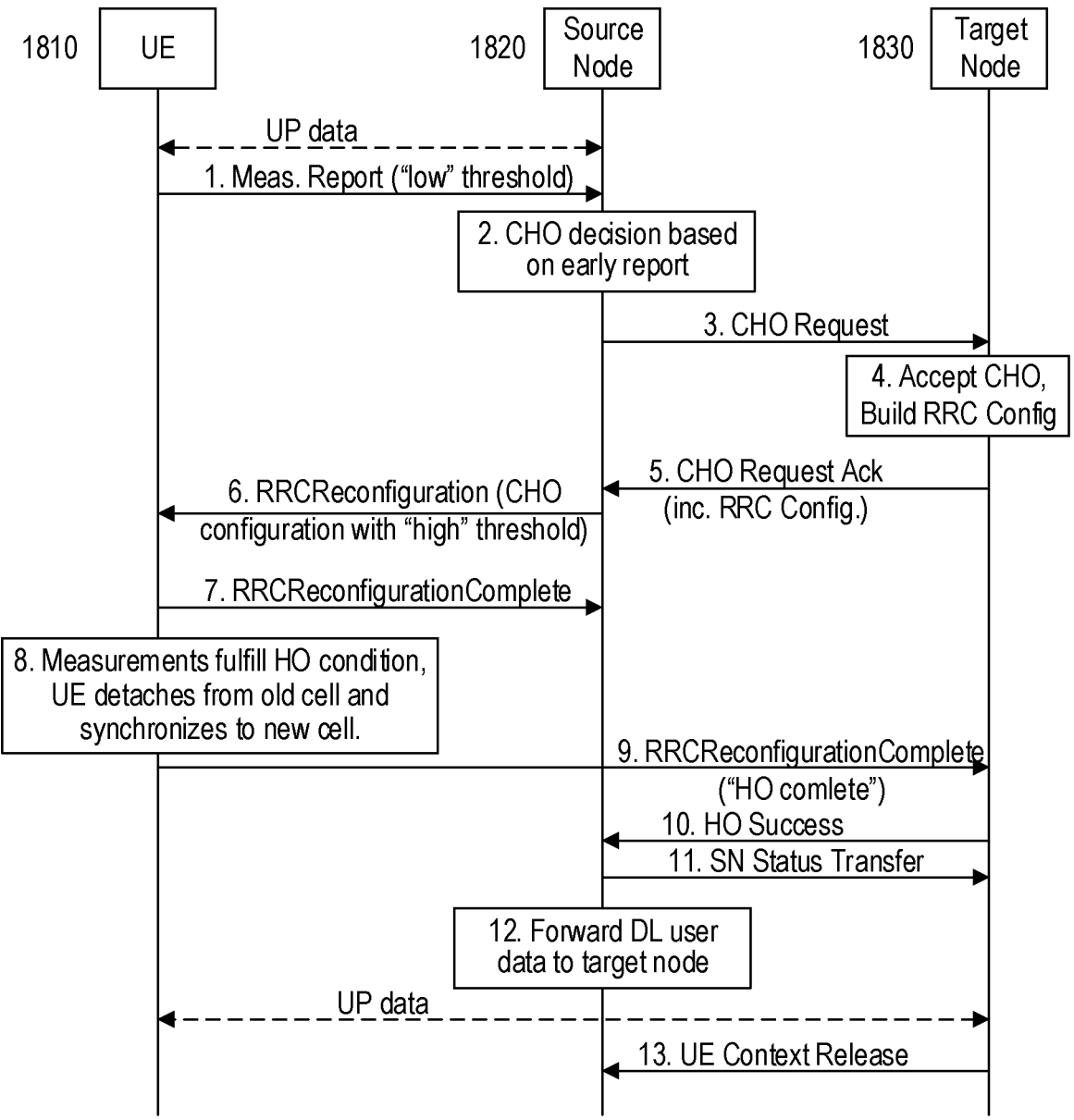
FIG. 18 illustrates an exemplary signal flow for a conditional handover (CHO).

FIG. 18 illustrates an exemplary signal flow between a user equipment (UE) 1810, a source node 1820, and a target node 1830 for a conditional handover (HO), according to exemplary embodiments of the present disclosure. For example, the source and target nodes can be gNBs and/or components of gNBs, such as CUs and/or DUs.

This procedure involves two different measurement thresholds: a low threshold and a high threshold. The two thresholds can be expressed as different levels of a particular metric, e.g., signal strength, signal quality, etc. For example, the high threshold could be that the quality of the mobility reference signal (MRS) of the target cell or beam becomes X dB stronger than the MRS of the UE's serving cell (e.g., provided by the source node), with the low threshold being less than the high threshold (i.e., target exceeds source by lower amount). As used in this context, MRS denotes a reference signal used for any mobility-related purpose. For example, in NR, MRS can be either SSB (SS/PBCH block) or CSI-RS. As a further example, for NR operating in unlicensed spectrum (referred to as NR-U), MRS can be a discovery reference signal (DRS) in addition to any of the signals mentioned above.

The UE can be provided with a measurement configuration including the low threshold (not shown in the figure). Upon performing measurements that meet the low threshold, the UE can send a measurement report to the serving node (operation 1). While performing the measurements and evaluating the low threshold, the UE continues operating in its current RRC configuration. In operation 2, based on this report, the source node can decide to request an early handover of the UE to the target node (e.g., to a cell indicated in the measurement report). For example, this early handover request can include a HandoverPreparationInformation IE such as described above.

The target node performs admission control for the UE and responds with a CHO request acknowledgement (operation 5) that includes RRC configuration, similar to conventional handover. In operation 6, the source node then sends the UE a RRCReconfiguration message that includes a "CHO Configuration", which can include the high threshold. After responding with an RRCReconfigurationComplete message (operation 7), the UE continues to perform measurements and whenever the high threshold condition is met for a target cell, it can detach from the source cell and, after synchronizing with the target cell, send the target node an RRCReconfigurationComplete message (e.g., operations 8-9). Even so, the UE can remain in the source cell for an extended amount of time in case the high threshold condition is not fulfilled.

In operation 10, the target node sends a HANDOVER SUCCESS message to the source gNB indicating the UE has successfully established the target connection. Upon reception of the handover success indication, the source node stops scheduling any further DL or UL data to the UE and sends an SN STATUS TRANSFER message to the target node indicating the latest PDCP SN transmitter and receiver status (operation 11). The source node now also starts to forward User Data to the target node (operation 12). Upon receiving the handover complete message (operation 9), the target node can start exchanging user data with the UE. The target node also requests the AMF to switch the DL data path from the UPF from the source node to the target node (not shown). Once the path switch is completed the target node sends the UE CONTEXT RELEASE to the source node (operation 13).

The conditional handover concept shown above can be generalized into a generic conditional reconfiguration framework, wherein a UE may be configured in advance with other types of reconfigurations that can be executed by an RRCReconfiguration message (in NR) or an RRCConnectionReconfiguration message (in LTE) when associated execution condition(s) is(are) triggered. For example, Conditional PSCell Change (CPC) is another type of reconfiguration procedure that can utilize this framework. In CPC, a PSCell change is executed when a pre-configured execution condition is met. In 3GPP Rel-16, CPC is limited to intra-SN without MN involvement.

Figures 19, 20A, 20B:
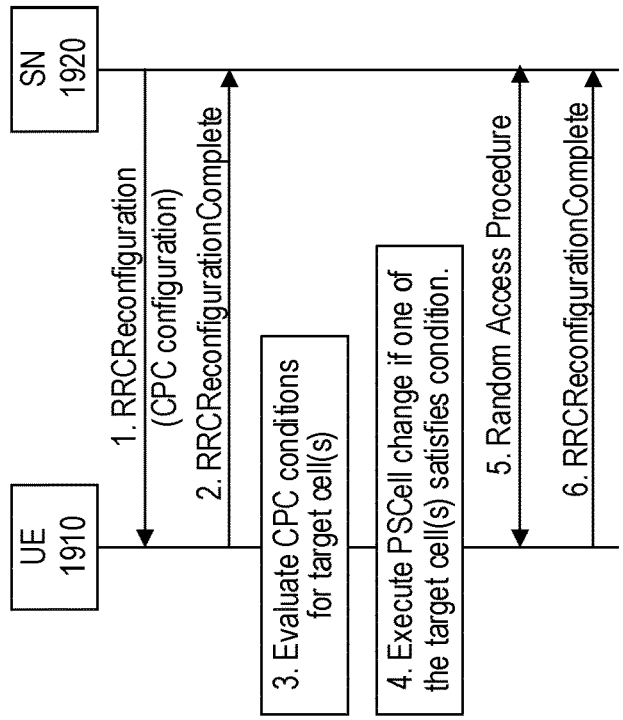
FIG. 19 illustrates an exemplary signal flow for an intra-SN conditional PSCell change (CPC) without MN involvement.
FIGS. 20A-B show exemplary ASN.1 data structures for conditional reconfigurations of a UE for a mobility operation, according to various exemplary embodiments of the present disclosure.

FIG. 19 illustrates an exemplary signal flow for an intra-SN CPC without MN involvement between a UE 1910 and a secondary node (SN) 1920, according to exemplary embodiments of the present disclosure. For example, the SN can be a gNB and/or components of a gNB, such as CUs and/or DUs.

In operation 1, the SN prepares the UE with one or multiple CPC configurations. Each configuration can include a CPC condition (e.g., indicated by one or multiple measurement identifiers associated to an event of type A3 or A5) associated with a particular target cell and an RRCReconfiguration message to send for a PSCell change to that target cell upon fulfillment of the CPC condition. The UE stores these CPC configurations and acknowledges the reception of those conditions by transmitting an RRCReconfigurationComplete message to the SN (operation 2). The UE is not required to verify the compliance of each target candidate's RRCReconfiguration upon reception of the configuration.

In operation 3, the UE evaluates the stored CPC conditions for the respective target cell(s). If a CPC condition is met, the UE executes the PSCell change to the particular target cell by applying the RRCReconfiguration message that was associated with the condition (operation 4). In operation 5, the UE performs a random-access procedure in the target cell and transmits an RRCReconfigurationComplete message in the target cell to the SN to confirm that the PSCell change has been performed (operation 6). The UE then deletes all stored CPC configurations.

In conventional PSCell Change, once a better cell in the same frequency than the PSCell triggers an event, a measurement report and preparation of the target SN is needed before the RRCReconfiguration message to execute addition/modification can be sent to the UE. In the above procedure, this message is sent to the UE in advance of the execution event. Thus, the above procedure is expected to have lower delay for PSCell relative to conventional procedures.

Conventional procedures for SN addition and SN change require the network to make decisions and trigger the execution of SCG addition/release. A network node (e.g., gNB) can decide to add an SCG associated with an SN to a given UE that is MR-DC capable upon receiving measurement reports (e.g., RSRP, RSRQ, and/or SINR) indicating that a given cell is an acceptable SCG candidate for the UE.

However, the network may also consider traffic demands in deciding whether to request a neighbor node to add an SCG for a UE (e.g., become the UE's SN). DL traffic demands can be known at the network side, since DL traffic is something that needs to be initiated at the network side, while UL traffic demands can be known at the network side based on UE Buffer Status Reports (BSRs), etc. Hence, the determination to add a PSCell may be based on received measurements reports triggered based on configured events (e.g., A3, A5), DL traffic demands known at the network side, and UL traffic demands reported from the UE to the network.

This information is typically sufficient in scenarios such as when an SCG addition or release is triggered by a change of DL data demands detected on the network side and the delay to prepare the procedure is not critical. For example, the UE is expected to continue high traffic demands for quite some time, such that the time required to add the SN (i.e., add the SCG for the UE) is negligible compared to the duration that the UE will use the SCG.

Conditional PSCell Addition to be specified in Rel-17 aims to reduce the preparation delay during an SN addition procedure. Similar to CPC, since the preparation of the target cell and the transmission of the RRCReconfiguration message to the UE is done in advance, conditional PSCell Addition should be faster than conventional PSCell Addition. Although, conditional PSCell Addition has not yet been specified, existing procedures such as CHO and CPC are expected to be used as a baseline. In these existing cases, the execution conditions are only based on UE signal measurements (e.g., RSRP, RSRP, and/or SINR) of the UE's serving cell and neighbor cells. To be more precise, the execution condition (field condExecutionCond) is configured by associating each target candidate RRCReconfiguration with one or two measurement identifiers (MeasId), whose exact configuration is provided as part of the measurement configuration (measConfig field of IE Measconfig).

FIGS. 20A-B show an exemplary ASN.1 data structures associated with a ConditionalReconfiguration IE, such as sent/received in an RRCReconfiguration message. for a CondReconfigAddMode IE, according to various embodiments of the present disclosure. In particular, FIG. 20A illustrates a ConditionalReconfiguration, IE that includes a condReconfigToAddModList field or IE, while FIG. 20B illustrates the contents of condReconfigToAddModList. In particular, this IE includes a field condExecutionCond that specifies one or two execution conditions that can trigger the execution of a conditional reconfiguration. Each execution condition is specific by a MeasID that refers to a configured measObject. When configuring two triggering events for a candidate cell, the network ensures that both MeasID refer to the same measObject. Likewise, the field condRRCReconfig includes the RRCReconfiguration message to be applied when the condition(s) are fulfilled.

In addition, an exemplary procedure for the UE evaluation of the execution condition (e.g., for HO) is described by the following excerpt from 3GPP TS 38.331:

\*\*\*Begin excerpt from 3GPP TS 38.331\*\*\*
5.3.5.13.4 Conditional Reconfiguration Evaluation
The UE shall:
1> for each condReconfigId within the VarCondtionalReconfig:
   2> consider the cell which has a physical cell identity matching the value indicated in the ServingCellConfigCommon included in the reconfigurationWithSync in the received condRRCReconfig to be applicable cell;
   2> for each measId included in the measIdList within VarMeasConfig indicated in the condExecutionCond associated to condReconfigId:
     3> if the entry condition(s) applicable for this event associated with the condReconfigId, i.e., the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
        4> consider the event associated to that measId to be fulfilled;
     3> if the leaving condition(s) applicable for this event associated with the condReconfigId, i.e., the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
        4> consider the event associated to that measId to be not fulfilled;
   2> if event(s) associated to all measId(s) within condTriggerConfig for a target candidate cell within the stored condRRCReconfig are fulfilled:
     3> consider the target candidate cell within the stored condRRCReconfig, associated to that condReconfigId, as a triggered cell;
     3> initiate the conditional reconfiguration execution, as specified in 5.3.5.13.5;
        NOTE: Up to 2 MeasId can be configured for each condReconfigId. The conditional handover event of the 2 MeasId may have the same or different event conditions, triggering quantity, time to trigger, and triggering threshold.

\*\*\*End excerpt from 3GPP TS 38.331\*\*\*

If an approach similar to the above (e.g., as in Rel-16) is adopted for conditional PSCell Addition in Rel-17, a faster procedure can be achieved. However, one issue is that the conditions to be evaluated for Conditional PSCell Addition are only measurement-based. For example, a UE will select a candidate cell for PSCell addition if it has good enough RSRP, RSRQ, and/or SINR measurements. Similarly, a UE can also make PSCell release decisions based only on RSRP, RSRQ, and/or SINR measurements. This is somewhat different than the legacy (non-conditional) PSCell addition/release techniques, in which a network node may take into account other factors such as UL/DL traffic demands (e.g., as known from DL buffer and UL BSRs) when determining whether to add and/or release a PSCell for a UE.

Allowing the UE to make such decisions without consideration of traffic demands in a candidate cell can cause various resource allocation problems for the network and/or the UE. For example, the UE adding a PSCell can require additional radio link monitoring for maintaining the SCG, reduction of power allocated for the MCG even though no data is being transmitted via the SCG, additional RRM measurements to find alternative PSCells, etc. As such, a UE can add a PSCell/SCG that would increase the UE's energy consumption without providing any benefit or utility (e.g., if all UE data could be handled by the MCG).

Accordingly, embodiments of the present disclosure provide techniques whereby a network can configure a UE with one or more conditional reconfiguration messages, each having conditions related to one or more of the following:
  UE's UL/DL data traffic (e.g., volume, throughput, arrival of data for certain bearers, etc.);
  service/application in the UE;
  combination of UE's UL/DL data traffic and measurement conditions (e.g., measurement events A3, A5, etc.) regarding serving and target cells/carriers/RATs; and
  combination of a service/application in the UE and measurement conditions regarding serving and target cells/carriers/RATs.

The UE monitors the configured conditions and, when one is fulfilled, the UE applies the associated reconfiguration message and executes the procedure associated to the reconfiguration message.

Embodiments can provide various benefits, advantages, and/or solutions to problems described herein. For example, embodiments can facilitate changing a UE's configuration based on UE's UL and DL traffic demands using the conditional reconfiguration framework, e.g., adding an SCG when the data volume increases, releasing an SCG when the data volume decreases, etc. Instead of the network reactively sending a reconfiguration message based on UE reports on UL data buffer (e.g., buffer status report) and network measurements of DL traffic (e.g., DL data volume in network buffers), a UE can be pre-configured with the relevant reconfiguration(s) and can apply them based on changes in DL/UL traffic demands. Accordingly, the amount of UE-network signaling is reduced.

Additionally, since the network prepares resources to support UE conditional operation in advance, the time between detecting a need for reconfiguration and UE operation with an updated configuration can be greatly reduced. For example, embodiments can mitigate and/or avoid delays present in conventional techniques, where the UE sends a report about UL traffic volume, the serving node requests another node to become an SN for the UE, and then the serving node sends the reconfiguration message to the UE.

Embodiments also facilitate consideration of states and/or events related to services or applications running in the UE before applying a reconfiguration message. This can ensure that the UE will be configured to operate with a configuration (e.g., SCG, cells, carriers, RATs, etc.) that is proper and/or suitable for the prevailing conditions experience by the service or application.

In general, various embodiments are related to conditional reconfigurations of a UE, e.g., a ConditionalReconfiguration IE received in an RRCReconfiguration message from the UE's serving node (e.g., MN). The UE can be configured with one or more reconfigurations (e.g., one or more RRCReconfiguration messages), each of which is prepared by a candidate target node and associated with a candidate target cell and includes execution conditions that can be represented by one or more identifiers of measurement configuration(s). Each execution condition can relate to one of the following conditional mobility operations:
  Handover (e.g., target candidate RRCReconfiguration message contains a reconfiguration with sync for the MCG);
  PSCell Addition (e.g., target candidate RRCReconfiguration message contains an SCG configuration and, that contains a reconfiguration with sync for a cell to be the SpCell of the SCG);
  PSCell Change (e.g., target candidate RRCReconfiguration message contains an SCG configuration and, that contains a reconfiguration with sync for a new target candidate cell to be the new target SpCell of the SCG);
  PSCell Release (e.g., source RRCReconfiguration message to be conditionally applied contains an SCG release indication); or
  PSCell Suspend (e.g., source RRCReconfiguration message to be conditionally applied contains an SCG suspend indication).

Upon fulfillment of an execution condition (also referred to herein as "trigger condition" or "reconfiguration condition"), the UE applies the associated reconfiguration when performing the mobility operation. An example of a conditional reconfigurations according to these embodiments is shown in FIGS. 20A-B. For each target candidate, the UE is configured with the condReconfigId, condExecutionCond and condRRCReconfig fields. Various modifications of these ASN.1 data structures to incorporate an execution condition based on a data volume are described below in relation to various embodiments.

The operation of a user equipment in various embodiments can be summarized as follows. In a first operation, the UE can receive one or more conditional reconfigurations from the network (e.g., the UE's serving network node). Each conditional reconfiguration includes a reconfiguration message (e.g., RRCReconfiguration) prepared by a candidate target node serving a candidate target cell and execution condition(s) that need to be fulfilled to apply the reconfiguration message when performing a mobility operation. In some embodiments, the execution condition(s) can be related to UL/DL traffic, such as threshold(s) associated with UL/DL data volume and/or throughput. In some embodiments, the execution condition(s) can also be related to UE measurements of serving and target cells/carriers/RATs/etc. (e.g., measurement thresholds).

The UE can store the received conditional reconfigurations and begin monitoring for the respective execution conditions until one associated with a particular candidate target cell is fulfilled. In some embodiments, the execution condition can be fulfilled when a measured and/or calculated UL and/or DL data volume meets (e.g., less than, greater than, etc. as the case may be) one or more data volume thresholds for the candidate target cell. For embodiments in which the execution condition(s) are related to measurements of serving and candidate target cells/carriers/RATs/ etc., the execution condition can be fulfilled when the UE's measurements (e.g., averaged or filtered) meet the relevant threshold (e.g., less than, greater than, etc. as the case may be).

As an example, an execution condition for PSCell change can be considered fulfilled when calculated UL data volume is above a data volume threshold, the RSRP of a serving cell (e.g., PSCell) is below a first signal level threshold, and the RSRP of a candidate target cell is above a second signal level threshold. As another example, an execution condition for PSCell release can be considered fulfilled when calculated UL or DL data volume is below a data volume threshold.

Based on determining the execution condition is fulfilled for a candidate target cell (or carrier or RAT, as the case may be), the UE applies the stored reconfiguration message associated with the fulfilled condition and performs any additional operations required to complete the associated mobility procedure (e.g., PSCell addition), such as random access to a cell being added, sending a reconfiguration complete message to the network, etc. FIGS. 14-15 show examples of such operations.

Various embodiments can include various thresholds and/or conditions related to UL/DL data traffic. In some embodiments, an increase of data traffic at the UE can trigger the UE to apply the associated conditional reconfiguration. A possible use case is Conditional PSCell Addition, in which an SCG is added when traffic demands increase. In that case, the UE receives a conditional reconfiguration including an RRCReconfiguration message (including a reconfiguration-WithSync) for an SpCell candidate of an SCG and an execution condition based on data traffic. When data traffic increases, which can be detected in various manners as described below, the UE considers the execution condition fulfilled and applies the stored RRCReconfiguration message when performing the PSCell addition.

In some embodiments, the decrease of data traffic at the UE can be used as input to trigger the UE to apply the associated conditional reconfiguration. A possible use case is Conditional PSCell Release, where an existing SCG is released when traffic demand decreases. In that case, the UE receives a conditional reconfiguration including an RRCReconfiguration message (including a reconfiguration-WithSync) for PSCell/SCG release and an execution condition based on data traffic. When data traffic decreases, which can be detected in various manners as described below, the UE considers the condition fulfilled and applies the stored RRCReconfiguration message when performing the PSCell release.

In some embodiments, the execution condition can be an UL data volume threshold, such as UL data throughput, UL data volume, and/or UL data arrival. For example, the threshold can be a number of UL PDCP SDUs in an UL buffer (e.g., PDCP buffer or RLC buffer) or UL PDCP PDUs in an UL buffer (e.g., PDCP buffer or RLC buffer). The condition can be considered fulfilled when data volume is above the threshold.

In some embodiments, the execution condition can be an UL data volume criterion related to the UEs UL data traffic for a certain bearer (such as a DRB), set of bearers (such as set of DRBs), logical channel group (LCG), or cell group (such as the MCG or SCG). For example, related to UL data throughput or that UL data has arrived for a certain bearer, certain bearers or a logical channel group or a cell group (such as the MCG or SCG). For example, that there are UL PDCP SDUs in an UL buffer (such as a PDCP buffer or RLC buffer) or UL PDCP PDUs in an UL buffer (such as a PDCP buffer or RLC buffer) for a certain bearer, certain bearers or a logical channel group or a cell group (such as the MCG or SCG). The condition can be considered as fulfilled if data volume for a certain bearer, set of bearers, or logical channel group or cell group is above the threshold.

In some embodiments, the execution condition can be an UL data volume criterion related to the UEs UL data traffic for specific radio bearers or bearers with specific QoS (5QI, CQI, etc.) profiles (e.g., arrival of UL data for bearer X, UL data arrival for a bearer with GBR QoS profile, etc.).

In some embodiments, when the execution condition is an UL data volume criterion, the UE executes the conditional reconfiguration, e.g., the PSCell (SCG) addition, when the UL data volume criterion is fulfilled.

In some embodiments, the execution condition can be based on a service or application in the UE. In these embodiments, the execution condition can be fulfilled when an event is triggered by the service or application in the UE. For example, the execution condition can be fulfilled when a service or application in the UE is activated, deactivated, reaches a particular state, or triggers an event. As a more specific example, the execution condition can be that the UE starts a mobile originated MMTel voice or video call or hangs up such a call. As another example, the execution condition can be that an application with a particular combination of Operating System, OS, Identifier and OS Application Identifier, such as a particular IOS App or Android App, is activated, deactivated, reaches a particular state, or triggers an event.

In some embodiments, the execution condition can be a service criterion fulfilled when the UE receives a paging or a notification message or responds to paging or notification.

In some embodiments, the execution condition can be a service criterion fulfilled when the UE initiates an establishment of a connection to the network, e.g., establishment or activation of a PDU session. In one example, the execution condition can be a service criterion fulfilled when the UE initiates an access to the network caused by an event defined as an access attempt by Unified Access Control as specified by 3GPP. As another example, the execution condition can be an access attempt mapped to a specific Access Category by Unified Access Control, such as a specific standardized or operator-defined access category.

In some embodiments, the execution condition can be a service criterion fulfilled when the UE initiates an access to the network in relation to a particular DNN, 5QI, or network slice (e.g., as identified by an S-NSSAI value). In some embodiments, the execution condition can be a service criterion fulfilled when the UE releases a connection to the network, such as releasing or deactivating a PDU session.

In some embodiments, the execution condition can be a DL data volume threshold, such as DL data throughput, DL data volume, and/or DL data arrival. The alternatives discussed above for UL data volume criterion can also be applied for the DL data criterion, either individually or in combination. Some examples are discussed below.

In some embodiments, the execution condition can be a DL data criterion combined with an UL data criterion. In one alternative, it is then sufficient that one of the two criteria is fulfilled in order to trigger the reconfiguration. For example, the data volume can be large enough in either UL or DL to trigger the conditional reconfiguration, e.g., for SCG addition. The DL data volume criterion can have the same or different configurations than the UL data volume criterion, e.g., there may be different thresholds for the data volume in the DL and UL directions for triggering the execution condition.

In some embodiments, the execution condition related to UL data volume can be when a total volume of UL data (e.g., for all bearers) is above a threshold. In some embodiments, the UL data volume criterion can be a volume of UL data for a certain bearer (e.g., in a PDCP or RLC buffer for the bearer), set of bearers, LCG, or cell group exceeds a threshold.

In some embodiments, the execution condition related to UL data volume can be when a Buffer Status Report (BSR) is triggered for an LCG. In one example, the criterion is the same as the event that triggers the UE to send a BSR to the network.

In some embodiments, the execution condition related to UL data volume can be when an increase in traffic is above a certain threshold, e.g., when the data in a UE buffer increases more than the threshold. In some embodiments, the execution condition related to UL data volume can be when a decrease in traffic is above a certain threshold, e.g., when the data in a UE buffer decreases more than the threshold.

In some embodiments, the execution condition related to UL data volume can be when the total amount of UL data is below a certain threshold. In some embodiments, the execution condition related to UL data volume can be when the amount of UL data for a certain bearer (e.g., in a PDCP or RLC buffer for the bearer), set of bearers, LCG, or cell group is below a threshold.

In some embodiments, the execution condition related to UL data volume can be when a timer expires. An exemplary timer is the dataInactivityTimer in UE MAC entity for the SCG.

In some embodiments, when the execution condition includes a DL data volume criterion, the UE executes the conditional reconfiguration (e.g., PSCell addition) when the DL data volume criterion is fulfilled. In an example, the execution condition can be. that the DL data volume exceeds a limit/threshold or that there is DL data for a certain radio bearer. In an alternative, the network indicates to the UE that the execution condition has been fulfilled, e.g., via MAC CE or DCI. In another alternative, the UE determines that the execution condition has been fulfilled when the amount of DL data that it has received within a certain duration exceeds a threshold, or when the UE receives DL data on a certain radio bearer.

In some embodiments, execution condition(s) based on UL/DL data traffic can be combined with execution condition(s) based on UE measurements, so that the UE only applies an RRCReconfiguration message associated with these conditions if all conditions are fulfilled. In some embodiments, execution condition(s) based on based on a service or application can be combined with execution condition(s) based on UE measurements, so that the UE only applies an RRCReconfiguration message associated with these conditions if all conditions are fulfilled. Measurement-based execution conditions can include any thresholds, criteria, and/or events used conventionally for CHO, CPC, and other conditional mobility operations. Combined data traffic and measurement execution conditions allow the UE will be configured to operate with the right configuration (e.g., SCG) or/and with the right cells/carriers/RATs according to the UE's needs at a particular time.

For example, a combined execution for a conditional PSCell Addition an SCG can be measurement event A4 (candidate target RSRP and/or RSRQ becomes better than a threshold) together with UL data volume greater than a threshold OR a service-related criterion, such as those discussed above. As another example, a combined execution for a conditional PSCell Release can be measurement event A2 (serving becomes worse than a threshold for RSRP and/or RSRQ) together with an UL data volume less than a threshold OR a service-related criterion, such as those discussed above.

In some embodiments, several execution conditions can be associated with a single conditional reconfiguration message. For example, the following conditions can provoke execution of the reconfiguration:

UL data volume>threshold_a, OR threshold_b<UL data volume<threshold_a) and (serving cell RSRP<threshold_c), OR serving cell RSRP<threshold_d.

The following exemplary procedural text for a 3GPP specification (e.g., TS 38.331) specifies how a UE can monitor execution conditions based on measurements as well as execution conditions based on traffic before determining to apply the stored message.

*Begin exemplary 3GPP specification text*

5.3.5.13.4 Conditional Reconfiguration Evaluation

The UE shall:
1> for each condReconfigId within the VarCondtionalReconfig:
2> consider the cell which has a physical cell identity matching the value indicated in the ServingCellConfigCommon included in the reconfigurationWithSync in the received condRRCReconfig to be applicable cell;
2> for each measId included in the measIdList within VarMeasConfig indicated in the condExecutionCond associated to condReconfigId:
3> if the entry condition(s) applicable for this event associated with the condReconfigId, i.e., the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
4> consider the event associated to that measId to be fulfilled;
3> if the leaving condition(s) applicable for this event associated with the condReconfigId, i.e., the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
4> consider the event associated to that measId to be not fulfilled;
2> if event(s) associated to all measId(s) within condTriggerConfig for a target candidate cell within the stored condRRCReconfig are fulfilled:
3> consider the target candidate cell within the stored condRRCReconfig, associated to that condReconfigId, as a triggered cell;
3> if the conditional reconfiguration is for conditional handover (CHO) or conditional PSCell Change (CPC):
4> initiate the conditional reconfiguration execution, as specified in 5.3.5.13.5;
3> if the conditional reconfiguration is for conditional PSCell Addition:
4> if the Uplink (UL) data volume is above the ulDataVolumeThreshold;

5> initiate the conditional reconfiguration execution, as specified in 5.3.5.13.5;
    NOTE: Up to 2 MeasId can be configured for each condReconfigId. The conditional handover event of the 2 MeasId may have the same or different event conditions, triggering quantity, time to trigger, and triggering threshold.
*End exemplary 3GPP specification text*

UL data volume, to be used as input to an execution condition based on a data volume threshold, can be calculated in different ways in various embodiments, described below. In some embodiments, data volume can be calculated at the UE PDCP layer, e.g., as the amount of data currently in the UE's UL PDCP/RLC buffers. This can be represented as a number of octets, bytes, kilobytes, etc. In that case, the UE's transmitting PDCP entity handling UL transmissions can include the following in the calculated PDCP data volume:
  the PDCP SDUs for which no PDCP Data PDUs have been constructed;
  the PDCP Data PDUs that have not been submitted to lower layers;
  the PDCP Control PDUs;
  for AM DRBs, the PDCP SDUs to be retransmitted;
  for AM DRBs, the PDCP Data PDUs to be retransmitted.

In some embodiments, the UE can filter the data volume calculated to be in the buffers based on one or more filter coefficients to arrive at a filtered data volume, which can then be compared to the execution condition threshold. An example filtering arrangement is shown below, where n and n−1 denote time samples.

Filtered Data Volume $(n)=(a-1)*$Filtered Data Volume$(n-1)+a*$Calculated Data Volume $(n)$ Filtering in this manner eliminates/smooths peaks in UL traffic demands. Non-filtered data volume calculation is typically used in relation to UL scheduling that operates in a much faster time scale than reconfiguration and/or mobility operations. For example, conditional reconfiguration can include PSCell Addition based on increase of traffic demand based and PSCell Release based on decrease in traffic demand. If raw or non-filtered calculated data volumes are used to trigger these procedures, it is possible that a short peak in traffic demand will cause a PSCell Addition followed by a PSCell Release. This may be repeated multiple times for peaky traffic, which can result in significant signaling overhead and UE energy consumption. Filtering the raw data volumes introduces a persistency requirement for the execution condition to be triggered, such that short peaks of increased traffic will not trigger PSCell Addition. Similarly, for a UE with an existing SCG/PSCell, short peaks of decreased traffic will not trigger PSCell Release.

In some embodiments, a time to trigger (e.g., dataVolume-TTT) can be introduced for the calculated data volume (e.g., filtered or non-filtered). In such embodiments, the UE requires the calculated data volume to fulfill the condition (e.g., above or below a threshold) for dataVolume-TTT to meet the execution condition. The usage of dataVolume-TTT avoids triggering the execution condition by short peaks or drops in traffic demand. This can have similar benefits as discussed above in relation to filtering raw calculated data volume.

Data volume thresholds can be configured in various ways according to various embodiments. In some embodiments, if an UL data volume threshold (e.g., ulDataVolumeThreshold) is present in a conditional reconfiguration, it can be considered as applicable for all candidate target cells. In other words, the presence of ulDataVolumeThreshold in the conditional reconfiguration is an indication that the execution condition based on UL data volume threshold is to be considered for all configured candidate target cells. FIG. 21 shows an exemplary ASN.1 data structure for a conditionalReconfiguration IE according to these embodiments. As shown in FIG. 21, the exemplary ulDataVolumeThreshold can take one of various enumerated values. In this example, value b0 corresponds to 0 bytes, value b100 corresponds to 100 bytes, value b200 corresponds to 200 bytes, and so on. If the field is absent, then a default value of 0 is applied.

In some embodiments, if an UL data volume threshold (e.g., ulDataVolumeThreshold) is present in a conditional reconfiguration, it can be applicable only to candidate target cells whose configurations specifically indicate that the threshold is applicable. For example, a condReconfigToAddMod for each candidate target cell can include a field ulDataVolumeCond that can be set to TRUE when ulDataVolumeThreshold is applicable and FALSE when ulDataVolumeThreshold is not applicable. Even so, the presence of ulDataVolumeThreshold in the conditional reconfiguration configuration is an indication that threshold is applicable to at least one configured candidate target cell. FIG. 22 shows an exemplary ASN.1 data structure according to these embodiments, which can be used in conjunction with the exemplary ASN.1 data structure shown in FIG. 21.

In some embodiments, an UL data volume threshold (e.g., ulDataVolumeThreshold) can be included in the configurations of individual candidate target cells. FIG. 23 shows an exemplary ASN.1 data structure according to these embodiments. In this alternative each candidate target cell can have a different threshold. This can be beneficial for configuring a range of candidate target cells (e.g., for PSCell Addition) for different amounts of UL traffic demand.

In some embodiments, a data volume threshold configured/used for other purposes can be considered applicable for candidate target cells whose configurations specifically indicate that the threshold is applicable. For example, a PDCP layer data volume threshold can be configured in ul-DataSplitThreshold field of UL-DataSplitThreshold IE (or equivalent) as defined in 3GPP TS 38.323 (v16.0.0). More specifically, ul-DataSplitThreshold is specified as "Value b0 corresponds to 0 bytes, value b100 corresponds to 100 bytes, value b200 corresponds to 200 bytes, and so on. The network sets this field to infinity for UEs not supporting splitDRB-withUL-Both-MCG-SCG. If the field is absent when the split bearer is configured for the radio bearer first time, then the default value infinity is applied." The UE uses this threshold to determine if it should transmit a BSR in MAC entities for both MCG and SCG in case the UE operates in MR-DC. Even if the UE is not operating in MR-DC, this threshold is an indication that if the UE would have been configured with MR-DC, BSR would have been transmitted to both the MCG and the SCG, hence a good indicator that PSCell Addition is to be executed. A similar technique as illustrated in FIG. 22 can be used to indicate applicability of ul-DataSplitThreshold to individual candidate target cells.

In some embodiments, parameter(s) for the condition(s) based on data volume calculation (e.g., a data volume threshold) is/are configured in reportConfig (e.g., ReportConfigNR), possibly as part of the conditional reconfiguration condition (e.g., CondTriggerConfig). That means that the data volume-based condition is applicable for the measId (s) of the conditional reconfiguration condition for which the associated reportConfig has the threshold configured. FIG. 24 shows an exemplary ASN.1 data structure according to these embodiments.

In some embodiments, a UE can transmit to the network a capability indicator that indicates the UE's capability of being configured with and monitoring an execution condition based on UL and/or DL data volumes. In some embodiments, a UE can transmit to the network a capability indicator that indicates the UE's capability of being configured with and monitoring combined execution conditions based on UL and/or DL data volumes and UE measurements.

Figure 25:
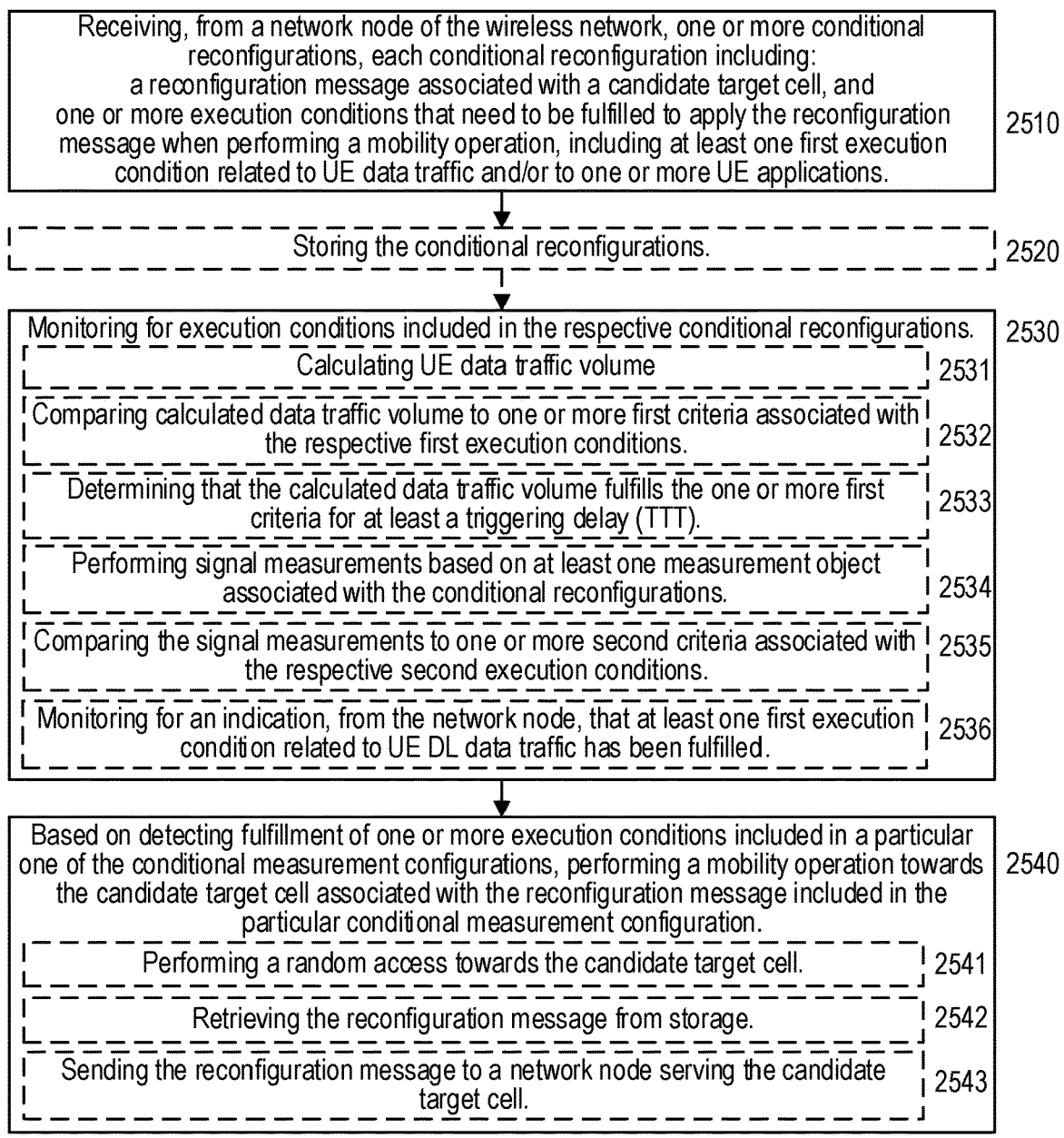
FIG. 25 is a flow diagram of an exemplary method (e.g., procedure) for a UE (e.g., wireless device, IoT device, etc. or component thereof), according to various exemplary embodiments of the present disclosure.
Figure 26:
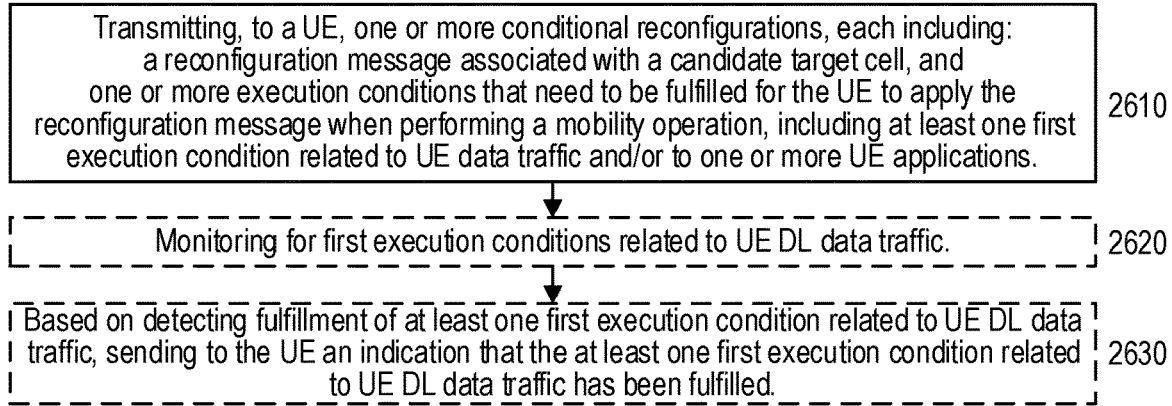
FIG. 26 is a flow diagram of an exemplary method (e.g., procedure) for a network node (e.g., base station, eNB, gNB, ng-eNB, en-gNB, etc. or component(s) thereof), according to various exemplary embodiments of the present disclosure.

The embodiments described above can be further illustrated by FIGS. 25-26, which show exemplary methods (e.g., procedures) performed by a UE and a RAN node (RNN), respectively. In other words, various features of operations described below correspond to various embodiments described above. The exemplary methods illustrated by FIGS. 25-26 can be used cooperatively to provide various exemplary benefits and/or advantages. Although FIGS. 25-26 show specific blocks in particular orders, the operations of the respective methods can be performed in different orders than shown and can be combined and/or divided into blocks having different functionality than shown. Optional blocks or operations are indicated by dashed lines.

In particular, FIG. 25 shows a flow diagram of an exemplary method (e.g., procedure) for performing mobility operations in a wireless network based on conditions related to data traffic, according to various exemplary embodiments of the present disclosure. The exemplary method can be performed by a UE (e.g., wireless device, IoT device, modem, etc. or component thereof) in communication with a network node (e.g., base station, eNB, gNB, ng-eNB, en-gNB, etc., or component thereof) in the wireless network (e.g., E-UTRAN, NG-RAN).

The exemplary method can include operations of block 2510, where the UE can receive, from the network node, one or more conditional reconfigurations. Each conditional reconfiguration can include a reconfiguration message associated with a candidate target cell and one or more execution conditions that need to be fulfilled to apply the reconfiguration message when performing a mobility operation. The execution conditions include at least one first execution condition related to UE data traffic and/or to one or more UE applications. The exemplary method can also include operations of block 2530, where the UE can monitor for the execution conditions included in the respective conditional reconfigurations. The exemplary method can also include operations of block 2540, where the UE can, based on detecting fulfillment of one or more execution conditions included in a particular one of the conditional measurement configurations, perform a mobility operation towards the candidate target cell associated with the reconfiguration message included in the particular conditional measurement configuration.

In some embodiments, the exemplary method can also include operations of block 2520, where the UE can store the conditional reconfigurations (e.g., in UE local storage, such as a non-volatile storage medium).

In some embodiments, the monitoring operations of block 2530 can include the operations of sub-blocks 2531-2532, where the UE can calculate UE data traffic volume, and compare the calculated data traffic volume to one or more first criteria associated with the respective first execution conditions. In some embodiments, calculating UE data traffic volume (e.g., in sub-block 2531) can include determining raw measurements of data traffic volume and applying a smoothing filter to the raw measurements to produce the calculated data traffic volume. The filtering operations described above are examples of these embodiments.

In some embodiments, the monitoring operations of block 2530 can also include the operations of sub-block 2533, where the UE can determine that the calculated data traffic volume fulfills the one or more first criteria (e.g., exceeds a threshold) for at least a triggering delay, referred to above as time-to-trigger or TTT for short.

In various embodiments, the first execution conditions, included in the respective conditional reconfigurations, can include any of the following criteria, individually or in any combination:
  calculated or measured UL data traffic volume is above or below an UL data volume threshold;
  calculated or measured UL throughput is above or below an UL throughput threshold;
  calculated or measured DL data traffic volume is above or below a DL data volume threshold;
  calculated or measured DL throughput is above or below a DL throughput threshold;
  arrival of UL data; and
  arrival of DL data.

In various embodiments, each of the above listed criteria is related to one of the following:
  all UE UL or DL data traffic;
  UE UL or DL data traffic associated with a specific radio bearer; or
  UE UL or DL data traffic associated with a specific group of radio bearers with a specific quality of service (QoS) profile.

In some embodiments, the one or more execution conditions, included in each conditional reconfiguration, can also include at least one second execution conditions related to measurements of the UE's serving cell and/or of respective candidate target cells. In such embodiments, the monitoring operations of block 2530 can include the operations of sub-blocks 2534-2535. In sub-block 2534, the UE can perform signal measurements based on at least one measurement object associated with the conditional reconfigurations. In sub-block 2535, the UE can compare the signal measurements to one or more second criteria associated with the respective second execution conditions. In various embodiments, the respective second execution conditions can include any of the following:
  measured signal level and/or quality for a serving cell, carrier, or radio access technology (RAT) is above or below a first measurement threshold;
  measured signal level and/or quality for the serving cell, carrier, or RAT is between first and second measurement thresholds;
  measured signal level and/or quality for a neighbor cell, carrier, or RAT is above or below a third measurement threshold;
  measured signal level and/or quality for the neighbor cell, carrier, or RAT is between third and fourth measurement thresholds; and
  measured signal level and/or quality for the neighbor cell, carrier, or RAT is above or below measured signal level and/or quality for the serving cell, carrier, or RAT by more than a fifth threshold.

In some embodiments, performing the mobility operation (e.g., in block 2540) can be based on detecting fulfillment of both a first execution condition and a second execution condition included in the particular conditional reconfiguration. In other embodiments, performing the mobility operation (e.g., in block 2540) can be based on detecting fulfillment of either a first execution condition or a second execution condition included in the particular conditional reconfiguration.

In some embodiments, monitoring for a first execution condition included in the particular conditional reconfiguration can be initiated based on detecting fulfillment of a second execution condition included in the particular conditional reconfiguration. In other embodiments, monitoring for a second execution condition included in the particular conditional reconfiguration can be initiated based on detecting fulfillment of a first execution condition included in the particular conditional reconfiguration.

In some embodiments, the at least one first execution condition includes one or more of the following: a particular UE application is activated; a particular UE application is deactivated; a particular UE application reaches a particular state; or a particular UE application triggers a particular event.

In some embodiments, the monitoring operations of block 2530 can include the operations of sub-block 2536, where the UE can monitor for an indication, from the network node, that at least one first execution condition related to UE DL data traffic has been fulfilled. In various embodiments, the indication can be received as a MAC control element (MAC CE), radio resource control (RRC) message, or downlink control information (DCI). In some embodiments, the indication, when received, can include an identifier of the particular conditional reconfiguration whose at least one first execution condition related to UE DL data traffic has been fulfilled.

In some embodiments, performing the mobility operation towards the candidate target cell associated with the reconfiguration message included in the particular conditional measurement configuration (e.g., in block 2540) can include operations in one or more of sub-blocks 2541-2543. In sub-block 2541, the UE can perform a random access towards the candidate target cell. In sub-block 2542, the UE can retrieve the reconfiguration message from storage (e.g., after storing the reconfiguration message in block 2520). In sub-block 2543, the UE can send the reconfiguration message to a network node serving the candidate target cell.

In various embodiments, the mobility operation can be any of the following: secondary cell group (SCG) activation, SCG suspension, handover or primary cell (PCell) change, primary SCG cell (PSCell) addition, PSCell release, or reconfiguration with sync.

In various embodiments, the UE can be operating in one of the following modes: single connectivity with the network node, dual connectivity where the network node is a master node (MN), or dual connectivity where the network node is a secondary node (SN).

In addition, FIG. 26 shows a flow diagram of an exemplary method (e.g., procedure) for configuring mobility operations by a user equipment (UE) based on conditions related to data traffic, according to various exemplary embodiments of the present disclosure. The exemplary method can be performed by a network node (e.g., base station, eNB, gNB, ng-eNB, etc., or components thereof) in a wireless network (e.g., E-UTRAN, NG-RAN).

The exemplary method can include the operations of block 2610, where the network node can transmit, to a UE, one or more conditional reconfigurations. Each conditional reconfiguration can include a reconfiguration message associated with a candidate target cell and one or more execution conditions that need to be fulfilled for the UE to apply the reconfiguration message when performing a mobility operation. The execution conditions include at least one first execution condition related to UE data traffic and/or to one or more UE applications.

In some embodiments, the exemplary method can also include the operations of blocks 2620-2630. In block 2620, the network node can monitor for first execution conditions related to UE DL data traffic. In block 2630, the network node can, based on detecting fulfillment of at least one first execution condition related to UE DL data traffic, send to the UE an indication that the at least one first execution condition related to UE DL data traffic has been fulfilled. In various embodiments, the indication can be sent as a MAC CE, an RRC message, or DCI. In some embodiments, the indication can include an identifier of the particular conditional reconfiguration whose at least one first measurement condition related to UE DL data traffic has been fulfilled.

In various embodiments, the first execution conditions, included in the respective conditional reconfigurations, can include any of the criteria discussed above in relation to UE embodiments. In some embodiments, the one or more execution conditions, included in each conditional measurement configuration, can also include at least one second execution condition related to measurements of the UE's serving cell and/or of respective candidate target cells. These second execution conditions can include any of those discussed above in relation to UE embodiments.

In some embodiments, a particular one of the conditional reconfigurations requires fulfillment of both a first measurement condition and a second measurement condition for the UE to apply the reconfiguration message included in the particular conditional reconfiguration. In other embodiments, a particular one of the conditional reconfigurations requires fulfillment of either a first measurement condition or a second measurement condition for the UE to apply the reconfiguration message included in the particular conditional reconfiguration.

In some embodiments, a particular one of the conditional reconfigurations requires fulfillment of a second measurement condition after fulfillment of a first measurement condition for the UE to apply the reconfiguration message included in the particular conditional configuration. In other embodiments, a particular one of the conditional reconfigurations requires fulfillment of a first measurement condition after fulfillment of a second measurement condition for the UE to apply the reconfiguration message included in the particular conditional configuration.

In some embodiments, the mobility operation associated with each conditional reconfiguration is one of the following: SCG activation, SCG suspension, handover or PCell change, PSCell addition, PSCell release, or reconfiguration with sync. In various embodiments, the network node can be operating in one of the following modes with respect to the UE: single connectivity, dual connectivity where the network node is a MN, or dual connectivity where the network node is a SN.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 27:
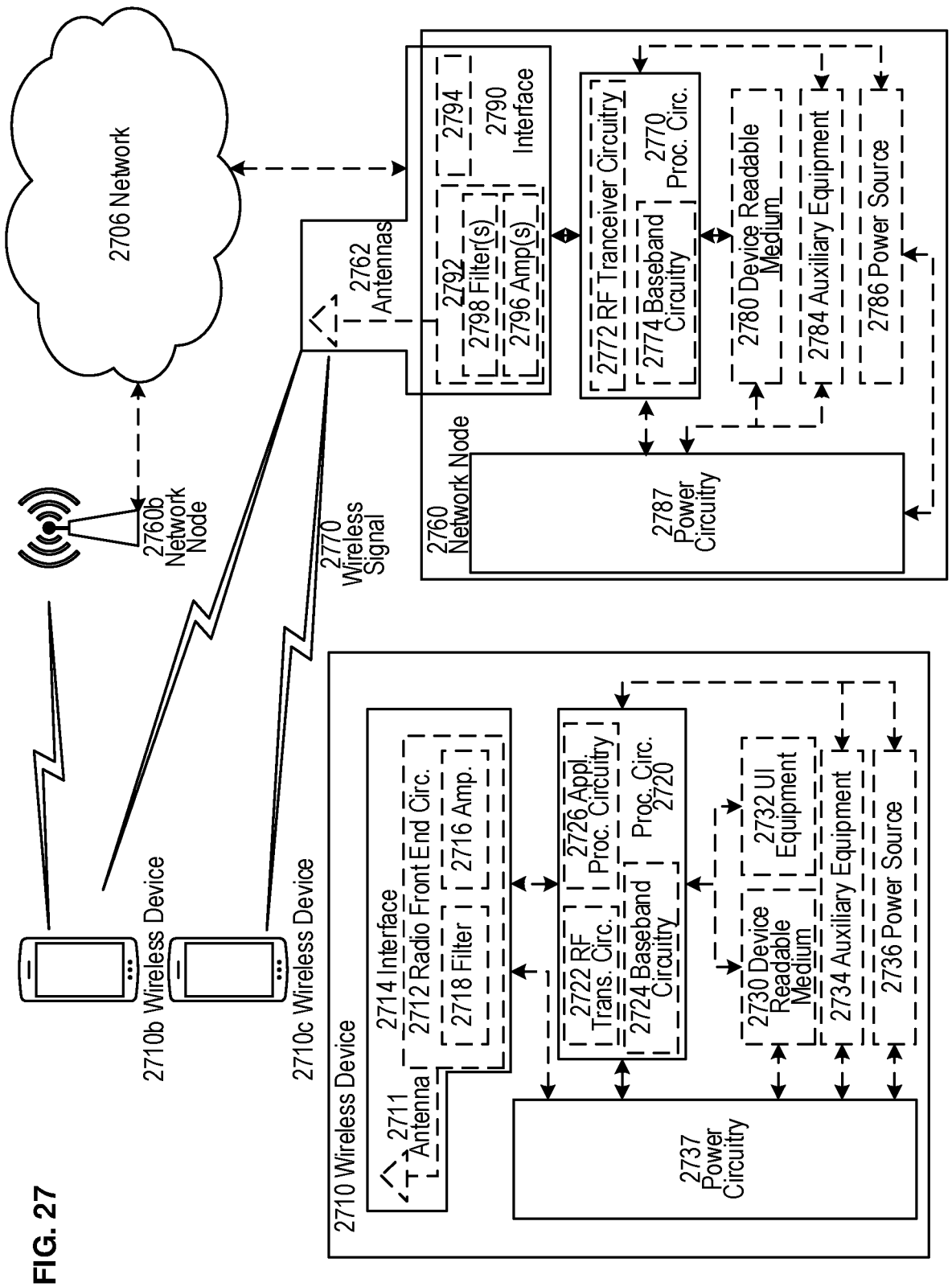
FIG. 27 illustrates an exemplary embodiment of a wireless network.

For example, FIG. 27 shows an exemplary wireless network in which various embodiments disclosed herein can be implemented. For simplicity, the wireless network of FIG. 27 only depicts network 2706, network nodes 2760 and 2760*b*, and WDs 2710, 2710*b*, and 2710*c*. In practice, a wireless network can further include any additional elements suitable to support communication between wireless devices or between a wireless device and another communication device, such as a landline telephone, a service provider, or any other network node or end device. Of the illustrated components, network node 2760 and wireless device (WD) 2710 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2706 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2760 and WD 2710 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 27, network node 2760 includes processing circuitry 2770, device readable medium 2780, interface 2790, auxiliary equipment 2784, power source 2786, power circuitry 2787, and antenna 2762. Although network node 2760 illustrated in the example wireless network of FIG. 27 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 2760 are depicted as single boxes located within a larger box, or nested within multiple boxes, in practice, a network node can comprise multiple different physical components that make up a single illustrated component (e.g., device readable medium 2780 can comprise multiple separate hard drives as well as multiple RAM modules).

Similarly, network node 2760 can be composed of multiple physically separate components (e.g., a NodeB component and an RNC component, or a BTS component and a BSC component, etc.), which can each have their own respective components. In certain scenarios in which network node 2760 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 2760 can be configured to support multiple radio access technologies (RATs). In such embodiments, some components can be duplicated (e.g., separate device readable medium 2780 for the different RATs) and some components can be reused (e.g., the same antenna 2762 can be shared by the RATs). Network node 2760 can also include multiple sets of the various illustrated components for different wireless technologies integrated into network node 2760, such as, for example, GSM, WCDMA, LTE, NR, WiFi, or Bluetooth wireless technologies. These wireless technologies can be integrated into the same or different chip or set of chips and other components within network node 2760.

Processing circuitry 2770 can be configured to perform any determining, calculating, or similar operations (e.g., certain obtaining operations) described herein as being provided by a network node. These operations performed by processing circuitry 2770 can include processing information obtained by processing circuitry 2770 by, for example, converting the obtained information into other information, comparing the obtained information or converted information to information stored in the network node, and/or performing one or more operations based on the obtained information or converted information, and as a result of said processing making a determination.

Processing circuitry 2770 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 2760, either alone or in conjunction with other network node 2760 components (e.g., device readable medium 2780). Such functionality can include any of the various wireless features, functions, or benefits discussed herein.

For example, processing circuitry 2770 can execute instructions stored in device readable medium 2780 or in memory within processing circuitry 2770. In some embodiments, processing circuitry 2770 can include a system on a chip (SOC). As a more specific example, instructions (also referred to as a computer program product) stored in medium 2780 can include instructions that, when executed by processing circuitry 2770, can configure network node 2760 to perform operations corresponding to various exemplary methods (e.g., procedures) described herein.

In some embodiments, processing circuitry 2770 can include one or more of radio frequency (RF) transceiver circuitry 2772 and baseband processing circuitry 2774. In some embodiments, radio frequency (RF) transceiver circuitry 2772 and baseband processing circuitry 2774 can be on separate chips (or sets of chips), boards, or units, such as radio units and digital units. In alternative embodiments, part or all of RF transceiver circuitry 2772 and baseband processing circuitry 2774 can be on the same chip or set of chips, boards, or units.

In certain embodiments, some or all of the functionality described herein as being provided by a network node, base station, eNB or other such network device can be performed by processing circuitry 2770 executing instructions stored on device readable medium 2780 or memory within processing circuitry 2770. In alternative embodiments, some or all of the functionality can be provided by processing circuitry 2770 without executing instructions stored on a separate or discrete device readable medium, such as in a hard-wired manner. In any of those embodiments, whether executing instructions stored on a device readable storage medium or not, processing circuitry 2770 can be configured to perform the described functionality. The benefits provided by such functionality are not limited to processing circuitry 2770 alone or to other components of network node 2760 but are enjoyed by network node 2760 as a whole, and/or by end users and the wireless network generally.

Device readable medium 2780 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 2770. Device readable medium 2780 can store any suitable instructions, data or information, including a computer program, software, an application including one or more of logic, rules, code, tables, etc. and/or other instructions capable of being executed by processing circuitry 2770 and, utilized by network node 2760. Device readable medium 2780 can be used to store any calculations made by processing circuitry 2770 and/or any data received via interface 2790. In some embodiments, processing circuitry 2770 and device readable medium 2780 can be considered to be integrated.

Interface 2790 is used in the wired or wireless communication of signaling and/or data between network node 2760, network 2706, and/or WDs 2710. As illustrated, interface 2790 comprises port(s)/terminal(s) 2794 to send and receive data, for example to and from network 2706 over a wired connection. Interface 2790 also includes radio front end circuitry 2792 that can be coupled to, or in certain embodiments a part of, antenna 2762. Radio front end circuitry 2792 comprises filters 2798 and amplifiers 2796. Radio front end circuitry 2792 can be connected to antenna 2762 and processing circuitry 2770. Radio front end circuitry can be configured to condition signals communicated between antenna 2762 and processing circuitry 2770. Radio front end circuitry 2792 can receive digital data that is to be sent out to other network nodes or WDs via a wireless connection. Radio front end circuitry 2792 can convert the digital data into a radio signal having the appropriate channel and bandwidth parameters using a combination of filters 2798 and/or amplifiers 2796. The radio signal can then be transmitted via antenna 2762. Similarly, when receiving data, antenna 2762 can collect radio signals which are then converted into digital data by radio front end circuitry 2792. The digital data can be passed to processing circuitry 2770. In other embodiments, the interface can comprise different components and/or different combinations of components.

In certain alternative embodiments, network node 2760 may not include separate radio front end circuitry 2792, instead, processing circuitry 2770 can comprise radio front end circuitry and can be connected to antenna 2762 without separate radio front end circuitry 2792. Similarly, in some embodiments, all or some of RF transceiver circuitry 2772 can be considered a part of interface 2790. In still other embodiments, interface 2790 can include one or more ports or terminals 2794, radio front end circuitry 2792, and RF transceiver circuitry 2772, as part of a radio unit (not shown), and interface 2790 can communicate with baseband processing circuitry 2774, which is part of a digital unit (not shown).

Antenna 2762 can include one or more antennas, or antenna arrays, configured to send and/or receive wireless signals. Antenna 2762 can be coupled to radio front end circuitry 2790 and can be any type of antenna capable of transmitting and receiving data and/or signals wirelessly. In some embodiments, antenna 2762 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 2762 can be separate from network node 2760 and can be connectable to network node 2760 through an interface or port.

Antenna 2762, interface 2790, and/or processing circuitry 2770 can be configured to perform any receiving operations and/or certain obtaining operations described herein as being performed by a network node. Any information, data and/or signals can be received from a wireless device, another network node and/or any other network equipment. Similarly, antenna 2762, interface 2790, and/or processing circuitry 2770 can be configured to perform any transmitting operations described herein as being performed by a network node. Any information, data and/or signals can be transmitted to a wireless device, another network node and/or any other network equipment.

Power circuitry 2787 can comprise, or be coupled to, power management circuitry and can be configured to supply the components of network node 2760 with power for performing the functionality described herein. Power circuitry 2787 can receive power from power source 2786. Power source 2786 and/or power circuitry 2787 can be configured to provide power to the various components of network node 2760 in a form suitable for the respective components (e.g., at a voltage and current level needed for each respective component). Power source 2786 can either be included in, or external to, power circuitry 2787 and/or network node 2760. For example, network node 2760 can be connectable to an external power source (e.g., an electricity outlet) via an input circuitry or interface such as an electrical cable, whereby the external power source supplies power to power circuitry 2787. As a further example, power source 2786 can comprise a source of power in the form of a battery or battery pack which is connected to, or integrated in, power circuitry 2787. The battery can provide backup power should the external power source fail. Other types of power sources, such as photovoltaic devices, can also be used.

Alternative embodiments of network node 2760 can include additional components beyond those shown in FIG. 27 that can be responsible for providing certain aspects of the network node's functionality, including any of the functionality described herein and/or any functionality necessary to support the subject matter described herein. For example, network node 2760 can include user interface equipment to allow and/or facilitate input of information into network node 2760 and to allow and/or facilitate output of information from network node 2760. This can allow and/or facilitate a user to perform diagnostic, maintenance, repair, and other administrative functions for network node 2760.

In some embodiments, a wireless device (WD, e.g., WD 2710) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 2710 includes antenna 2711, interface 2714, processing circuitry 2720, device readable medium 2730, user interface equipment 2732, auxiliary equipment 2734, power source 2736 and power circuitry 2737. WD 2710 can include multiple sets of one or more of the illustrated components for different wireless technologies supported by WD 2710, such as, for example, GSM, WCDMA, LTE, NR, WiFi, WiMAX, or Bluetooth wireless technologies, just to mention a few. These wireless technologies can be integrated into the same or different chips or set of chips as other components within WD 2710.

Antenna 2711 can include one or more antennas or antenna arrays, configured to send and/or receive wireless signals, and is connected to interface 2714. In certain alternative embodiments, antenna 2711 can be separate from WD 2710 and be connectable to WD 2710 through an interface or port. Antenna 2711, interface 2714, and/or processing circuitry 2720 can be configured to perform any receiving or transmitting operations described herein as being performed by a WD. Any information, data and/or signals can be received from a network node and/or another WD. In some embodiments, radio front end circuitry and/or antenna 2711 can be considered an interface.

As illustrated, interface 2714 comprises radio front end circuitry 2712 and antenna 2711. Radio front end circuitry 2712 comprise one or more filters 2718 and amplifiers 2716. Radio front end circuitry 2714 is connected to antenna 2711 and processing circuitry 2720 and can be configured to condition signals communicated between antenna 2711 and processing circuitry 2720. Radio front end circuitry 2712 can be coupled to or a part of antenna 2711. In some embodiments, WD 2710 may not include separate radio front end circuitry 2712; rather, processing circuitry 2720 can comprise radio front end circuitry and can be connected to antenna 2711. Similarly, in some embodiments, some or all of RF transceiver circuitry 2722 can be considered a part of interface 2714. Radio front end circuitry 2712 can receive digital data that is to be sent out to other network nodes or WDs via a wireless connection. Radio front end circuitry 2712 can convert the digital data into a radio signal having the appropriate channel and bandwidth parameters using a combination of filters 2718 and/or amplifiers 2716. The radio signal can then be transmitted via antenna 2711. Similarly, when receiving data, antenna 2711 can collect radio signals which are then converted into digital data by radio front end circuitry 2712. The digital data can be passed to processing circuitry 2720. In other embodiments, the interface can comprise different components and/or different combinations of components.

Processing circuitry 2720 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 2710 functionality either alone or in combination with other WD 2710 components, such as device readable medium 2730. Such functionality can include any of the various wireless features or benefits discussed herein.

For example, processing circuitry 2720 can execute instructions stored in device readable medium 2730 or in memory within processing circuitry 2720 to provide the functionality disclosed herein. More specifically, instructions (also referred to as a computer program product) stored in medium 2730 can include instructions that, when executed by processor 2720, can configure wireless device 2710 to perform operations corresponding to various exemplary methods (e.g., procedures) described herein.

As illustrated, processing circuitry 2720 includes one or more of RF transceiver circuitry 2722, baseband processing circuitry 2724, and application processing circuitry 2726. In other embodiments, the processing circuitry can comprise different components and/or different combinations of components. In certain embodiments processing circuitry 2720 of WD 2710 can comprise a SOC. In some embodiments, RF transceiver circuitry 2722, baseband processing circuitry 2724, and application processing circuitry 2726 can be on separate chips or sets of chips. In alternative embodiments, part or all of baseband processing circuitry 2724 and application processing circuitry 2726 can be combined into one chip or set of chips, and RF transceiver circuitry 2722 can be on a separate chip or set of chips. In still alternative embodiments, part or all of RF transceiver circuitry 2722 and baseband processing circuitry 2724 can be on the same chip or set of chips, and application processing circuitry 2726 can be on a separate chip or set of chips. In yet other alternative embodiments, part or all of RF transceiver circuitry 2722, baseband processing circuitry 2724, and application processing circuitry 2726 can be combined in the same chip or set of chips. In some embodiments, RF transceiver circuitry 2722 can be a part of interface 2714. RF transceiver circuitry 2722 can condition RF signals for processing circuitry 2720.

In certain embodiments, some or all of the functionality described herein as being performed by a WD can be provided by processing circuitry 2720 executing instructions stored on device readable medium 2730, which in certain embodiments can be a computer-readable storage medium. In alternative embodiments, some or all of the functionality can be provided by processing circuitry 2720 without executing instructions stored on a separate or discrete device readable storage medium, such as in a hard-wired manner. In any of those particular embodiments, whether executing instructions stored on a device readable storage medium or not, processing circuitry 2720 can be configured to perform the described functionality. The benefits provided by such functionality are not limited to processing circuitry 2720 alone or to other components of WD 2710, but are enjoyed by WD 2710 as a whole, and/or by end users and the wireless network generally.

Processing circuitry 2720 can be configured to perform any determining, calculating, or similar operations (e.g., certain obtaining operations) described herein as being performed by a WD. These operations, as performed by processing circuitry 2720, can include processing information obtained by processing circuitry 2720 by, for example, converting the obtained information into other information, comparing the obtained information or converted information to information stored by WD 2710, and/or performing one or more operations based on the obtained information or converted information, and as a result of said processing making a determination.

Device readable medium 2730 can be operable to store a computer program, software, an application including one or more of logic, rules, code, tables, etc. and/or other instructions capable of being executed by processing circuitry 2720. Device readable medium 2730 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 2720. In some embodiments, processing circuitry 2720 and device readable medium 2730 can be considered to be integrated.

User interface equipment 2732 can include components that allow and/or facilitate a human user to interact with WD 2710. Such interaction can be of many forms, such as visual, audial, tactile, etc. User interface equipment 2732 can be operable to produce output to the user and to allow and/or facilitate the user to provide input to WD 2710. The type of interaction can vary depending on the type of user interface equipment 2732 installed in WD 2710. For example, if WD 2710 is a smart phone, the interaction can be via a touch screen; if WD 2710 is a smart meter, the interaction can be through a screen that provides usage (e.g., the number of gallons used) or a speaker that provides an audible alert (e.g., if smoke is detected). User interface equipment 2732 can include input interfaces, devices and circuits, and output interfaces, devices and circuits. User interface equipment 2732 can be configured to allow and/or facilitate input of information into WD 2710 and is connected to processing circuitry 2720 to allow and/or facilitate processing circuitry 2720 to process the input information. User interface equipment 2732 can include, for example, a microphone, a proximity or other sensor, keys/buttons, a touch display, one or more cameras, a USB port, or other input circuitry. User interface equipment 2732 is also configured to allow and/or facilitate output of information from WD 2710, and to allow and/or facilitate processing circuitry 2720 to output information from WD 2710. User interface equipment 2732 can include, for example, a speaker, a display, vibrating circuitry, a USB port, a headphone interface, or other output circuitry. Using one or more input and output interfaces, devices, and circuits, of user interface equipment 2732, WD 2710 can communicate with end users and/or the wireless network and allow and/or facilitate them to benefit from the functionality described herein.

Auxiliary equipment 2734 is operable to provide more specific functionality which may not be generally performed by WDs. This can comprise specialized sensors for doing measurements for various purposes, interfaces for additional types of communication such as wired communications etc. The inclusion and type of components of auxiliary equipment 2734 can vary depending on the embodiment and/or scenario.

Power source 2736 can, in some embodiments, be in the form of a battery or battery pack. Other types of power sources, such as an external power source (e.g., an electricity outlet), photovoltaic devices or power cells, can also be used. WD 2710 can further comprise power circuitry 2737 for delivering power from power source 2736 to the various parts of WD 2710 which need power from power source 2736 to carry out any functionality described or indicated herein. Power circuitry 2737 can in certain embodiments comprise power management circuitry. Power circuitry 2737 can additionally or alternatively be operable to receive power from an external power source; in which case WD 2710 can be connectable to the external power source (such as an electricity outlet) via input circuitry or an interface such as an electrical power cable. Power circuitry 2737 can also in certain embodiments be operable to deliver power from an external power source to power source 2736. This can be, for example, for the charging of power source 2736. Power circuitry 2737 can perform any converting or other modification to the power from power source 2736 to make it suitable for supply to the respective components of WD 2710.

Figure 28:
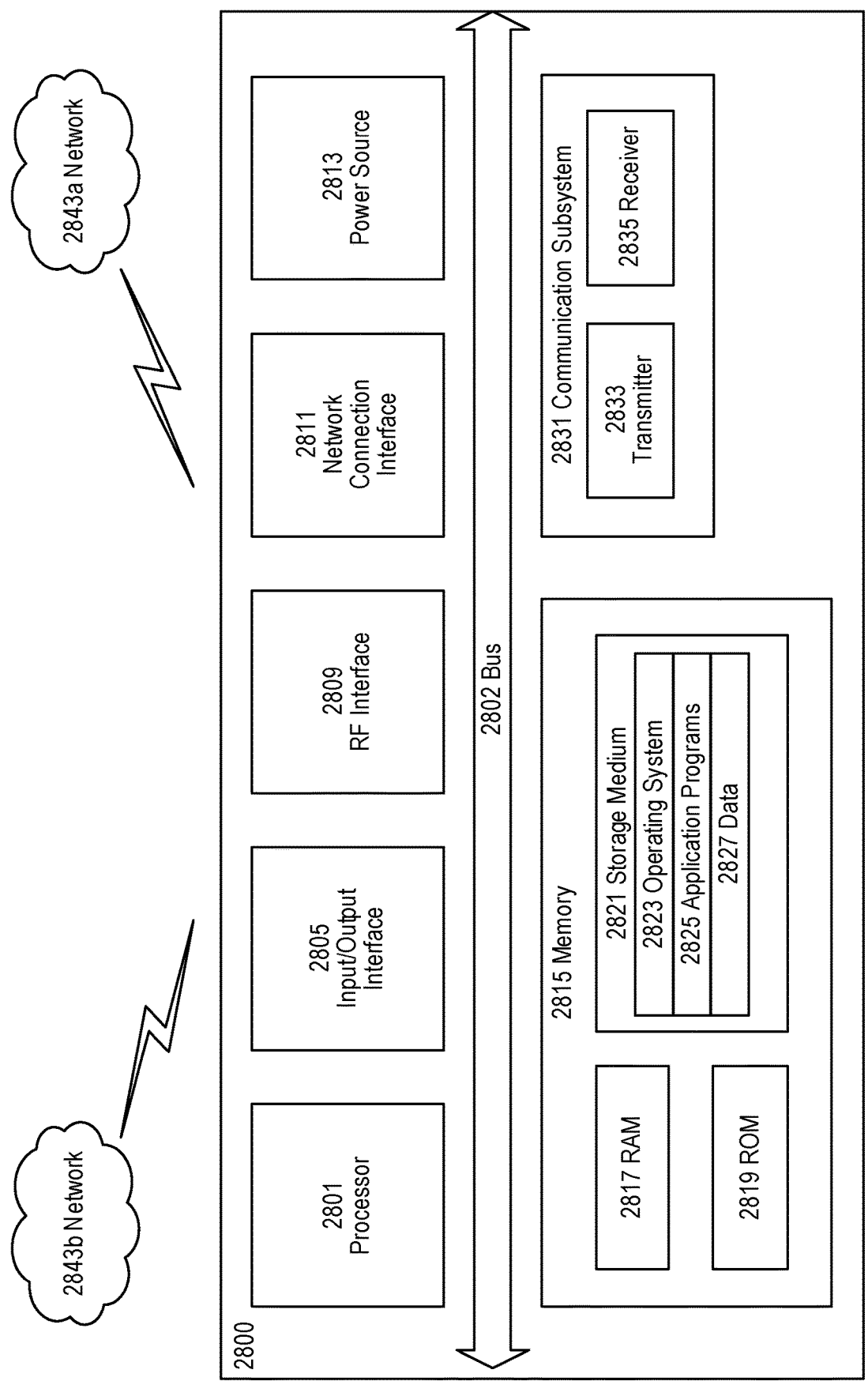
FIG. 28 illustrates an exemplary embodiment of a UE.

FIG. 28 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 28200 can be any UE identified by the $3^{rd}$ Generation Partnership Project (3GPP), including a NB-IoT UE, a machine type communication (MTC) UE, and/or an enhanced MTC (eMTC) UE. UE 2800, as illustrated in FIG. 28, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 28 is a UE, the components discussed herein are equally applicable to a WD, and vice-versa.

In FIG. 28, UE 2800 includes processing circuitry 2801 that is operatively coupled to input/output interface 2805, radio frequency (RF) interface 2809, network connection interface 2811, memory 2815 including random access memory (RAM) 2817, read-only memory (ROM) 2819, and storage medium 2821 or the like, communication subsystem 2831, power source 2833, and/or any other component, or any combination thereof. Storage medium 2821 includes operating system 2823, application program 2825, and data 2827. In other embodiments, storage medium 2821 can include other similar types of information. Certain UEs can utilize all of the components shown in FIG. 28, or only a subset of the components. The level of integration between the components can vary from one UE to another UE. Further, certain UEs can contain multiple instances of a component, such as multiple processors, memories, transceivers, transmitters, receivers, etc.

In FIG. 28, processing circuitry 2801 can be configured to process computer instructions and data. Processing circuitry 2801 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2801 can include two central processing units (CPUs). Data can be information in a form suitable for use by a computer.

In the depicted embodiment, input/output interface 2805 can be configured to provide a communication interface to an input device, output device, or input and output device. UE 2800 can be configured to use an output device via input/output interface 2805. An output device can use the same type of interface port as an input device. For example, a USB port can be used to provide input to and output from UE 2800. The output device can be a speaker, a sound card, a video card, a display, a monitor, a printer, an actuator, an emitter, a smartcard, another output device, or any combination thereof. UE 2800 can be configured to use an input device via input/output interface 2805 to allow and/or facilitate a user to capture information into UE 2800. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 28, RF interface 2809 can be configured to provide a communication interface to RF components such as a transmitter, a receiver, and an antenna. Network connection interface 2811 can be configured to provide a communication interface to network 2843*a*. Network 2843*a* can encompass wired and/or wireless networks such as a local-area network (LAN), a wide-area network (WAN), a computer network, a wireless network, a telecommunications network, another like network or any combination thereof. For example, network 2843*a* can comprise a Wi-Fi network. Network connection interface 2811 can be configured to include a receiver and a transmitter interface used to communicate with one or more other devices over a communication network according to one or more communication protocols, such as Ethernet, TCP/IP, SONET, ATM, or the like. Network connection interface 2811 can implement receiver and transmitter functionality appropriate to the communication network links (e.g., optical, electrical, and the like). The transmitter and receiver functions can share circuit components, software or firmware, or alternatively can be implemented separately.

RAM 2817 can be configured to interface via bus 2802 to processing circuitry 2801 to provide storage or caching of data or computer instructions during the execution of software programs such as the operating system, application programs, and device drivers. ROM 2819 can be configured to provide computer instructions or data to processing circuitry 2801. For example, ROM 2819 can be configured to store invariant low-level system code or data for basic system functions such as basic input and output (I/O), startup, or reception of keystrokes from a keyboard that are stored in a non-volatile memory. Storage medium 2821 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 2821 can be configured to include operating system 2823; application program 2825 such as a web browser application, a widget or gadget engine or another application; and data file 2827. Storage medium 2821 can store, for use by UE 2800, any of a variety of various operating systems or combinations of operating systems. For example, application program 2825 can include executable program instructions (also referred to as a computer program product) that, when executed by processor 2801, can configure UE 2800 to perform operations corresponding to various exemplary methods (e.g., procedures) described herein.

Storage medium 2821 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2821 can allow and/or facilitate UE 2800 to access computer-executable instructions, application programs or the like, stored on transitory or non-transitory memory media, to off-load data, or to upload data. An article of manufacture, such as one utilizing a communication system can be tangibly embodied in storage medium 2821, which can comprise a device readable medium.

In FIG. 28, processing circuitry 2801 can be configured to communicate with network 2843b using communication subsystem 2831. Network 2843a and network 2843b can be the same network or networks or different network or networks. Communication subsystem 2831 can be configured to include one or more transceivers used to communicate with network 2843b. For example, communication subsystem 2831 can be configured to include one or more transceivers used to communicate with one or more remote transceivers of another device capable of wireless communication such as another WD, UE, or base station of a radio access network (RAN) according to one or more communication protocols, such as IEEE 802.28, CDMA, WCDMA, GSM, LTE, UTRAN, WiMax, or the like. Each transceiver can include transmitter 2833 and/or receiver 2835 to implement transmitter or receiver functionality, respectively, appropriate to the RAN links (e.g., frequency allocations and the like). Further, transmitter 2833 and receiver 2835 of each transceiver can share circuit components, software or firmware, or alternatively can be implemented separately.

In the illustrated embodiment, the communication functions of communication subsystem 2831 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2831 can include cellular communication, Wi-Fi communication, Bluetooth communication, and GPS communication. Network 2843b can encompass wired and/or wireless networks such as a local-area network (LAN), a wide-area network (WAN), a computer network, a wireless network, a telecommunications network, another like network or any combination thereof. For example, network 2843b can be a cellular network, a Wi-Fi network, and/or a near-field network. Power source 2813 can be configured to provide alternating current (AC) or direct current (DC) power to components of UE 2800.

The features, benefits and/or functions described herein can be implemented in one of the components of UE 2800 or partitioned across multiple components of UE 2800. Further, the features, benefits, and/or functions described herein can be implemented in any combination of hardware, software or firmware. In one example, communication subsystem 2831 can be configured to include any of the components described herein. Further, processing circuitry 2801 can be configured to communicate with any of such components over bus 2802. In another example, any of such components can be represented by program instructions stored in memory that when executed by processing circuitry 2801 perform the corresponding functions described herein. In another example, the functionality of any of such components can be partitioned between processing circuitry 2801 and communication subsystem 2831. In another example, the non-computationally intensive functions of any of such components can be implemented in software or firmware and the computationally intensive functions can be implemented in hardware.

Figure 29:
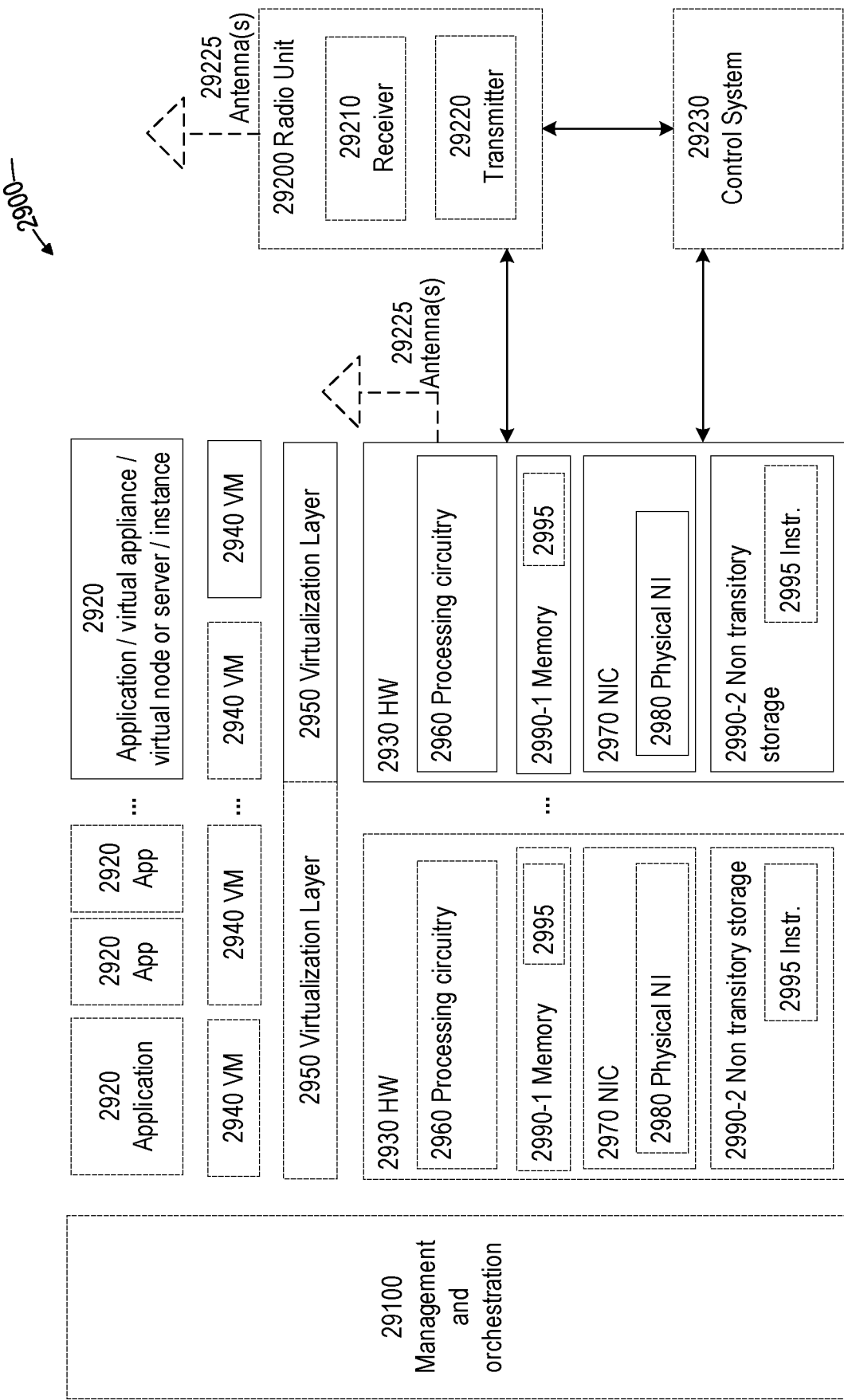
FIG. 29 is a block diagram illustrating an exemplary virtualization environment usable for implementation of various embodiments of network nodes in a wireless network.

FIG. 29 is a schematic block diagram illustrating a virtualization environment 2900 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2900 hosted by one or more of hardware nodes 2930. Further, in embodiments in which the virtual node is not a radio access node or does not require radio connectivity (e.g., a core network node), then the network node can be entirely virtualized.

The functions can be implemented by one or more applications 2920 (which can alternatively be called software instances, virtual appliances, network functions, virtual nodes, virtual network functions, etc.) operative to implement some of the features, functions, and/or benefits of some of the embodiments disclosed herein. Applications 2920 are run in virtualization environment 2900 which provides hardware 2930 comprising processing circuitry 2960 and memory 2990. Memory 2990 contains instructions 2995 executable by processing circuitry 2960 whereby application 2920 is operative to provide one or more of the features, benefits, and/or functions disclosed herein.

Virtualization environment 2900 can include general-purpose or special-purpose network hardware devices (or nodes) 2930 comprising a set of one or more processors or processing circuitry 2960, which can be commercial off-the-shelf (COTS) processors, dedicated Application Specific Integrated Circuits (ASICs), or any other type of processing circuitry including digital or analog hardware components or special purpose processors. Each hardware device can comprise memory 2990-1 which can be non-persistent memory for temporarily storing instructions 2995 or software executed by processing circuitry 2960. For example, instructions 2995 can include program instructions (also referred to as a computer program product) that, when executed by processing circuitry 2960, can configure hardware node 2920 to perform operations corresponding to various exemplary methods (e.g., procedures) described herein. Such operations can also be attributed to virtual node(s) 2920 that is/are hosted by hardware node 2930.

Each hardware device can comprise one or more network interface controllers (NICs) 2970, also known as network interface cards, which include physical network interface 2980. Each hardware device can also include non-transitory, persistent, machine-readable storage media 2990-2 having stored therein software 2995 and/or instructions executable by processing circuitry 2960. Software 2995 can include any type of software including software for instantiating one or more virtualization layers 2950 (also referred to as hypervisors), software to execute virtual machines 2940 as well as software allowing it to execute functions, features and/or benefits described in relation with some embodiments described herein.

Virtual machines 2940, comprise virtual processing, virtual memory, virtual networking or interface and virtual storage, and can be run by a corresponding virtualization layer 2950 or hypervisor. Different embodiments of the instance of virtual appliance 2920 can be implemented on one or more of virtual machines 2940, and the implementations can be made in different ways.

During operation, processing circuitry 2960 executes software 2995 to instantiate the hypervisor or virtualization layer 2950, which can sometimes be referred to as a virtual machine monitor (VMM). Virtualization layer 2950 can present a virtual operating platform that appears like networking hardware to virtual machine 2940.

As shown in FIG. 29, hardware 2930 can be a standalone network node with generic or specific components. Hardware 2930 can comprise antenna 29225 and can implement some functions via virtualization. Alternatively, hardware 2930 can be part of a larger cluster of hardware (e.g., such as in a data center or customer premise equipment (CPE)) where many hardware nodes work together and are managed via management and orchestration (MANO) 29100, which, among others, oversees lifecycle management of applications 2920.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 2940 can be a software implementation of a physical machine that runs programs as if they were executing on a physical, non-virtualized machine. Each of virtual machines 2940, and that part of hardware 2930 that executes that virtual machine, be it hardware dedicated to that virtual machine and/or hardware shared by that virtual machine with others of the virtual machines 2940, forms a separate virtual network elements (VNE).

Still in the context of NFV, Virtual Network Function (VNF) is responsible for handling specific network functions that run in one or more virtual machines 2940 on top of hardware networking infrastructure 2930 and corresponds to application 2920 in FIG. 29.

In some embodiments, one or more radio units 29200 that each include one or more transmitters 29220 and one or more receivers 29210 can be coupled to one or more antennas 29225. Radio units 29200 can communicate directly with hardware nodes 2930 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 29230, which can alternatively be used for communication between the hardware nodes 2930 and radio units 29200.

Figure 30:
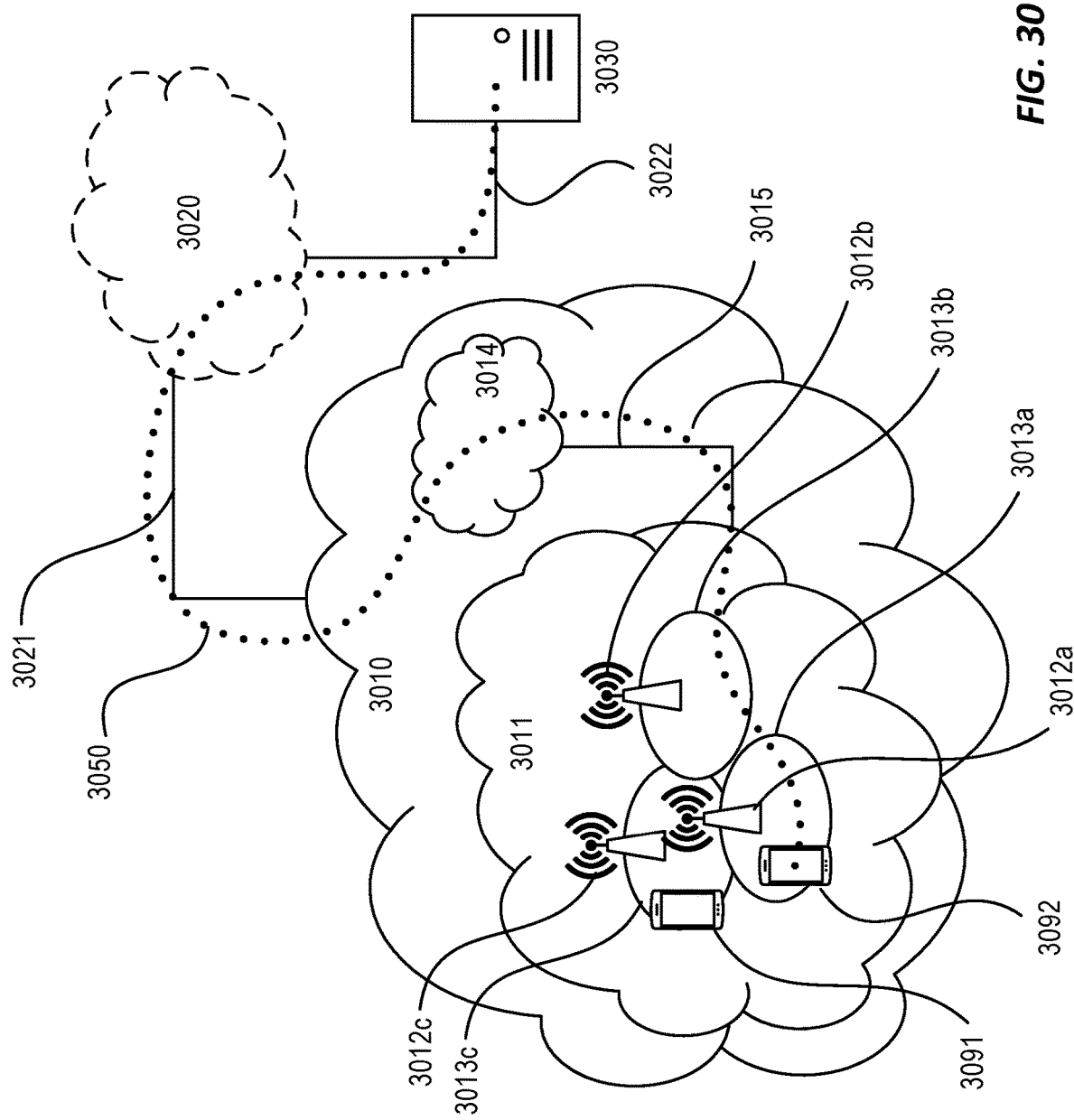
FIGS. 30-31 are block diagrams of various communication systems and/or networks, according to various exemplary embodiments of the present disclosure.

With reference to FIG. 30, in accordance with an embodiment, a communication system includes telecommunication network 3010, such as a 3GPP-type cellular network, which comprises access network 3011, such as a radio access network, and core network 3014. Access network 3011 comprises a plurality of base stations 3012*a*, 3012*b*, 3012*c*, such as NBs, eNBs, gNBs or other types of wireless access points, each defining a corresponding coverage area 3013*a*, 3013*b*, 3013*c*. Each base station 3012*a*, 3012*b*, 3012*c* is connectable to core network 3014 over a wired or wireless connection 3015. A first UE 3091 located in coverage area 3013*c* can be configured to wirelessly connect to, or be paged by, the corresponding base station 3012*c*. A second UE 3092 in coverage area 3013*a* is wirelessly connectable to the corresponding base station 3012*a*. While a plurality of UEs 3091, 3092 are illustrated in this example, the disclosed embodiments are equally applicable to a situation where a sole UE is in the coverage area or where a sole UE is connecting to the base stations 3012*a*, 3012*b*, 3012*c*.

Telecommunication network 3010 is itself connected to host computer 3030, which can be embodied in the hardware and/or software of a standalone server, a cloud-implemented server, a distributed server or as processing resources in a server farm. Host computer 3030 can be under the ownership or control of a service provider or can be operated by the service provider or on behalf of the service provider. Connections 3021 and 3022 between telecommunication network 3010 and host computer 3030 can extend directly from core network 3014 to host computer 3030 or can go via an optional intermediate network 3020. Intermediate network 3020 can be one of, or a combination of more than one of, a public, private or hosted network; intermediate network 3020, if any, can be a backbone network or the Internet; in particular, intermediate network 3020 can comprise two or more sub-networks (not shown).

The communication system of FIG. 30 as a whole enables connectivity between the connected UEs 3091, 3092 and host computer 3030. The connectivity can be described as an over-the-top (OTT) connection 3050. Host computer 3030 and the connected UEs 3091, 3092 are configured to communicate data and/or signaling via OTT connection 3050, using access network 3011, core network 3014, any intermediate network 3020 and possible further infrastructure (not shown) as intermediaries. OTT connection 3050 can be transparent in the sense that the participating communication devices through which OTT connection 3050 passes are unaware of routing of uplink and downlink communications. For example, base station 3012 may not or need not be informed about the past routing of an incoming downlink communication with data originating from host computer 3030 to be forwarded (e.g., handed over) to a connected UE 3091. Similarly, base station 3012 need not be aware of the future routing of an outgoing uplink communication originating from the UE 3091 towards the host computer 3030.

Example implementations, in accordance with an embodiment, of the UE, base station and host computer discussed in the preceding paragraphs will now be described with reference to FIG. 31. In communication system 3100, host computer 3110 comprises hardware 3115 including communication interface 3116 configured to set up and maintain a wired or wireless connection with an interface of a different communication device of communication system 3100. Host computer 3110 further comprises processing circuitry 3118, which can have storage and/or processing capabilities. In particular, processing circuitry 3118 can comprise one or more programmable processors, application-specific integrated circuits, field programmable gate arrays or combinations of these (not shown) adapted to execute instructions. Host computer 3110 further comprises software 3111, which is stored in or accessible by host computer 3110 and executable by processing circuitry 3118. Software 3111 includes host application 3112. Host application 3112 can be operable to provide a service to a remote user, such as UE 3130 connecting via OTT connection 3150 terminating at UE 3130 and host computer 3110. In providing the service to the remote user, host application 3112 can provide user data which is transmitted using OTT connection 3150.

Communication system 3100 can also include base station 3120 provided in a telecommunication system and comprising hardware 3125 enabling it to communicate with host computer 3110 and with UE 3130. Hardware 3125 can include communication interface 3126 for setting up and maintaining a wired or wireless connection with an interface of a different communication device of communication system 3100, as well as radio interface 3127 for setting up and maintaining at least wireless connection 3170 with UE 3130 located in a coverage area (not shown in FIG. 31) served by base station 3120. Communication interface 3126 can be configured to facilitate connection 3160 to host computer 3110. Connection 3160 can be direct, or it can pass through a core network (not shown in FIG. 31) of the telecommunication system and/or through one or more intermediate networks outside the telecommunication system. In the embodiment shown, hardware 3125 of base station 3120 can also include processing circuitry 3128, which can comprise one or more programmable processors, application-specific integrated circuits, field programmable gate arrays or combinations of these (not shown) adapted to execute instructions.

Base station 3120 also includes software 3121 stored internally or accessible via an external connection. For example, software 3121 can include program instructions (also referred to as a computer program product) that, when executed by processing circuitry 3128, can configure base station 3120 to perform operations corresponding to various exemplary methods (e.g., procedures) described herein.

Communication system 3100 can also include UE 3130 already referred to, whose hardware 3135 can include radio interface 3137 configured to set up and maintain wireless connection 3170 with a base station serving a coverage area in which UE 3130 is currently located. Hardware 3135 of UE 3130 can also include processing circuitry 3138, which can comprise one or more programmable processors, application-specific integrated circuits, field programmable gate arrays or combinations of these (not shown) adapted to execute instructions.

UE 3130 also includes software 3128, which is stored in or accessible by UE 3130 and executable by processing circuitry 3138. Software 3128 includes client application 3132. Client application 3132 can be operable to provide a service to a human or non-human user via UE 3130, with the support of host computer 3110. In host computer 3110, an executing host application 3112 can communicate with the executing client application 3132 via OTT connection 3150 terminating at UE 3130 and host computer 3110. In providing the service to the user, client application 3132 can receive request data from host application 3112 and provide user data in response to the request data. OTT connection 3150 can transfer both the request data and the user data. Client application 3132 can interact with the user to generate the user data that it provides. Software 3128 can also include program instructions (also referred to as a computer program product) that, when executed by processing circuitry 3138, can configure UE 3130 to perform operations corresponding to various exemplary methods (e.g., procedures) described herein.

Figure 31:
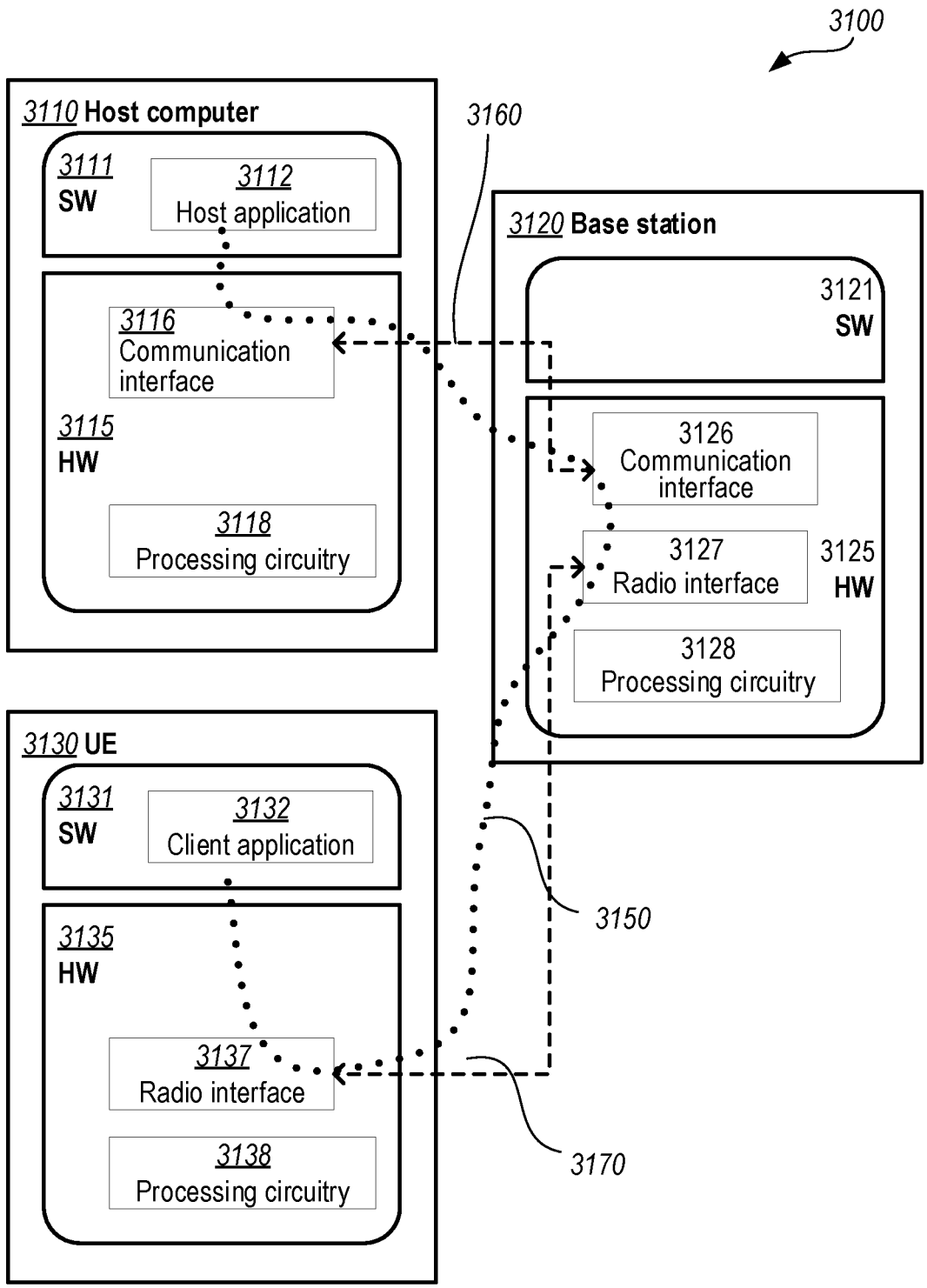

As an example, host computer 3110, base station 3120 and UE 3130 illustrated in FIG. 31 can be similar or identical to host computer 3030, one of base stations 3012a, 3012b, 3012c and one of UEs 3091, 3092 of FIG. 30, respectively. This is to say, the inner workings of these entities can be as shown in FIG. 31 and independently, the surrounding network topology can be that of FIG. 30.

In FIG. 31, OTT connection 3150 has been drawn abstractly to illustrate the communication between host computer 3110 and UE 3130 via base station 3120, without explicit reference to any intermediary devices and the precise routing of messages via these devices. Network infrastructure can determine the routing, which it can be configured to hide from UE 3130 or from the service provider operating host computer 3110, or both. While OTT connection 3150 is active, the network infrastructure can further take decisions by which it dynamically changes the routing (e.g., on the basis of load balancing consideration or reconfiguration of the network).

Wireless connection 3170 between UE 3130 and base station 3120 is in accordance with the teachings of the embodiments described throughout this disclosure. One or more of the various embodiments improve the performance of OTT services provided to UE 3130 using OTT connection 3150, in which wireless connection 3170 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 3150 between host computer 3110 and UE 3130, in response to variations in the measurement results. The measurement procedure and/or the network functionality for reconfiguring OTT connection 3150 can be implemented in software 3111 and hardware 3115 of host computer 3110 or in software 3128 and hardware 3135 of UE 3130, or both. In embodiments, sensors (not shown) can be deployed in or in association with communication devices through which OTT connection 3150 passes; the sensors can participate in the measurement procedure by supplying values of the monitored quantities exemplified above or supplying values of other physical quantities from which software 3111, 3128 can compute or estimate the monitored quantities. The reconfiguring of OTT connection 3150 can include message format, retransmission settings, preferred routing etc.; the reconfiguring need not affect base station 3120, and it can be unknown or imperceptible to base station 3120. Such procedures and functionalities can be known and practiced in the art. In certain embodiments, measurements can involve proprietary UE signaling facilitating host computer 3110's measurements of throughput, propagation times, latency and the like. The measurements can be implemented in that software 3111 and 3128 causes messages to be transmitted, in particular empty or 'dummy' messages, using OTT connection 3150 while it monitors propagation times, errors, etc.

FIG. 32 is a flowchart illustrating an exemplary method (e.g., procedure) implemented in a communication system, in accordance with various embodiments. The communication system includes a host computer, a base station and a UE which, in some exemplary embodiments, can be those described with reference to other figures herein. For simplicity of the present disclosure, only drawing references to FIG. 32 will be included in this section. In step 3210, the host computer provides user data. In substep 3211 (which can be optional) of step 3210, the host computer provides the user data by executing a host application. In step 3220, the host computer initiates a transmission carrying the user data to the UE. In step 3230 (which can be optional), the base station transmits to the UE the user data which was carried in the transmission that the host computer initiated, in accordance with the teachings of the embodiments described throughout this disclosure. In step 3240 (which can also be optional), the UE executes a client application associated with the host application executed by the host computer.

FIG. 33 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 33 will be included in this section. In step 3310 of the method, the host computer provides user data. In an optional substep (not shown) the host computer provides the user data by executing a host application. In step 3320, the host computer initiates a transmission carrying the user data to the UE. The transmission can pass via the base station, in accordance with the teachings of the embodiments described throughout this disclosure. In step 3330 (which can be optional), the UE receives the user data carried in the transmission.

FIG. 34 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 34 will be included in this section. In step 3410 (which can be optional), the UE receives input data provided by the host computer. Additionally or alternatively, in step 3420, the UE provides user data. In substep 3421 (which can be optional) of step 3420, the UE provides the user data by executing a client application. In substep 3411 (which can be optional) of step 3410, the UE executes a client application which provides the user data in reaction to the received input data provided by the host computer. In providing the user data, the executed client application can further consider user input received from the user. Regardless of the specific manner in which the user data was provided, the UE initiates, in substep 3430 (which can be optional), transmission of the user data to the host computer. In step 3440 of the method, the host computer receives the user data transmitted from the UE, in accordance with the teachings of the embodiments described throughout this disclosure.

FIG. 35 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 35 will be included in this section. In step 3510 (which can be optional), in accordance with the teachings of the embodiments described throughout this disclosure, the base station receives user data from the UE. In step 3520 (which can be optional), the base station initiates transmission of the received user data to the host computer. In step 3530 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method, for a user equipment (UE), for performing mobility operations based on conditional reconfigurations, the method comprising:
  receiving, from a radio network node (RNN), one or more conditional reconfigurations, each including:
    a reconfiguration message associated with a candidate target cell, and
    one or more execution conditions that need to be fulfilled to apply the reconfiguration message when performing a mobility operation, including a first execution condition related to UE data traffic;
  monitoring for occurrence of the execution conditions included in the respective conditional reconfigurations; and
  based on detecting an occurrence of one or more execution conditions associated with a particular candidate target cell, performing a mobility operation based on the reconfiguration message associated with the particular candidate target cell.

A2. The method of embodiment A1, further comprising storing the conditional reconfigurations.

A3. The method of any of embodiments A1-A2, wherein monitoring for occurrence of the execution conditions comprises:
  calculating UE data traffic volume; and
  comparing the calculated data traffic volume to one or more first criteria associated with the respective first execution conditions.

A4. The method of embodiment A3, wherein calculating UE data traffic volume comprises determining raw measurements of data traffic volume and applying a smoothing filter to the raw measurements to produce the calculated data traffic volume.

A5. The method of any of embodiments A3-A4, wherein monitoring for occurrence of the respective execution conditions further comprises determining that the calculated data traffic volume fulfills the one or more first criteria for at least a triggering delay (TTT).

A6. The method of any of embodiments A3-A5, wherein the conditional reconfigurations also include respective second execution conditions related to measurements of the UE's serving cell and/or respective candidate target cells.

A7. The method of embodiment A6, wherein monitoring for occurrence of the respective execution conditions further comprises:
  performing signal measurements based on at least one measurement object associated with the conditional configurations; and
  comparing the signal measurements to one or more second criteria associated with the respective second execution conditions.

A8. The method of any of embodiments A6-A7, wherein the respective second execution conditions include any of the following:
  measured signal level and/or quality for a serving cell, carrier, or radio access technology (RAT) is above or below a first measurement threshold;
  measured signal level and/or quality for the serving cell, carrier, or RAT is between first and second measurement thresholds;
  measured signal level and/or quality for a neighbor cell, carrier, or RAT is above or below a third measurement threshold;
  measured signal level and/or quality for the neighbor cell, carrier, or RAT is between third and fourth measurement thresholds; and
  measured signal level and/or quality for the neighbor cell, carrier, or RAT is above or below measured signal level and/or quality for the serving cell, carrier, or RAT by more than a fifth threshold.

A9. The method of any of embodiments A6-A8, wherein performing the mobility operation is based on detecting one of the following associated with the particular candidate target cell:
  occurrence of both a first execution condition and a second execution condition; or
  occurrence of either a first execution condition or a second execution condition.

A10. The method of any of embodiments A6-A9, wherein monitoring for occurrence of a first execution condition associated with the particular candidate target cell is initiated after detecting occurrence of a second execution condition associated with the particular candidate target cell.

A11. The method of any of embodiments A6-A9, wherein monitoring for occurrence of a second execution condition associated with the particular candidate target cell is initiated after detecting occurrence of a first execution condition associated with the particular candidate target cell.

A12. The method of any of embodiments A3-A12, wherein:
the conditional reconfigurations also include respective third execution conditions related to one or more UE applications; and
monitoring for occurrence of the respective execution conditions further comprises monitoring for the third execution conditions.

A13. The method of any of embodiments A1-A12, wherein:
the first execution conditions include one or more criteria related to downlink (DL) data traffic from the RNN; and
monitoring for occurrence of the respective execution conditions comprises monitoring for an indication, from the RNN, that any of the first execution conditions has occurred.

A14. The method of embodiment A13, wherein the indication, when received, is one of the following: MAC control element (MAC CE), radio resource control (RRC) message, or downlink control information (DCI).

A15. The method of any of embodiments A13-A14, wherein the indication, when received, includes an identifier of the conditional reconfiguration whose first execution condition has occurred.

A16. The method of any of embodiments A1-A15, wherein performing the mobility operation based on the reconfiguration message includes one or more of the following operations:
performing a random access towards the particular candidate target cell;
retrieving the stored reconfiguration message associated with the particular candidate target cell; and
sending the reconfiguration message to a RNN serving the particular candidate target cell.

A17. The method of any of embodiments A1-A16, wherein the mobility operation is one of the following: handover or primary cell (PCell) change, primary secondary cell (PSCell) addition, PSCell release, reconfiguration with sync, secondary cell group (SCG) activation, or SCG suspension.

A18. The method of any of embodiments A1-A17, wherein the UE is operating in one of the following modes: single connectivity with the RNN, dual connectivity where the RNN is a master node (MN), or dual connectivity where the RNN is a secondary node (SN).

A19. The method of any of embodiment A1-A18, wherein the respective first execution conditions include any of the following criteria, individually or in any combination:
calculated or measured UL data traffic volume is above or below an UL data volume threshold;
calculated or measured UL throughput is above or below an UL throughput threshold;
calculated or measured DL data traffic volume is above or below a DL data volume threshold;
calculated or measured DL throughput is above or below a DL throughput threshold;
arrival of UL data; and
arrival of DL data.

A20. The method of embodiment A19, wherein each of the criteria is related to one of the following:
all UE UL or DL data traffic;
UE UL or DL data traffic associated with a specific radio bearer; or
UE UL or DL data traffic associated with a specific group of radio bearers with a specific QoS profile.

B1. A method, for a radio network node (RNN), for configuring mobility operations by a user equipment (UE) based on conditional reconfigurations, the method comprising:
transmitting, to the UE, one or more conditional reconfigurations, each including:
a reconfiguration message associated with a candidate target cell, and
one or more execution conditions that need to be fulfilled for the UE to apply the reconfiguration message when performing a mobility operation, including a first execution condition related to UE data traffic.

B2. The method of embodiment B1,
monitoring for occurrence of first execution conditions related to UE DL data traffic; and
based on detecting an occurrence of a first execution condition associated with a particular candidate target cell, sending, to the UE, an indication that the first execution condition has occurred.

B3. The method of embodiment B2, wherein the indication is sent as one of the following: MAC control element (MAC CE), radio resource control (RRC) message, or downlink control information (DCI).

B4. The method of any of embodiments B2-B3, wherein the indication includes an identifier of the conditional reconfiguration whose first execution condition has occurred.

B5. The method of any of embodiments B1-B4, wherein the conditional reconfigurations also include respective second execution conditions related to measurements of the UE's serving cell and/or respective candidate target cells.

B6. The method of embodiment B5, wherein the respective second execution conditions include any of the following:
measured signal level and/or quality for a serving cell, carrier, or radio access technology (RBT) is above or below a first measurement threshold;
measured signal level and/or quality for the serving cell, carrier, or RBT is between first and second measurement thresholds;
measured signal level and/or quality for a neighbor cell, carrier, or RBT is above or below a third measurement threshold;
measured signal level and/or quality for the neighbor cell, carrier, or RBT is between third and fourth measurement thresholds; and
measured signal level and/or quality for the neighbor cell, carrier, or RBT is above or below measured signal level and/or quality for the serving cell, carrier, or RBT by more than a fifth threshold.

B7. The method of any of embodiments B5-B6, wherein at least one conditional reconfiguration also includes one of the following relationships:
both a first execution condition and a second execution condition must occur; or
either the first execution condition or the second execution condition must occur.

B8. The method of any of embodiments B5-B7, wherein the conditional reconfigurations also include respective third execution conditions related to one or more UE applications.

B9. The method of any of embodiments B1-B16, wherein the mobility operation, associated with each conditional reconfiguration, is one of the following: handover or primary cell (PCell) change, primary secondary cell (PSCell) addition, PSCell release, reconfiguration with sync, secondary cell group (SCG) activation, or SCG suspension.

B10. The method of any of embodiments B1-B9, wherein the RNN is operating in one of the following modes with respect to the UE: single connectivity, dual connectivity where the RNN is a master node (MN), or dual connectivity where the RNN is a secondary node (SN).

B11. The method of any of embodiment B1-B10, wherein the respective first execution conditions include any of the following criteria, individually or in any combination:
  calculated or measured UL data traffic volume is above or below an UL data volume threshold;
  calculated or measured UL throughput is above or below an UL throughput threshold;
  calculated or measured DL data traffic volume is above or below a DL data volume threshold;
  calculated or measured DL throughput is above or below a DL throughput threshold; arrival of UL data; and arrival of DL data.

B12. The method of embodiment B11, wherein each of the criteria is related to one of the following:
  all UE UL or DL data traffic;
  UE UL or DL data traffic associated with a specific radio bearer; or
  UE UL or DL data traffic associated with a specific group of radio bearers with a specific QoS profile.

C1. A user equipment (UE) arranged to perform mobility operations in a wireless network based on conditional reconfigurations, the UE comprising:
  radio transceiver circuitry configured to communicate with a radio network node (RNN) in the wireless network; and
  processing circuitry operatively coupled to the radio transceiver circuitry, whereby the processing circuitry and the radio transceiver circuitry are configured to perform operations corresponding to the methods of any of embodiments A1-A20.

C2. A user equipment (UE) arranged to perform mobility operations in a wireless network based on conditional reconfigurations, the UE being further arranged to perform operations corresponding to the methods of any of embodiments A1-A20.

C3. A non-transitory, computer-readable medium storing computer-executable instructions that, when executed by processing circuitry of a user equipment (UE) arranged to perform mobility operations in a wireless network based on conditional reconfigurations, configure the UE to perform operations corresponding to the methods of any of embodiments A1-A20.

C4. A computer program product comprising computer-executable instructions that, when executed by processing circuitry of a user equipment (UE) arranged to perform mobility operations in a wireless network based on conditional reconfigurations, configure the UE to perform operations corresponding to the methods of any of embodiments A1-A20.

D1. A radio network node (RNN) arranged to configure mobility operations by user equipment (UEs) based on conditional reconfiguration, the RNN comprising:
  communication interface circuitry configured to communicate with one or more UEs; and
  processing circuitry operatively coupled to the communication interface circuitry, whereby the processing circuitry and the communication interface circuitry are configured to perform operations corresponding to the methods of any of embodiments B1-B12.

D2. A radio network node (RNN) arranged to configure mobility operations by user equipment (UEs) based on conditional reconfiguration, the RNN being further arranged to perform operations corresponding to the methods of any of embodiments B1-B12.

D3. A non-transitory, computer-readable medium storing computer-executable instructions that, when executed by processing circuitry of a radio network node (RNN) arranged to configure mobility operations by user equipment (UEs), configure the RNN to perform operations corresponding to the methods of any of embodiments B1-B12.

D4. A computer program product comprising computer-executable instructions that, when executed by processing circuitry of a radio network node (RNN) arranged to configure mobility operations by user equipment (UEs), configure the RNN to perform operations corresponding to the methods of any of embodiments B1-B12.

The invention claimed is:

1. A method, for a user equipment (UE) to perform mobility operations in a wireless network based on conditions related to data traffic, the method comprising:
  receiving, from a network node of the wireless network, one or more conditional reconfigurations, each conditional reconfiguration including:
    a reconfiguration message associated with a candidate target cell, and
    one or more execution conditions that need to be fulfilled to apply the reconfiguration message when performing a mobility operation, including at least one first execution condition related to one or more of the following: UE data traffic, and one or more UE applications;
  monitoring for the execution conditions included in the respective conditional reconfigurations, including monitoring for an indication, from the network node, that at least one first execution condition related to UE downlink (DL) data traffic has been fulfilled; and
  based on detecting fulfillment of one or more execution condition included in a particular one of the conditional reconfigurations, including reception of the indication from the network node, performing a mobility operation towards the candidate target cell associated with the reconfiguration message included in the particular conditional reconfiguration.

2. The method of claim 1, wherein monitoring for the execution conditions included in the respective conditional reconfigurations comprises:
  calculating UE data traffic volume; and
  comparing the calculated data traffic volume to one or more first criteria associated with the respective first execution conditions.

3. The method of claim 2, wherein one or more of the following applies:
  calculating UE data traffic volume comprises determining raw measurements of data traffic volume and applying a smoothing filter to the raw measurements to produce the calculated data traffic volume; and
  monitoring for the execution conditions included in the respective conditional reconfigurations further comprises determining that the calculated data traffic volume fulfills the one or more first criteria for at least a triggering delay (TTT).

4. The method of claim 1, wherein the one or more execution conditions, included in each conditional reconfiguration, also include at least one second execution condition related to measurements of the UE's serving cell and/or of respective candidate target cells.

5. The method of claim 4, wherein the respective second execution conditions include any of the following:
  measured signal level and/or quality for a serving cell, carrier, or radio access technology, RAT, is above or below a first measurement threshold;
  measured signal level and/or quality for the serving cell, carrier, or RAT is between first and second measurement thresholds;

measured signal level and/or quality for a neighbor cell, carrier, or RAT is above or below a third measurement threshold;
measured signal level and/or quality for the neighbor cell, carrier, or RAT is between third and fourth measurement thresholds; and
measured signal level and/or quality for the neighbor cell, carrier, or RAT is above or below measured signal level and/or quality for the serving cell, carrier, or RAT by more than a fifth threshold.

6. The method of claim 4, wherein performing the mobility operation is based on detecting fulfillment of one of the following included in the particular conditional reconfiguration:
one or more of the at least one first execution condition and one or more of the at least one second execution condition; or
one or more of the at least one first execution condition or one or more of the at least one second execution condition.

7. The method of claim 4, wherein one of the following applies:
monitoring for the at least one first execution condition included in the particular conditional reconfiguration is initiated based on detecting fulfillment of one or more of the at least one second execution condition included in the particular conditional reconfiguration; or
monitoring for the at least one second execution condition included in the particular conditional reconfiguration is initiated based on detecting fulfillment of one or more of the at least one first execution condition included in the particular conditional reconfiguration.

8. The method of claim 1, wherein the at least one first execution condition includes one or more of the following:
a particular UE application is activated;
a particular UE application is deactivated;
a particular UE application reaches a particular state; or
a particular UE application triggers a particular event.

9. The method of claim 1, wherein the indication includes an identifier of the particular conditional reconfiguration whose at least one first execution condition related to UE DL data traffic has been fulfilled, based on which the mobility operation is performed to the associated candidate target cell.

10. The method of claim 1, wherein performing the mobility operation towards the candidate target cell associated with the reconfiguration message included in the particular conditional reconfiguration includes one or more of the following operations:
performing a random access towards the candidate target cell;
retrieving the reconfiguration message from storage; and
sending the reconfiguration message to a network node serving the candidate target cell.

11. The method of claim 1, wherein the first execution conditions, included in the respective conditional reconfigurations, include any of the following criteria, individually or in any combination:
calculated or measured uplink (UL) data traffic volume is above or below an UL data volume threshold;
calculated or measured UL throughput is above or below an UL throughput threshold;
calculated or measured downlink (DL) data traffic volume is above or below a DL data volume threshold;
calculated or measured DL throughput is above or below a DL throughput threshold;
arrival of UL data; and
arrival of DL data.

12. The method of claim 11, wherein each of the criteria is related to one of the following:
all UE UL or DL data traffic;
UE UL or DL data traffic associated with a specific radio bearer; or
UE UL or DL data traffic associated with a specific group of radio bearers having a specific quality of service (QOS) profile.

13. A method for a network node, of a wireless network, to configure mobility operations by a user equipment (UE) based on conditions related to data traffic, the method comprising:
transmitting, to the UE, one or more conditional reconfigurations, each conditional reconfiguration including:
a reconfiguration message associated with a candidate target cell, and
one or more execution conditions that need to be fulfilled for the UE to apply the reconfiguration message when performing a mobility operation, including at least one first execution condition related to one or more of the following: UE data traffic, and one or more UE applications;
monitoring for at least one first execution condition related to UE downlink (DL) data traffic; and
based on detecting fulfillment of the at least one first execution condition related to UE DL data traffic, sending to the UE an indication that the at least one first execution condition related to UE DL data traffic has been fulfilled.

14. The method of claim 13, wherein the indication includes an identifier of the particular conditional reconfiguration whose at least one first execution condition related to UE DL data traffic has been fulfilled.

15. The method of claim 13, wherein the one or more execution conditions, included in each conditional reconfiguration, also include at least one second execution condition related to measurements of the UE's serving cell and/or of respective candidate target cells.

16. The method of claim 15, wherein the respective second execution conditions include any of the following:
measured signal level and/or quality for a serving cell, carrier, or radio access technology, RAT, is above or below a first measurement threshold;
measured signal level and/or quality for the serving cell, carrier, or RAT is between first and second measurement thresholds;
measured signal level and/or quality for a neighbor cell, carrier, or RAT is above or below a third measurement threshold;
measured signal level and/or quality for the neighbor cell, carrier, or RAT is between third and fourth measurement thresholds; and
measured signal level and/or quality for the neighbor cell, carrier, or RAT is above or below measured signal level and/or quality for the serving cell, carrier, or RAT by more than a fifth threshold.

17. The method of claim 15, wherein a particular one of the conditional reconfigurations requires fulfillment of one of the following for the UE to apply the reconfiguration message included in the particular conditional reconfiguration:
one or more of the at least one first execution condition and one or more of the at least one second execution condition; or one or more of the at least one first execution condition or one or more of the at least one second execution condition.

18. The method of claim 15, wherein a particular one of the conditional reconfigurations requires one of the following for the UE to apply the reconfiguration message included in the particular conditional configuration:
- fulfillment of one or more of the at least one second execution condition after fulfillment of one or more of the at least one first execution condition; or
- fulfillment of one or more of the at least one first execution condition after fulfillment of one or more of the at least one second execution condition.

19. The method of claim 13, wherein the at least one first execution condition includes one or more of the following:
- a particular UE application is activated;
- a particular UE application is deactivated;
- a particular UE application reaches a particular state; or
- a particular UE application triggers a particular event.

20. The method of claim 13, wherein the first execution conditions, included in the respective conditional reconfigurations, include any of the following criteria, individually or in any combination:
- calculated or measured uplink (UL) data traffic volume is above or below an UL data volume threshold;
- calculated or measured UL throughput is above or below an UL throughput threshold;
- calculated or measured downlink (DL) data traffic volume is above or below a DL data volume threshold;
- calculated or measured DL throughput is above or below a DL throughput threshold;
- arrival of UL data; and
- arrival of DL data.

21. The method of claim 20, wherein each of the criteria is related to one of the following:
- all UE UL or DL data traffic;
- UE UL or DL data traffic associated with a specific radio bearer; or
- UE UL or DL data traffic associated with a specific group of radio bearers having a specific quality of service (QOS) profile.

22. A network node arranged to configure mobility operations by user equipment (UEs) in a wireless network based on conditions related to data traffic, the network node comprising:
- communication interface circuitry configured to communicate with UEs; and
- processing circuitry operatively coupled to the communication interface circuitry, whereby the processing circuitry and the communication interface circuitry are configured to perform operations corresponding to the method of claim 13.

23. A user equipment (UE) configured to perform mobility operations in a wireless network based on conditions related to data traffic, the UE comprising:
- communication interface circuitry configured to communicate with a network node in the wireless network; and
- processing circuitry operatively coupled to the communication interface circuitry,
  whereby the processing circuitry and the communication interface circuitry are configured to:
  - receive, from the network node, one or more conditional reconfigurations, each conditional reconfiguration including:
    - a reconfiguration message associated with a candidate target cell, and
    - one or more execution conditions that need to be fulfilled to apply the reconfiguration message when performing a mobility operation, including at least one first execution condition related to one or more of the following: UE data traffic, and one or more UE applications;
  - monitor for the execution conditions included in the respective conditional reconfigurations, including monitoring for an indication, from the network node, that at least one first execution condition related to UE downlink (DL) data traffic has been fulfilled; and
  - based on detecting fulfillment of one or more execution conditions included in a particular one of the conditional reconfigurations, including reception of the indication from the network node, perform a mobility operation towards the candidate target cell associated with the reconfiguration message included in the particular conditional reconfiguration.

* * * * *